(12) United States Patent
Yasui

(10) Patent No.: US 6,256,983 B1
(45) Date of Patent: Jul. 10, 2001

(54) PLANT CONTROL SYSTEM

(75) Inventor: Yuji Yasui, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/548,931

(22) Filed: Apr. 13, 2000

(30) Foreign Application Priority Data

Apr. 14, 1999 (JP) ................................................. 11-106525

(51) Int. Cl.$^7$ ....................................................... F01N 3/00
(52) U.S. Cl. ............................. 60/285; 60/276; 123/674; 123/679; 701/103; 701/109
(58) Field of Search .............................. 60/274, 276, 285, 60/277; 123/674, 679; 701/103, 109, 115, 101, 102, 116

(56) References Cited

U.S. PATENT DOCUMENTS

| | | | |
|---|---|---|---|
| 5,448,978 | * 9/1995 | Hasegawa et al. | ................... 123/480 |
| 5,590,638 | * 1/1997 | Nishimura et al. | ................... 123/687 |
| 5,682,317 | * 10/1997 | Keeler et al. | ................... 364/431.03 |
| 5,694,910 | 12/1997 | Hasegawa et al. . | |
| 5,845,490 | 12/1998 | Yasui et al. . | |
| 5,845,491 | 12/1998 | Yasui et al. . | |
| 5,852,930 | 12/1998 | Yasui et al. . | |
| 5,880,952 | 3/1999 | Yasui et al. . | |
| 5,924,281 | 7/1999 | Yasui et al. . | |
| 6,112,517 | * 9/2000 | Yasui et al. | ............................ 60/274 |

FOREIGN PATENT DOCUMENTS

| | | |
|---|---|---|
| 4-369471 | 12/1992 | (JP) . |
| 5-79374 | 3/1993 | (JP) . |
| 7-83094 | 3/1995 | (JP) . |
| 8-21273 | 1/1996 | (JP) . |
| 8-105345 | 4/1996 | (JP) . |
| 11-93741 | 4/1999 | (JP) . |
| 11-153051 | 6/1999 | (JP) . |
| 11-324767 | 11/1999 | (JP) . |

OTHER PUBLICATIONS

Serial No.: 09/153,156; filed: Sep. 15, 1998; By: Yuji Yasui et al; For: Plant Control System.
Serial No.: 09/153,300; filed: Sep 15, 1998; By: Yuji Yasui et al For: Plant Control System.
Serial No.: 09/153,032; filed: Sep. 15, 1998; By: Yuji Yasui et al For: Plant Control System.
Serial No.: 09/311,353; filed: May 13, 1999; By: Yuji Yasui et al For: Plant Control System.
Serial No. 09/465,765, filed: Dec. 17, 1999; By: Yuji Yasui et al For: Air–Fuel Ratio Control System For Internal Combustion Engine.
Serial No. 09/465,395, filed: Dec. 17, 1999; By: Yuji Yasui et al For: Plant Control System.
Serial No. 09/465,766, filed: Dec. 17, 1999; By: Yuji Yasui et al For: Plant Control System.
Serial No. 09/499,975, filed: Feb. 8, 2000; By: Yuji Yasui et al For: Air–Fuel Ratio Control System for Internal Combustion Engine.

* cited by examiner

*Primary Examiner*—Thomas Denion
*Assistant Examiner*—Binh Tran
(74) *Attorney, Agent, or Firm*—Arent Fox Kintner Plotkin & Kahn, PLLC

(57) ABSTRACT

A downstream exhaust system controller generates a target value for the output of an upstream $O_2$ sensor disposed between first and second catalytic converters for converging the output of a downstream $O_2$ sensor disposed downstream of the second catalytic converter to a target value while taking into account the dead time of a downstream exhaust system. An upstream exhaust system controller generates a target air-fuel ratio for an internal combustion engine for converging the output of the upstream $O_2$ sensor to a target value while taking into account the dead time of an upstream exhaust system. A fuel processing controller controls the air-fuel ratio of the internal combustion engine at the target air-fuel ratio according to a feedback control process.

42 Claims, 20 Drawing Sheets

PLANT CONTROL SYSTEM

BACKGROUND OF THE INVENTION

1. Field of the Invention

The present invention relates to a plant control system.

2. Description of the Prior Art

The applicant of the present application has proposed an air-fuel ratio control system for controlling the air-fuel ratio of an internal combustion engine (more precisely, the air-fuel ratio of a mixture of fuel and air to be combusted in the internal combustion engine) for enabling an exhaust gas purifier such as a catalytic converter, e.g., a three-way catalytic converter, disposed in the exhaust passage of the internal combustion engine to have an optimum purifying capability. See, for example, Japanese laid-open patent publication No. 11-324767 and U.S. patent application Ser. No. 09/311,353 for details.

According to the proposed air-fuel ratio control system, an exhaust gas sensor for detecting the concentration of a certain component of an exhaust gas that has passed through the exhaust gas purifier, such as an $O_2$ sensor (oxygen concentration sensor), is disposed downstream of the exhaust gas purifier, and the air-fuel ratio of the internal combustion engine is manipulated to converge an output of the $O_2$ sensor, i.e., the detected value of the oxygen concentration, to a predetermined target value (constant value) for enabling the catalytic converter to have an optimum purifying ability irrespective of the aging of the catalytic converter.

More specifically, an exhaust gas sensor (hereinafter referred to as "air-fuel ratio sensor") disposed upstream of the exhaust gas purifier for detecting the air-fuel ratio of an air-fuel mixture combusted in the internal combustion engine and an exhaust system ranging from the air-fuel ratio sensor to the $O_2$ sensor and including the exhaust gas purifier is regarded as a controlled object. The air-fuel ratio control system has a control processing means for sequentially generating a target air-fuel ratio for the internal combustion engine (an air-fuel ratio for the internal combustion engine required to converge the output signal of the $O_2$ sensor toward a target value), which serves as a control input to the controlled object, and an air-fuel ratio manipulating means for adjusting the amount of fuel supplied to the internal combustion engine in order to converge the output signal of the air-fuel ratio sensor (the detected value of the air-fuel ratio) to the target air-fuel ratio generated by the control processing means for thereby manipulating the air-fuel ratio of the internal combustion engine into the target air-fuel ratio.

Generally, the catalytic converter as the exhaust gas purifier generally has a relatively long dead time. When the rotational speed of the internal combustion engine is low, e.g., when the internal combustion engine is idling, the internal combustion engine and the air-fuel ratio manipulating means also have a relatively long dead time. These dead times present an obstacle to the process of stably controlling the output signal of the $O_2$ sensor at the given target value.

The above air-fuel ratio control system has an estimating means for sequentially generating an estimated value of the output signal from the $O_2$ sensor after a total dead time which is the sum of the dead time (which is required for the air-fuel ratio detected at each time by the air-fuel ratio sensor to be reflected in the output signal from the $O_2$ sensor) of the exhaust system including the exhaust gas purifier and the dead time (which is required for the target air-fuel ratio generated at each time by the control processing means to be reflected in the actual air-fuel ratio) of a system that comprises the internal combustion engine and the air-fuel ratio manipulating means. The control processing means sequentially generates the target air-fuel ratio for converging the estimated value generated by the estimating means to the target value for the output signal from the $O_2$ sensor, for thereby compensating for the effect of the dead time. The response delay of the internal combustion engine of the system that comprises the internal combustion engine and the air-fuel ratio manipulating means can be compensated for by the air-fuel ratio manipulating means. Accordingly, the estimated value for the output signal from the $O_2$ sensor after the total dead time is determined using the output signals from the air-fuel ratio sensor and the $O_2$ sensor according to an algorithm constructed based on a model representing the behavior of the exhaust system including the response delay of the exhaust system.

In the above air-fuel ratio control system, the exhaust system including the exhaust gas purifier can be considered as a plant for generating the output signal of the $O_2$ sensor from the air-fuel ratio of the internal combustion engine as detected by the air-fuel ratio sensor (the output signal from the air-fuel ratio sensor). The internal combustion engine can be regarded as an actuator for generating an exhaust gas having an air-fuel ratio as an input to the plant. The air-fuel ratio sensor and the $O_2$ sensor can be regarded as detecting means for detecting the input and output, respectively, of the plant.

For making the exhaust gas from the internal combustion engine cleaner, the catalytic converter as the exhaust gas purifier may be increased in size or the exhaust gas purifier may comprise a plurality of joined catalytic converters.

In such a system, however, since the exhaust system including the exhaust gas purifier as the object to be controlled by the control processing means has a long dead time and the behavior of the exhaust system tends to be complex, it is difficult for the estimated value for the output signal from the $O_2$ sensor as generated by the estimating means to have a sufficient level of accuracy. Therefore, the stability and quick response of the control process for converging the output of the $O_2$ sensor to the target value is reduced, and the catalytic converter between the air-fuel ratio sensor and the $O_2$ sensor fails to perform a sufficient exhaust gas purifying capability.

The above drawbacks are not limited to the exhaust system including the exhaust gas purifier, but occurs in a system that controls the operation of an actuator to control the output of a plant, which is generated from an input generated by the actuator, at a certain target value, if the plant has a long dead time.

SUMMARY OF THE INVENTION

It is therefore an object of the present invention to provide a plant control system which is capable of controlling the output of a plant having a long dead time well at a predetermined target value.

It is another object of the present invention to provide a plant control system having a plant for generating an output from an input generated by an actuator successively through a first partial plant and a second partial plant, and a detecting means for detecting the output of the plant, for manipulating an output of the actuator in order to converge an output of the detecting means (the detected value of the output of the plant) to a predetermined target value, the plant control system being capable of converging the output of the detecting means well to the target value while properly compensating for the effect of a dead time of the plant even if the dead time is long.

Still another object of the present invention is to provide a plant control system having an exhaust gas purifier which comprises a first catalytic converter and a second catalytic converter arranged successively downstream in the exhaust passage of an internal combustion engine, and an exhaust gas sensor such as an $O_2$ sensor disposed downstream of the exhaust gas purifier, for controlling the air-fuel ratio of the internal combustion engine in order to converge an output of the exhaust gas purifier to a predetermined target value.

Prior to describing the present invention, the technical meaning of some terms used in the present invention will first be described below.

According to the present invention, a plant control system serves to control a plant for generating an output from a certain input successively through a first partial plant and a second partial plant. The first partial plant and the second partial plant, which jointly make up the plant, may be of separate structures in appearance, but may also be of an integral structure in appearance. Most plants which are of a single structure in appearance generate an intermediate entity (including a substance or a physical quantity) in the process of generating an output from an input thereto. Such a plant includes a portion for generating the intermediate entity from the input and a portion for generating the final output of the plant from the intermediate entity. The former portion corresponds to the first partial plant and the latter portion to the second partial plant. According to the present invention, furthermore, each of the first partial plant and the second partial plant may comprises a plurality of partial plants.

A plant control system according to the present invention will be described below.

To achieve the above objects, the plant control system according to the present invention is available in two aspects to be described below.

According to a first aspect of the present invention, a plant control system for controlling a plant for generating an output from an input successively through a first partial plant and a second partial plant, comprises an actuator for generating an input to said plant, first detecting means for detecting an output from said plant, second detecting means for detecting an output from said first partial plant, which is generated by said first partial plant depending on the input to said plant, third detecting means for detecting the input to said plant, first control processing means for sequentially generating data representing a target value for an output of said second detecting means which is required to converge an output of said first detecting means to a predetermined target value, according to a feedback control process, second control processing means for sequentially generating data representing a target input to said plant which is required to converge the output of said second detecting means to the target value for the output of said second detecting means which is represented by the data generated by said first control processing means, according to a feedback control process, actuator control means for manipulating an output of said actuator into the target input to said plant which is represented by the data generated by said second control processing means, first estimating means for sequentially generating data representing an estimated value for the output of said first detecting means after a dead time of said second partial plant, using the outputs of said first and second detecting means, and second estimating means for sequentially generating data representing an estimated value for the output of said second detecting means after a total dead time which is the sum of a dead time of said first partial plant and a dead time of a system which comprises said actuator control means and said actuator, using the outputs of said second and third detecting means, said first control processing means comprising means for generating data representing the target value for the output of said second detecting means, using the data generated by said first estimating means, and said second control processing means comprising means for generating data representing the target input to said plant, using the data generated by said second estimating means.

In the first aspect, of the first and second partial plants, the second partial plant serves as an object to be controlled by the first control processing means. The first control processing means sequentially generates data representing a target value for an output of said second detecting means (=a target value for an output of said first detecting means) which is a control input to be given to the second partial plant to converge an output of said first detecting means, which is indicative of a detected value of an output of the plant (which is also an output of the second partial plant), to a predetermined target value, according to a feedback control process.

The control processing means generates data representing the target value for the output of said second detecting means, using the data generated by said first estimating means as representing the estimated value for the output of the first detecting means, so that it is possible to generate the target value for the output of said second detecting means while compensating for the effect of the dead time of the second partial plant.

The dead time of the second partial plant is short as compared with the dead time of the plant as a whole. The data representing the estimated value for the output of the first detecting means after the dead time of the second partial plant may be generated in view of response delay characteristics of the second plant only which is part of the plant. Therefore, the accuracy of the estimated value for the output of the first detecting means as represented by the data generated by the first estimating means can be increase. As a consequence, the first control processing means can generate the data representing the target value for the output of said second detecting means (the target input to the second plant) which is suitable for converging the output of the first detecting means (the detected value of the output of the plant) while appropriately compensating for the effect of the dead time of the second partial plant.

The second control processing means has the first partial plant as an object to be controlled. The second control processing means sequentially generates data representing a target input to said plant (=a target input to the first partial plant) which as a control input to be given to the first partial plant to converge the output of said second detecting means, which represents a detected value of the output of the first partial plant (which is also an input to the second partial plant) to the target value which is represented by the data generated by said first control processing means, according to a feedback control process.

The second control processing means generates data representing the target input to said plant, using the data generated by said second estimating means, i.e., the data representing the estimated value for the output of the second detecting means after a total dead time which is the sum of the dead time of said first partial plant and the dead time of a system comprising said actuator control means and said actuator (which is a system for generating an actual input to the plant (=an actual input to the first partial plant) from the data representing the target input to the plant generated by the second control processing means). Thus, it is possible to generate the data representing the target input while compensating for the effect of the dead time of the system comprising said actuator control means and said actuator (which may hereinafter be referred to as a system for manipulating an input to the first partial plant), as well as the effect of the dead time of the first partial plant.

The dead time of the first partial plant is short as compared with the dead time of the plant as a whole. Since the effect of a response delay of a system for generating an input to the first partial plant, particularly the actuator included therein, can be compensated for by the actuator control means, the data representing the estimated value for the output of the second detecting means after the total dead time may be generated in view of the response delay characteristics of the first partial plant only without taking into account the response delay of the system for generating an input to the first partial plant.

Consequently, the accuracy of the estimated value for the output of the second detecting means as represented by the data generated by the second estimating means can be increased. As a result, the second control processing means can generate the data representing the target input to said plant which is appropriate for converging the output of said second detecting means, which represents the detected value of the output of the first partial plant, to the target value which is represented by the data generated by said first control processing means, while appropriately compensating for the effect of the dead time of the system for generating an input to the first partial plant in addition to the dead time of the first partial plant. Since the data generated by the first control processing means as representing the target value for the output of the second detecting means (the target input to the second partial plant) is adequate for converging the output of the first detecting means (the detected value of the output of the plant) to its target value, the data representing the target input to the plant which is generated by the second control processing means is also adequate for converging the output of the first detecting means to its target value.

According to the present invention, the process of generating the target input to the plant is performed by the first control processing means which carries out a control process for the second partial plant and the second control processing means which carries out a control process for the first partial plant. Therefore, the effect of disturbances on the entire plant can be distributed to and absorbed by the first control processing means and the second control processing means.

According to the first aspect of the present invention, therefore, even if the overall plant has a long dead time, it is possible to well converge the output of the first detecting means which detects the output of the plant to the target value while compensating for the effect of the dead time of the overall plant.

According to a second aspect of the present invention, a plant control system for controlling a plant for generating an output from an input successively through a first partial plant and a second partial plant, comprises an actuator for generating an input to said plant, first detecting means for detecting an output from said plant, second detecting means for detecting an output from said first partial plant, which is generated by said first partial plant depending on the input to said plant, third detecting means for detecting the input to said plant, first control processing means for sequentially generating data representing a target value for an output of said second detecting means which is required to converge an output of said first detecting means to a predetermined target value, according to a feedback control process, second control processing means for sequentially generating data representing a target input to said plant which is required to converge the output of said second detecting means to the target value for the output of said second detecting means which is represented by the data generated by said first control processing means, according to a feedback control process, actuator control means for manipulating an output of said actuator into the target input to said plant which is represented by the data generated by said second control processing means, first estimating means for sequentially generating data representing an estimated value for the output of said first detecting means after a first total dead time which is the sum of the dead time of said second partial plant and the dead time of a system comprising said second control processing means, said actuator control means, said actuator, and said first partial plant, using the outputs of said first and second detecting means, and second estimating means for sequentially generating data representing an estimated value for the output of said second detecting means after a second total dead time which is the sum of the dead time of said first partial plant and the dead time of a system comprising said actuator control means and said actuator, using the outputs of said second and third detecting means, said first control processing means comprising means for generating data representing the target value for the output of said second detecting means, using the data generated by said first estimating means, and said second control processing means comprising means for generating data representing the target input to said plant, using the data generated by said second estimating means.

The plant control system according to the second aspect differs from the plant control system according to the first aspect in that the first estimating means generates data representing an estimated value for the output of said first detecting means after a first total dead time which is the sum of the dead time of said second partial plant and the dead time of a system comprising said second control processing means, said actuator control means, said actuator, and said first partial plant (which is a system for generating an actual output of the second detecting means (the detected value of an actual input to the second partial plant) from the data representing the target value for the output of the second detecting means (the target input to the second partial plant) generated by the first control processing means), and the first control processing means generates data representing a target value for the output of the second detecting means (a target input to the second partial plant). Other details of the plant control system according to the second aspect are the same as those of the plant control system according to the first aspect.

According to the second aspect of the present invention, the first control processing means which has the second partial plant as an object to be controlled generates the data representing the target value for the output of the second detecting means using the data generated by the first estimating means as representing the estimated value for the output of the first detecting means after the first total dead time. It is therefore possible to generate the data representing the target value for the output of the second detecting means (the target input to the second partial plant) while compensating for the effect of the dead time of the system comprising said second control processing means, said actuator control means, said actuator, and said first partial plant (which may hereinafter be referred to as a system for generating an input to the second partial plant), as well as the effect of the dead time of the second partial plant.

Though the dead time of the system for generating an input to the second partial plant is relatively long, the effect of response delays of the actuator and the first partial plant included in this system can be compensated for by the actuator control means and the second control processing means, respectively. Therefore, the data representing the estimated value for the output of the first detecting means after the first total dead time may be generated in view of the response delay characteristics of the second partial plant only without taking into account the response delay of the system for generating an input to the second partial plant. Thus, if the dead time of the second partial plant is relatively short, then the accuracy of the estimated value for the output of the first detecting means after the first total dead time as represented by the data generated by the first estimating means can be kept at a sufficient level. As a result, the first control processing means can generate the data representing the target value for the output of the second detecting means (the target input to said second partial plant) which is appropriate for converging the output of said first detecting means to the target value which is represented by the data generated by said first control processing means, while appropriately compensating for the effect of the dead time of the system for generating an input to the second partial plant in addition to the dead time of the second partial plant.

The second control processing means which has the first partial plant as an object to be controlled and the second estimating means associated therewith operate in the same manner and offer the same advantages as described above with respect to the first aspect of the present invention. Since the first control processing means compensates for the effect of the dead time of the system for generating an input to the second partial plant, it is possible to stabilize the feedback control process carried out by the second control processing means and give a high gain to the feedback control process. As a consequence, the quick responsiveness of the control process carried out by the second control processing means can be increased.

The effect of disturbances on the overall plant can be distributed to and absorbed by the first control processing means and the second control processing means, as with the first aspect of the present invention.

According to the second aspect of the present invention, therefore, even if the overall plant has a long dead time, it is possible to well converge the output of the first detecting means which detects the output of the plant to the target value while compensating for the effect of the dead time of the overall plant.

If the dead time of the second partial plant is relatively long, then the plant control system according to the first aspect is preferable, if the dead time of the first partial plant is relatively short, then the plant control system according to the second aspect is preferable.

In the plant control systems according to the first and second aspects, preferably, said plant comprises an exhaust system ranging from a position upstream of an exhaust gas purifier comprising a first catalytic converter and a second catalytic converter which are disposed successively downstream in an exhaust passage of an internal combustion engine, to a position downstream of the exhaust gas purifier, said exhaust system including said exhaust gas purifier, said first partial plant comprising a system ranging from the position upstream of the exhaust gas purifier to a position between said first and second catalytic converters, said second partial plant comprising a system ranging from the position between said first and second catalytic converters to the position downstream of the exhaust gas purifier, and wherein said input to the plant as detected by said third detecting means comprises an air-fuel ratio of an air-fuel mixture combusted in the internal combustion engine as said actuator for generating the exhaust gas which enters said exhaust gas purifier, said output from the plant as detected by said first detecting means comprises the concentration of a component of the exhaust gas having passed through said exhaust gas purifier, and the output of said first partial plant as detected by said second detecting means comprises the concentration of a component of the exhaust gas introduced through said first catalytic converter into said second catalytic converter.

In generating a target value for the air-fuel ratio (target air-fuel ratio) as the target input to the plant for converging the output of the first detecting means, which detects the concentration of a component (the output of the plant) in the exhaust gas having passed through the exhaust gas purifier of the plant, to the target value, and manipulating the air-fuel ratio of the internal combustion engine as the actuator to converge the output of the third detecting means (the detected value of the air-fuel ratio) to the target air-fuel ratio, if the exhaust gas purifier comprises a large-size catalytic converter or a plurality of catalytic converters, then the exhaust gas purifier has a long dead time.

In each of the first and second aspects of the present invention, the exhaust gas purifier comprises an upstream first catalytic converter and a downstream second catalytic converter, and an exhaust system associated as a plant with the first catalytic converter is referred to as the first partial plant and an exhaust system associated as a plant with the second catalytic converter is referred to as the second partial plant. The concentration of a component in the exhaust gas flowing through the first catalytic converter into the second catalytic converter is detected by the second detected means as the output of the first partial plant (=the input to the second partial plant). The first control processing means and the first estimating means generate the data representing the target value for the output of the second detecting means in order to converge the output of the first detecting means to the target value. The second control processing means and the second estimating means generate the data representing the target value air-fuel ratio which is the target input to the plant in order to converge the output of the second detecting means to its target value. The air-fuel ratio of the internal combustion engine as the actuator is manipulated to converge the output of the third detecting means (the detected value of the air-fuel ratio) to the target air-fuel ratio.

With the above arrangement, it is possible to appropriately compensate for the effects of the dead time of the first partial plant which is the exhaust system associated with the first catalytic converter and the dead time of the second partial plant which is the exhaust system associated with the second catalytic converter. Therefore, even if the overall exhaust system (plant) including the exhaust gas purifier has a long dead time, the output of the first detecting means (the detected value of the output of the plant) can well be converged to the target value while compensating the effect of the dead time. Since the output of the first detecting means, i.e., the detected value of the concentration of the component having passed through the exhaust gas purifier, can well be converged to the target value, it is possible to enable the exhaust gas purifier to perform its desired purifying capability for increasing the rate of purification of the exhaust gas emitted from the internal combustion engine.

In the case where the plant comprises the exhaust system including the exhaust gas purifier, as is apparent from the above explanation of the first partial plant and the second partial plant, the first catalytic converter and the second catalytic converter of the exhaust gas purifier may be separate from each other or integrally combined with each other. If the exhaust gas purifier comprises a single unitary catalytic converter, it may be divided into upstream and downstream portions which correspond respectively to the first catalytic converter and the second catalytic converter. If the exhaust gas purifier comprises first and second catalytic converters separate from each other, both or one of the catalytic converters may comprise a plurality of catalytic converters joined to each other. Specifically, if the exhaust gas purifier comprises a plurality of joined catalytic converters, these catalytic converters may be divided into upstream and downstream groups, and the catalytic converters belonging to the upstream and downstream groups correspond to the first catalytic converter and the second catalytic converter, respectively.

According to the first aspect of the present invention, the first control processing means comprises means for generating the data representing the target value for the output of said second detecting means in order to converge the estimated value for the output of said first detecting means after the dead time of said second partial plant, as represented by the data generated by said first estimating means, to the target value for the output of said first detecting means, and said second control processing means comprises means for generating the data representing the target input to said plant in order to converge the estimated value for the output of said second detecting means after the total dead time, as represented by the data generated by said second estimating means, to the target value for the output of said second detecting means.

According to the second aspect of the present invention, said first control processing means comprises means for generating the data representing the target value for the output of said second detecting means in order to converge the estimated value for the output of said first detecting means after the first total dead time, as represented by the data generated by said first estimating means, to the target value for the output of said first detecting means, and said second control processing means comprises means for generating the data representing the target input to said plant in order to converge the estimated value for the output of said second detecting means after the second total dead time, as represented by the data generated by said second estimating means, to the target value for the output of said second detecting means.

The first control processing means can generate the data representing the target value for the output of said second detecting means while properly compensating for the effect of the dead time of the second partial plant, and the second control processing means can generate the data representing the target input to said plant while properly compensating for the effect of the dead time of the first partial plant.

In each of the first and second aspects of the present invention, said first estimating means comprises means for generating the data representing the estimated value for the output of said first detecting means according to an algorithm constructed based on a model of said second partial plant which expresses a behavior of said second partial plant as a system for generating data representing the output of said first detecting means from data representing the output of said second detecting means with a dead time and a response delay.

Similarly, said second estimating means comprises means for generating the data representing the estimated value for the output of said second detecting means according to an algorithm constructed based on a model of said first partial plant which expresses a behavior of said first partial plant as a system for generating data representing the output of said second detecting means from data representing the output of said third detecting means with a dead time and a response delay.

Specifically, in the first aspect of the present invention, the first estimating means generates the data representing the estimated value for the output of said first detecting means after the dead time of the second partial plant. If a behavior of said second partial plant is expressed by a model including an element relative to the dead time and an element relative to the response delay, the data representing the estimated value for the output of said first detecting means can adequately be generated according to an algorithm based on the model.

In the second aspect of the present invention, the first estimating means generates the data representing the estimated value for the output of said first detecting means after the first total dead time which is the sum of the dead time of said second partial plant and the dead time of the system for generating a input to the second partial plant. Since the response delay of the system for generating a input to the second partial plant can be compensated for by the actuator control means and the second control processing means, the response delay of the system for generating a input to the second partial plant does not need to be taken into account in generating the data representing the estimated value for the output of said first detecting means after the first total dead time. In the second aspect, therefore, it is possible to properly generate the data representing the estimated value for the output of said first detecting means according to the algorithm based on the model which includes the element relative to the dead time and the element relative to the response delay and expresses the behavior of the second partial plant.

As with the first estimating means of the plant control system according to the second aspect of the present invention, with respect to the second estimating means in either one of the first and second aspects, the response delay of a system comprising the actuator control means and the actuator (which may hereinafter be referred to as a system for generating an input to the first partial plant) can be compensated for by the actuator control means. Consequently, the response delay of the system for generating a input to the first partial plant does not need to be taken into account in generating the data representing the estimated value for the output of said second detecting means after the total dead time which is the sum of the dead time of the system for generating an input to the first partial plant and the dead time of the first partial plant. Therefore, it is possible to properly generate the data representing the estimated value for the output of said second detecting means according to the algorithm based on the model which includes the element relative to the dead time and the element relative to the response delay and expresses the behavior of the first partial plant.

While the model of the second partial plant and the model of the first partial plant can be constructed as respective continuous-time systems, they should preferably be constructed as respective discrete-time systems for performing the processing of the first estimating means and the second estimating means according to computer-based processing.

In this case, the model of the second partial plant may comprise a model (so-called autoregressive model) which expresses the output of the first detecting means in each control cycle with the output of the first detecting means and the output of the second detecting means in a control cycle prior to the control cycle.

Similarly, the model of the first partial plant may comprise a model (so-called autoregressive model) which expresses the output of the second detecting means in each control cycle with the output of the second detecting means and the output of the third detecting means in a control cycle prior to the control cycle.

In the second aspect of the present invention, the first total dead time is longer than the dead time of the second partial plant in generating the data representing the estimated value for the output of the first detecting means after the first total dead time according to the algorithm based on the above model of the second partial plant. Therefore, in order to generate the data representing the estimated value, a future value of the output of the second detecting means is formally required (in some cases, a future value of the output of the second detecting means may not be required depending on the dead time of the system for generating an input to the second partial plant and the period of control cycles of the first control processing means).

With respect to the second estimating means, similarly, in order to generate the data representing the estimated value for the output of the second detecting means after the total dead time which is the sum of the dead time of the first partial plant and the dead time of the system for manipulating an input to the first partial plant, according to the algorithm based on the model of the first partial plant, a future value of the output of the third detecting means is formally required (in some cases, a future value of the output of the third detecting means may not be required depending on the dead time of the system for generating an input to the first partial plant and the period of control cycles of the second control processing means).

As described above, the response delay of the system for generating a input to the second partial plant can be compensated for by the actuator control means and the second control processing means. Thus, the system for generating a input to the second partial plant can be recognized as a system in which the actual output of the second detecting means after the dead time of the system (which is a future value of the output) is in agreement with the target value for the output of the second detecting means as represented by the data generated by the first control processing means. Therefore, the future value of the output of the second detecting means can be replaced with the target value for the output of the second detecting means as represented by the data generated by the first control processing means.

Similarly, the system for generating a input to the first partial plant can be recognized as a system in which the actual output of the third detecting means after the dead time of the system (which is the actual detected value of the input to the plant) is in agreement with the target input to the plant as represented by the data generated by the second control processing means. Therefore, the future value of the output of the third detecting means can be replaced with the target input to the plant as represented by the data generated by the second control processing means.

With respect to the future value of the output of the second detecting means, the estimated value for the output of the second detecting means after the second total dead time as represented by the data generated by the second estimating means is the future value of the output of the second detecting means. If the actual output of the second detecting means agrees with the estimated value after the second total dead time, then the future value of the output of the second detecting means can be replaced with the estimated value for the output of the second detecting means after the second total dead time as represented by the data generated by the second estimating means.

According to the second aspect of the present invention, said first estimating means comprises means for generating the data representing the estimated value for the output of said first detecting means, using outputs prior to the present of said second and third detecting means and the target value for the output of said second detecting means as represented by the data generated by said first control processing means, on the assumption that an actual output of said second detecting means after the dead time of a system (a system for generating an input to the second partial plant) which comprises said second control processing means, said actuator control means, and said actuator, and said first partial plant is equal to the target value for the output of said second detecting means as represented by the data generated by said first control processing means.

Alternatively, said first estimating means comprises means for generating the data representing the estimated value for the output of said first detecting means, using outputs prior to the present of said second and third detecting means and the estimated value for the output of said second detecting means as represented by the data generated by said second estimating means, on the assumption that an actual output of said second detecting means after said second total dead time is equal to the estimated value for the output of said second detecting means as represented by the data generated by said second estimating means.

In either one of the first and second aspects of the present invention, said second estimating means comprises means for generating the data representing the estimated value for the output of said second detecting means, using outputs prior to the present of said second and third detecting means and the target input to said plant as represented by the data generated by said second control processing means, on the assumption that an actual output of said third detecting means after the dead time of a system (a system for manipulating an input to the first partial plant) which comprises said actuator control means and said actuator is equal to the target input to said plant as represented by the data generated by said second control processing means.

In order to generate the data representing the estimated value for the output of the first detecting means after the first total dead time, the first estimating means according to the first aspect uses the target value for the output of the second detecting means as represented by the data generated by the first control processing means or the estimated value for the output of the second detecting means as represented by the data generated by the second estimating means, in addition to the outputs prior to the present of the first and second detecting means. The first estimating means can thus properly generate the data representing the estimated value for the output of the first detecting means after the first total dead time.

Similarly, in either one of the first and second aspects of the present invention, in order to generate the data representing the estimated value for the output of the second detecting means after the total dead time which is the sum of the dead time of the first partial plant and the dead time of the system for manipulating an input to the first partial plant, the second estimating means uses the target input to the plant as represented by the data generated by the second control processing means, in addition to the outputs prior to the present of the second and third detecting means.

As described above, in the first and second aspects of the present invention which generate the data representing the estimated value for the output of the first detecting means according to the algorithm based on the model of the second partial plant, the model of the second partial plant should preferably comprise a model which expresses the behavior of said second partial plant using the difference between the output of said second detecting means and a predetermined reference value therefor as the data representing the output of said second detecting means, and the difference between the output of said first detecting means and a predetermined reference value therefor as the data representing the output of said first detecting means.

Similarly, for generating the data representing the estimated value for the output of the second detecting means according to the algorithm based on the model of the first partial plant, said model of the first partial plant should preferably comprise a model which expresses the behavior of said first partial plant using the difference between the output of said third detecting means and a predetermined reference value therefor as the data representing the output of said third detecting means, and the difference between the output of said second detecting means and a predetermined reference value therefor as the data representing the output of said second detecting means.

In the model of the second partial plant, the differences with respective predetermined reference values are used as the data representing the output of the second detecting means which corresponds to the input to the second partial plant and the data representing the output of the first detecting means which corresponds to the output of the second partial plant. In this manner, the algorithm for generating the data representing the estimated value for the output of the first detecting means is simplified and can be constructed with ease. The accuracy of the estimated value for the output of the first detecting means can be increased.

Similarly, in the model of the first partial plant, the differences with respective predetermined reference values are used as the data representing the output of the third detecting means which corresponds to the input to the first partial plant and the data representing the output of the second detecting means which corresponds to the output of the first partial plant. In this manner, the algorithm for generating the data representing the estimated value for the output of the second detecting means is simplified and can be constructed with ease. The accuracy of the estimated value for the output of the second detecting means can be increased.

When the model of the second partial plant and the model of the first partial plant are constructed as described above, the data generated by the first estimating means represents the difference between the estimated value for the output of the first detecting means and the predetermined reference value therefor. Similarly, the data generated by the second estimating means represents the difference between the estimated value for the output of the second detecting means and the predetermined reference value therefor.

The model of the second partial plant can be constructed using the outputs of the first and second detecting means per se. Similarly, the model of the first partial plant can be constructed using the outputs of the second and third detecting means per se.

In either one of the first and second aspects of the present invention, if the first estimating means generates the data representing the estimated value for the output of the first detecting means according to the algorithm based on the model of the second partial plant, then the plant control system preferably further comprises identifying means for sequentially identifying parameters to be established of said model of the second partial plant, using the outputs of said first and second detecting means.

Similarly, if the second estimating means generates the data representing the estimated value for the output of the second detecting means according to the algorithm based on the model of the first partial plant, then the plant control system preferably further comprises identifying means for sequentially identifying parameters to be established of said model of the first partial plant, using the outputs of said second and third detecting means.

With the parameters of the model of the second partial plant and the model of the first partial plant being sequentially identified, these models can be in accord with actual behavioral states of the second partial plant and the first partial plant. Hence, the accuracy of the estimated values for the outputs of the first and second detecting means as represented by the data generated by the first and second estimating means according to the algorithms based on these models can be increased. As a result, the effects of the dead times of the second partial plant and the first partial plant can be compensated for more reliably.

If the model of the first partial plant is expressed as an autoregressive model of discrete-time system, then the parameters to be established of the model are coefficients relative to the outputs of the second and third detecting means in the model.

Similarly, if the model of the second partial plant is expressed as an autoregressive model of discrete-time system, then the parameters to be established of the model are coefficients relative to the outputs of the first and second detecting means in the model.

In each of the first and second aspects of the present invention, said feedback control process carried out by said first control processing means preferably comprises a response-indicating-type control process.

Similarly, the feedback control process carried out by said second control processing means preferably comprises a response-indicating-type control process.

The response-indicating-type control process is a control process which is capable of indicating a damping rate of the difference between a controlled quantity (which is the output of the first detecting means for the first control processing means and the output of the second detecting means for the second control processing means) and its target value, depending on the value of a given parameter used in the control process. By using the response-indicating-type control process as the feedback control process carried out by the first control processing means and the second control processing means, it is possible for the first control processing means and the second control processing means to perform their control processes while avoiding interference therebetween.

The response-indicating-type control process may be a sliding mode control process, an ILQ control process (response-indicating-type optimum control process), etc. Preferably, the response-indicating-type control process comprises a sliding mode control process.

For either one of the first control processing means and the second control processing means, the sliding mode control process preferably comprises an adaptive sliding mode control process.

The sliding mode control process generally has high control stability against disturbances. If the data representing the target for the output of the second detecting means and the data representing the target input to the plant are generated according to the sliding mode control process, then the generated data are highly reliable, and the output of the first detecting means can be converged to the target value with high stability.

The adaptive sliding mode control process incorporates an adaptive control law (adaptive algorithm) for minimizing the effect of a disturbance, in the normal sliding mode control process. Therefore, the data representing the target value for the output of the second exhaust gas sensor generated by the first control processing means and the data representing the target air-fuel ratio generated by the second control processing means are made highly reliable. More specifically, the sliding mode control process uses a function referred to as a switching function constructed using the difference between a controlled quantity (the outputs of the first and second detecting means in this invention) and its target value, and it is important to converge the value of the switching function to "0". According to the normal sliding mode control process, a control law referred to as a reaching control law is used to converge the value of the switching function to "0". However, due to the effect of a disturbance, it may be difficult in some situations to provide sufficient stability in converging the value of the switching function to "0" only with the reaching control law. According to the adaptive sliding mode control process, in order to converge the value of the switching function to "0" while minimizing the effect of disturbances, the adaptive control law (adaptive algorithm) is used in addition to the reaching control law. By generating the data representing the target value for the output of the second detecting means and the data representing the target input to the plant according to the adaptive sliding mode control process, it is possible to converge the value of the switching function highly stably to "0". The data representing the target value for the output of the second detecting means and the data representing the target input to the plant can be generated in order to converge the output of the first detecting means and the output of the second detecting means highly stably to their target values. As a result, the control process of converging the output of the first detecting means to the target value with high stability.

If the feedback control process is carried out by the first control processing means as the sliding mode control process (the adaptive sliding mode control process), then it is preferable to use, as the switching function, a liner function having variables representing a plurality of time-series data of the difference between the output of the first detecting means and its target value. Similarly, if the feedback control process is carried out by the second control processing means as the sliding mode control process, then it is preferable to use, as the switching function, a liner function having variables representing a plurality of time-series data of the difference between the output of the second detecting means and its target value.

If the feedback control processes are carried out by the first and second control processing means as the sliding mode control process, then models of the first and second partial plants are required which serve as objects to be controlled by the control processes. The models of the first and second partial plants should preferably be the same model as the models used by the first and second estimating means. In those models, the data representing the target value for the output of the second detecting means which is generated by the first control processing means represents the difference between the target value and a predetermined reference value with respect to the output of the second detecting means, for example, and the data representing the target input to the plant represents the difference between the target value and a predetermined reference value with respect to the input to the plant (a reference value for the output of the third detecting means), for example.

If the feedback control process is carried out by the first control processing means as the sliding mode control process, as described above, then the plant control system should preferably further comprise means for determining the stability of a process for converging the output of said first detecting means to said predetermined target value according to the sliding mode control process, said second control processing means comprising means for generating the data representing the target input to said plant with the target value for the output of said second detecting means being a predetermined value, if said process for converging the output of said first detecting means to said predetermined target value is judged as being unstable.

Specifically, if said process carried out by the first control processing means according to the sliding mode control process for converging the output of said first detecting means to said predetermined target value is judged as being unstable, then the data representing the target value for the output of the second detecting means which is generated by the first control processing mans is low in reliability. According to the present invention, therefore, in such situations, the second control processing means generates the data representing the target input to the plant in order to converge the output of the second detecting means to the predetermined value. In this manner, it is possible to keep a certain level of performance of the plant. If the process for converging the output of said first detecting means to said predetermined target value is judged as being stable, then it is possible to keep a sufficient level of performance of the plant.

If the plant comprises the exhaust system including the exhaust gas purifier associated with the internal combustion engine, then even if the process for converging the output of said first detecting means to said predetermined target value is judged as being unstable, the first catalytic converter disposed upstream of the exhaust gas purifier is able to provide a good exhaust gas purifying capability. If the process for converging the output of said first detecting means to said predetermined target value is judged as being stable, the exhaust gas purifier as a whole is capable of performing its purifying capability at a sufficient level.

Inasmuch as it is important to converge the value of the switching function to "0" according to the sliding mode control process, as described above, it is possible to determine the stability of the process carried out by the first control processing means for converging the output of said first detecting means to said predetermined target value, based on the value of the switching function. For example, it is possible to determine whether the process of converging the output of said first detecting means to said predetermined target value is unstable or stable depending on whether the product of the value of the switching function and its rate of change (corresponding to the time-differentiated value of a Lyapunov function relative to the switching function) is a positive value or a negative value, for example.

If the plant comprises the exhaust system including the exhaust gas purifier associated with the internal combustion engine, then the first detecting means generally comprises an exhaust gas sensor for generating an output depending on the concentration of a certain component of the exhaust gas having passed through said second catalytic converter when the exhaust gas sensor is activated. The second control processing means comprises means for determining whether said first detecting means is activated or not, and means for generating the data representing the target input to said plant with the target value for the output of said second detecting means being a predetermined value, if said first detecting means is judged as being inactivated.

If the first detecting means (the exhaust gas sensor) is not sufficiently activated as immediately after the internal combustion engine has started to operate, then since the reliability of the output of the first detecting means is low, the reliability of the data representing the target value for the output of the second detecting means which is generated by the first control processing means is also low. Therefore, if the plant comprises the exhaust system including the exhaust gas purifier associated with the internal combustion engine, then as when the process of converging the output of the first detecting means according to the sliding mode control process carried out by the first control processing means is judged as being unstable, the second control processing means generates the data representing the target input to the plant in order to converge the output of the second detecting means to the predetermined value. Therefore, at least the first catalytic converter disposed upstream of the exhaust gas purifier is able to provide a good exhaust gas purifying capability. After the first detecting means is activated, the exhaust gas purifier as a whole is capable of performing its purifying capability at a sufficient level.

In either one of the first and second aspects of the present invention, said feedback control process carried out by said first control processing means preferably has a feedback gain smaller than the feedback gain of said feedback control process carried out by said second control processing means.

At least one of said feedback control processes carried out by said first and second control processing means preferably comprises a response-indicating-type control process.

With the feedback gains of the first and second control processing means being thus established, the feedback control processes carried out by said first and second control processing means are prevented from interfering with each other, and the stability of the control process for converging the output of the first detecting means to the target value can be increased. If both or one of the feedback control processes of the first and second control processing means comprises a response-indicating-type control process, then the above feedback gains can be established.

If the plant comprises the exhaust system including the exhaust gas purifier associated with the internal combustion engine, then in order to optimize the purifying capability of the exhaust gas purifier, each of the first and second detecting means preferably comprises an $O_2$ sensor (oxygen concentration sensor), and the target value for the output of the first detecting means is preferably of a given constant value.

If the plant comprises the exhaust system including the exhaust gas purifier associated with the internal combustion engine, then a component detected by the first detecting means and a component detected by the second detecting means may not necessarily be the same as each other, but may basically be of such a nature that their concentrations are correlated to each other.

Preferably, the actuator control means controls the output of the actuator for converging the output of the third detecting means (the detected value of the input to the plant) to the target input to the plant according to a feedback control process carried out by a recursive controller, e.g., an adaptive controller. Specifically, if the output of the actuator (=the input to the plant) is manipulated into the target input to the plant according to the feedback control process carried out by a recursive controller, e.g., an adaptive controller, then the output of the actuator can be manipulated into the target input to the plant with a high ability to follow dynamic changes such as changes in the behavioral state or characteristic changes of the actuator.

The recursive controller determines a new control input according to a recursive formula including a predetermined number of time-series data prior to the present of the control input for manipulating the output of the actuator.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

A plant control system according to an embodiment of the present invention will be described below with reference to FIGS. 1 through 19. According to this embodiment, the plant control system is a system for controlling a plant which comprises an exhaust system including an exhaust gas purifier disposed in the exhaust passage of an internal combustion engine.

Figure 1:
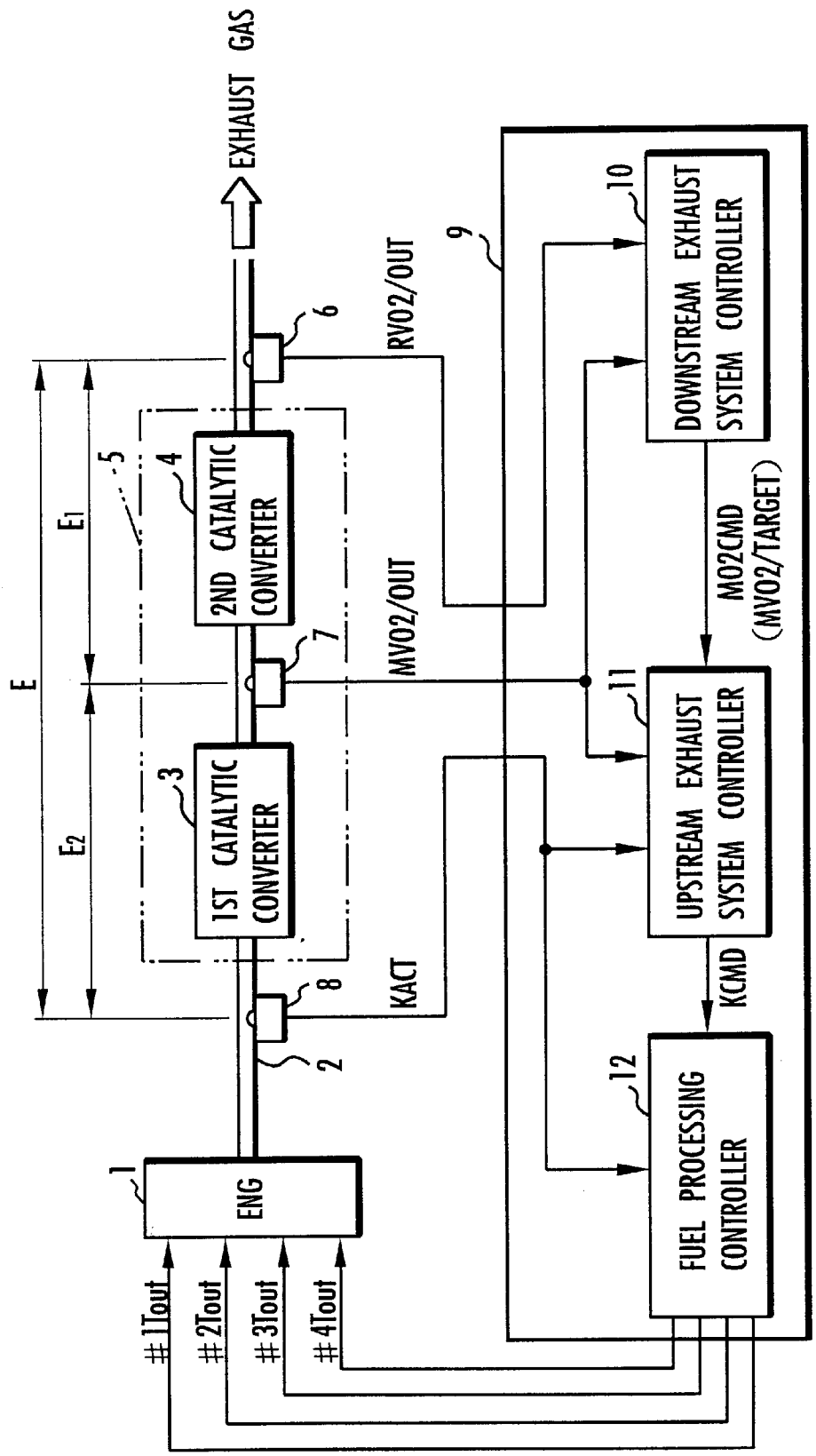
FIG. 1 is a block diagram of a plant control system according to an embodiment of the present invention.

FIG. 1 shows in block form the plant control system according to the embodiment of the present invention. In FIG. 1, a four-cylinder engine (internal combustion engine) 1 is mounted as a vehicle propulsion source on a motor vehicle or a hybrid vehicle. Exhaust gases generated from the internal combustion engine 1 when an air-fuel mixture is combusted in the cylinders are collected by a common exhaust pipe 2 (exhaust passage) near the internal combustion engine 1, and discharged from the exhaust pipe 2 into the atmosphere. The exhaust pipe 2 has a first catalytic converter 3 and a second catalytic converter 4, each comprising a three-way catalytic converter, which are disposed successively downstream for purifying the exhaust gas. The first and second catalytic converters 3, 4 jointly make up an exhaust gas purifier 5.

In FIG. 1, the first and second catalytic converters 3, 4 are shown as being separate from each other. However, the exhaust pipe 2 may have a single catalytic converter assembly which incorporates the first and second catalytic converters 3, 4 positioned upstream and downstream, respectively, and integrally combined with each other. Each of the first and second catalytic converters 3, 4 may comprise a plurality of joined catalytic converters. The internal combustion engine 1 corresponds to an actuator.

The plant control system according to the present invention basically controls the air-fuel ratio of the internal combustion engine 1 ((more precisely, the air-fuel ratio of a mixture of fuel and air to be combusted in the internal combustion engine 1) for enabling the exhaust gas purifier 5 to have an optimum purifying capability. In order to control the air-fuel ratio of the internal combustion engine 1, the plant control system has an $O_2$ sensor 6 (oxygen concentration sensor, hereinafter referred to as "downstream $O_2$ sensor 6") as a first detecting means mounted on the exhaust pipe 2 downstream of the second catalytic converter 4, an $O_2$ sensor 7 (hereinafter referred to as "upstream $O_2$ sensor 7") as a second detecting means mounted on the exhaust pipe 2 between the first and second catalytic converters 3, 4, an air-fuel ratio sensor 8 as a third detecting means mounted on the exhaust pipe 2 upstream of the first catalytic converter 3, specifically at a position where the exhaust gases from the cylinders of the internal combustion engine 1 are collected, and a control unit 9 for performing a control process based on outputs (detected values) from the sensors 6–8.

The control unit 9 is supplied with, in addition to the outputs from the sensors 6–8, outputs from various sensors, representative of the rotational speed of the internal combustion engine 1, the intake pressure (the pressure in an intake pipe), the coolant temperature, etc. for detecting operating conditions of the internal combustion engine 1.

Figure 2:
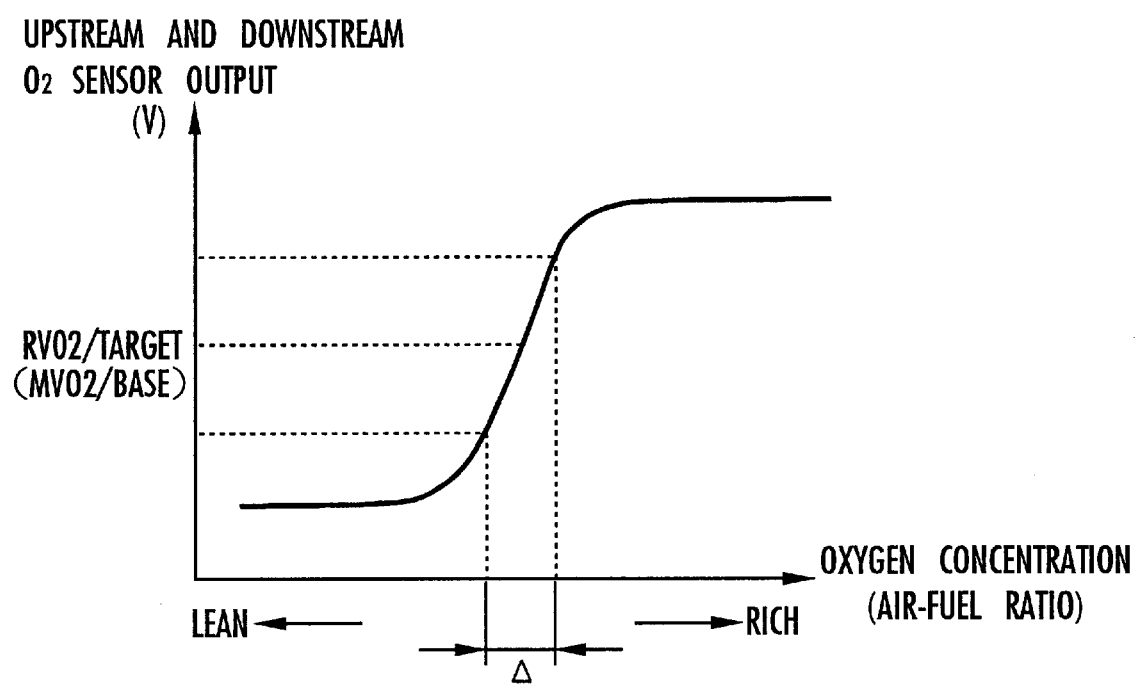
FIG. 2 is a diagram showing output characteristics of an $O_2$ sensor used in the plant control system shown in FIG. 1.

Each of the downstream and upstream $O_2$ sensors 6, 7 comprises an ordinary $O_2$ sensor. The downstream and upstream $O_2$ sensors 6, 7 generate respective outputs RVO2/OUT, MVO2/OUT having levels depending on oxygen concentrations in the exhaust gas that has passed through the second catalytic converter 4 and the first catalytic converter 3, respectively, i.e., generate respective outputs RVO2/OUT, MVO2/OUT representative of the detected values of oxygen concentrations in the exhaust gas. Since the oxygen concentration in the exhaust gas flowing through the exhaust pipe 2 basically depends on the air-fuel ratio of the air-fuel ratio combusted by the internal combustion engine 1, the outputs RVO2/OUT, MVO2/OUT from the downstream and upstream $O_2$ sensors 6, 7 also depend on the air-fuel ratio of the air-fuel ratio combusted by the internal combustion engine 1. Specifically, the outputs RVO2/OUT, MVO2/OUT from the downstream and upstream $O_2$ sensors 6, 7 will change with high sensitivity in substantial proportion to the oxygen concentration in the exhaust gas, with the air-fuel ratio corresponding to the oxygen concentration in the exhaust gas being in a range $\Delta$ close to a stoichiometric air-fuel ratio, as shown in FIG. 2. At oxygen concentrations corresponding to air-fuel ratios outside of the range $\Delta$, the outputs RVO2/OUT, MVO2/OUT from the downstream and upstream $O_2$ sensors 6, 7 are saturated, i.e., substantially constant.

The air-fuel ratio sensor 8 generates an output KACT representing the detected value of an air-fuel ratio (the air-fuel ratio of an air-fuel mixture combusted by the internal combustion engine 1) recognized by the oxygen concentration in the exhaust gas that flows into the exhaust gas purifier 5. The air-fuel ratio sensor 8 comprises a wide-range air-fuel ratio sensor described in detail in Japanese laid-open patent publication No. 4-369471 and U.S. Pat. No. 5,391,282, for example, and generates an output having a level proportional to the oxygen concentration in the exhaust gas in a wider range of oxygen concentrations than the $O_2$ sensors 6, 7. Stated otherwise, the air-fuel ratio sensor 8 (hereinafter referred to as "LAF sensor 8") generates an output KACT having a level proportional to the air-fuel ratio corresponding to the oxygen concentration in the exhaust gas in a wide range of air-fuel ratios.

The control unit 9 basically performs a control process for manipulating the air-fuel ratio of the internal combustion engine 1 to converge (set) the output RVO2/OUT of the downstream $O_2$ sensor 6 to a predetermined target value RVO2/TARGET (constant value, see FIG. 2) in order to enable the exhaust gas purifier 5 to have an optimum exhaust gas purifying capability. Stated otherwise, the plant control system according to the present embodiment enables the exhaust gas purifier 5, which comprises the first and second catalytic converters 3, 4, to have an optimum exhaust gas purifying capability irrespective of aging of these catalytic converters 3, 4, at the air-fuel ratio of the internal combustion engine 1 which sets the output RV2/OUT of the downstream $O_2$ sensor 6 disposed downstream of the second catalytic converter 4 to a predetermined constant value. To this end, the control unit 9 employs the target value RVO2/TARGET for the output RV2/OUT of the downstream $O_2$ sensor 6 as the above predetermined constant value, and performs a control process for manipulating the air-fuel ratio of the internal combustion engine 1 to converge the output RV2/OUT of the downstream $O_2$ sensor 6 to the target value RVO2/TARGET.

The control unit 9 for carrying out the above control process comprises a microcomputer. The control unit 9 performs functions which basically include a controller 10 (hereinafter referred to as "downstream exhaust system controller 10") for executing, in predetermined control cycles, a process of generating data MO2CMD representative of a target value MVO2/TARGET for the output MVO2/OUT of the upstream $O_2$ sensor 7, which is required to converge the output RVO2/OUT of the downstream $O_2$ sensor 6 to the target value RVO2/TARGET, a controller 11 (hereinafter referred to as "upstream exhaust system controller 11") for executing, in predetermined control cycles, a process of generating a target air-fuel ratio KCMD for the internal combustion engine 1 (which is also a target value for the output KACT of the LAF sensor 8), which is required to converge the output MVO2/OUT of the upstream $O_2$ sensor 7 to the target value MVO2/TARGET, and a controller 12 (hereinafter referred to as "fuel processing controller 12") for executing, in predetermined control cycles, a process of determining a command value #nTout (n=1, 2, 3, 4) for the fuel injection quantity (fuel supply quantity) for each of the cylinders of the internal combustion engine 1 in order to manipulate the air-fuel ratio of the internal combustion engine 1 into the target air-fuel ratio KCMD.

The downstream exhaust system controller 10 and the upstream exhaust system controller 11 correspond respectively to a first control processing means and a second control processing means, and the fuel processing controller 12 corresponds to an actuator control means.

As described in detail later on, the data MO2CMD generated by the downstream exhaust system controller 10 is not the target value MVO2/TARGET for the output MVO2/OUT of the upstream $O_2$ sensor 7, per se, but is the difference between the target value MVO2/TARGET and a predetermined reference value (a target value for the difference between the output MVO2/OUT of the upstream $O_2$ sensor 7 and the predetermined reference value).

The control cycles in which the controllers 10–12 perform their processes will be described below.

As described in detail later on, the downstream exhaust system controller 10 controls an exhaust system (indicated by E1 in FIG. 1) ranging from the upstream $O_2$ sensor 7 to the downstream $O_2$ sensor 6 and including the second catalytic converter 4 in the exhaust pipe 2, i.e., a system (hereinafter referred to as "downstream exhaust system E1") for generating the output RVO2/OUT of the downstream $O_2$ sensor 6 from the output MVO2/OUT of the upstream $O_2$ sensor 7. The downstream exhaust system controller 10 carries out the process of generating the data MO2CMD representative of the target value MVO2/TARGET for the output MVO2/OUT of the upstream $O_2$ sensor 7 (the oxygen concentration detected by the upstream $O_2$ sensor 7) as an input (so-called control input) to be given to the downstream exhaust system E1 for converging the output RVO2/OUT of the downstream $O_2$ sensor 6 (the oxygen concentration detected by the downstream $O_2$ sensor 6), as an output generated by the downstream exhaust system E1, to the target value RVO2/TARGET, while compensating for the dead time of the downstream exhaust system E1, behavioral changes of the downstream exhaust system E1, etc. In this embodiment, each of the control cycles in which the downstream exhaust system controller 10 performs its process has a period, e.g., 30 to 100 ms, predetermined in view of the dead time, the processing load, etc.

As described in detail later on, the upstream exhaust system controller 11 controls an exhaust system (indicated by E2 in FIG. 1) ranging from the LAF sensor 8 to the upstream $O_2$ sensor 7 and including the first catalytic converter 3 in the exhaust pipe 2, i.e., a system (hereinafter referred to as "upstream exhaust system E2") for generating the output MVO2/OUT of the upstream $O_2$ sensor 7 from the output KACT of the LAF sensor 8 (the air-fuel ratio detected by the LAF sensor 8). The upstream exhaust system controller 11 carries out the process of generating the target value KCMD for the internal combustion engine 1 (the target value for the air-fuel ratio detected by the LAF sensor 8 or the output KACT of the LAF sensor 8) as a control input to be given to the upstream exhaust system E2 for converging the output MVO2/OUT of the upstream $O_2$ sensor 7 (the oxygen concentration detected by the upstream $O_2$ sensor 7), as an output generated by the upstream exhaust system E2, to the target value MVO2/TARGET, while compensating for the dead time of the upstream exhaust system E2, behavioral changes of the upstream exhaust system E2, etc. In this embodiment, each of the control cycles in which the upstream exhaust system controller 11 performs its process has a period predetermined in view of the dead time, the processing load, etc.

The process performed by the fuel processing controller 12 for determining the command value #nTout (n=1, 2, 3, 4) (hereinafter referred to as "output fuel injection quantity #nTout") for the fuel injection quantity (fuel supply quantity) for each of the cylinders of the internal combustion engine 1 is required to be synchronous with the rotational speed of the internal combustion engine 1 or specifically combustion cycles of the internal combustion engine 1. Therefore, the control cycles of the process performed by the fuel processing controller 12 are of a period in synchronism with a crankshaft angle period (so-called TDC) of the internal combustion engine 1.

In this embodiment, the downstream and upstream exhaust system controllers 10, 11 operate in the same control cycles for performing their processes in synchronism with each other. The period of the control cycles of the downstream and upstream exhaust system controllers 10, 11 is longer than the crankshaft angle period (TDC) of the internal combustion engine 1.

The downstream exhaust system E1 and the upstream exhaust system E2 correspond respectively to the first partial plant and the second partial plant. The plant to be controlled by the plant control system corresponds to a system which comprises a combination of the downstream exhaust system E1 and the upstream exhaust system E2, i.e., a system E (hereinafter referred to as "overall exhaust system E") for generating the output RVO2/OUT of the downstream $O_2$ sensor 6 from the output MVO2/OUT of the upstream $O_2$ sensor 7.

The downstream exhaust system controller 10, the upstream exhaust system controller 11, and the fuel processing controller 12 will be described in greater detail below.

The downstream exhaust system controller 10 sequentially generates in predetermined control cycles (of a constant period) the data MO2CMD representative of the target value MVO2/TARGET for the output MVO2/OUT of the upstream $O_2$ sensor 7, more specifically, the target value for the difference between the output MVO2/OUT of the upstream $O_2$ sensor 7 and the predetermined reference value, which is required to converge the output RVO2/OUT of the downstream $O_2$ sensor 6 to the target value RVO2/TARGET, according to a sliding mode control process which is a feedback control process, more specifically, an adaptive sliding mode control process. While performing the above control process, the downstream exhaust system controller 10 compensates for the effects of the dead time and response delay of the downstream exhaust system E1 to be controlled, and the dead time of a system comprising the upstream exhaust system controller 11, the fuel processing controller 12, the internal combustion engine 1, and the upstream exhaust system E2, and behavioral changes of the downstream exhaust system E1, etc.

In order to carry out the above control process, the downstream exhaust system E1 is regarded as a system for generating the difference RVO2 between the output RVO2/OUT of the downstream $O_2$ sensor 6 and the target value RVO2/TARGET as its reference value (RVO2=RVO2/OUT−RVO2/TARGET, hereinafter referred to as "differential output RVO2") from the difference MVO2 between the output MVO2/OUT of the upstream $O_2$ sensor 7 and a predetermined reference value MVO2/BASE therefor (MVO2=MVO2/OUT−MVO2/BASE, hereinafter referred to as "differential output MVO2"), and the behavior of this system is modeled in advance. Specifically, the input given to the downstream exhaust system E1 is regarded as the differential output MVO2 of the upstream $O_2$ sensor 7, and the output generated by the downstream exhaust system E1 depending on the input is regarded as the differential output RVO2 of the downstream $O_2$ sensor 6, and a model is constructed to express the behavior of the downstream exhaust system E1 using the differential outputs MVO2, RVO2.

In this embodiment, the reference value MVO2/BASE for the output MVO2/OUT of the upstream $O_2$ sensor 7 is a constant value which is the same as the target value RVO2/TARGET for the output RVO2/OUT of the downstream $O_2$ sensor 6 (MVO2/BASE=RVO2/TARGET, see FIG. 2).

The model which expresses the behavior of the downstream exhaust system E1 (hereinafter referred to as "downstream exhaust system model") is represented by a discrete-time system model (more specifically, an autoregressive model having a dead time in the differential output MOV2 as an input to the downstream exhaust system E1) according to the following equation (1):

$$RVO2(k+1)=ar1 \cdot RVO2(k)+ar2 \cdot RVO2(k-1)+br1 \cdot MVO2(k-dr1) \quad (1)$$

where "k" represents the number of a discrete-time control cycle of the downstream exhaust system controller 10, and "dr1" the number of control cycles of the downstream exhaust system controller 10 which represents the dead time present in the downstream exhaust system E1, i.e., the time required until the output MVO2/OUT or the differential output MVO2 of the upstream $O_2$ sensor 7 in each control cycle is reflected in the output RVO2/OUT or the differential output RVO2 of the downstream $O_2$ sensor 6. In present embodiment, the dead time dr1 of the downstream exhaust system model is set to a predetermined constant value which is equal to or slightly longer than the actual dead time of the downstream exhaust system E1.

The first and second terms of the right side of the equation (1) represent respective elements of a response delay of the downstream exhaust system E1, the first term being a primary autoregressive term and the second term being a secondary autoregressive term. In the first and second terms, "ar1", "ar2" represent respective gain coefficients of the primary autoregressive term and the secondary autoregressive term. Stated otherwise, these gain coefficients "ar1", "ar2" are coefficients relative to the differential output RVO2 of the downstream $O_2$ sensor 6 as an output of the downstream exhaust system E1 in the downstream exhaust system model.

The third term of the right side of the equation (1) represents an element relative to the dead time dr1 of the downstream exhaust system E1, and more precisely expresses the differential output MVO2 of the upstream $O_2$ sensor 7 as an input to the downstream exhaust system E1, including the dead time dr1 of the downstream exhaust system E1. In the third term, "br1" represents a gain coefficient relative to the element, or stated otherwise a gain coefficient relative to the differential output MVO2 of the upstream $O_2$ sensor 7 as an input to the downstream exhaust system E1.

The gain coefficients "ar1", "ar2", "br1" are parameters which are to be set (identified) to certain values in defining the behavior of the downstream exhaust system model, and are sequentially identified by an identifier which will be described later on.

In the downstream exhaust system model expressed as the discrete time system according to the equation (1), the differential output RVO2(k+1) of the downstream $O_2$ sensor 6 as an output of the downstream exhaust system E1 in each control cycle of the downstream exhaust system controller 10 is expressed by a plurality of (two in this embodiment) differential outputs RVO2(k), RVO2(k−1) (more specifically, a differential output RVO2(k) in a 1st control cycle prior to the present control cycle and a differential output RVO2(k−1) in a 2nd control cycle prior to the present control cycle) in past control cycles prior to the control cycle and a differential output MVO2(k−dr1) of the upstream $O_2$ sensor 7 as an input to the downstream exhaust system E1 prior to the dead time dr1 of the downstream exhaust system E1.

The downstream exhaust system controller 10 basically carries out, in predetermined control cycles (of a constant period), a processing sequence (algorithm) constructed base on the downstream exhaust system model expressed by the equation (1) for sequentially generating a target value MO2CMD for the differential output MVO2 of the upstream $O_2$ sensor 7 (MO2CMD=MOV2/TARGET−MVO2/BASE, hereinafter referred to as "target differential output MO2CMD") as a control input to be given to the downstream exhaust system E1 in order to converge the output RVO2/OUT of the downstream $O_2$ sensor 6 to the target value RVO2/TARGET, i.e., to converge the differential output RVO2 to "0", and supplies the target differential output MO2CMD to the upstream exhaust system controller 11. To carry out the above processing sequence, the downstream exhaust system controller 10 has a functional arrangement shown in FIG. 3.

Figure 3:
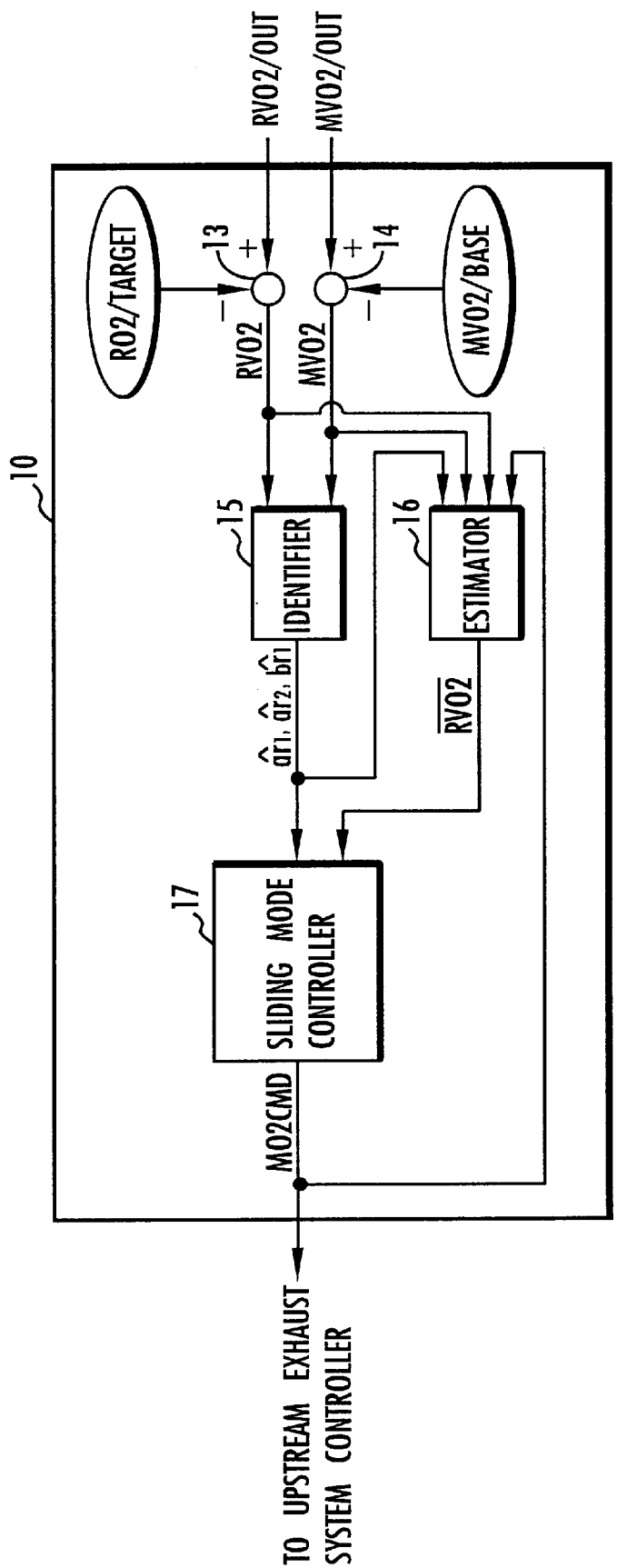
FIG. 3 is a block diagram showing a basic arrangement of a downstream exhaust system controller in the plant control system shown in FIG. 1.

As shown in FIG. 3, the downstream exhaust system controller 10 has a subtractor 13 for subtracting the target value RVO2/TARGET from the output RVO2/OUT of the downstream $O_2$ sensor 6 to sequentially calculate the differential output RVO2 of the downstream $O_2$ sensor 6, a subtractor 14 for subtracting the reference value MVO2/BASE (=RVO2/TARGET) from the output MVO2/OUT of the upstream $O_2$ sensor 7 to sequentially calculate the differential output MVO2 of the upstream $O_2$ sensor 7, and an identifier 15 (identifying means) for sequentially calculating identified values ar1 hat, ar2 hat, br1 hat of the gain coefficients ar1, ar2, br1 (hereinafter referred to as "identified gain coefficients ar1 hat, ar2 hat, br1 hat") that are parameters to be established for the downstream exhaust system model. The downstream exhaust system controller 10 also has an estimator 16 (first estimating means) for sequentially determining an estimated value RVO2 bar of the differential output RVO2 from the downstream $O_2$ sensor 6 (hereinafter referred to as "estimated differential output RVO2 bar") as data representing an estimated value (predicted value) of the output RVO2/OUT from the downstream $O_2$ sensor 6 after a total dead time dr (=dr1+dr2) which is the sum of the dead time dr1 of the downstream exhaust system E1 and the dead time dr2 of a system which comprises the upstream exhaust system controller 11, the fuel processing controller 12, the internal combustion engine 1, and the upstream exhaust system E2 (such a system will hereinafter be referred to as "system for generating an input to the downstream exhaust system E1"). The downstream exhaust system controller 10 further includes a sliding mode controller 17 for sequentially determining the target differential output MO2CMD as data representing the target value MVO2/TARGET for the output MVO2/OUT of the upstream $O_2$ sensor 7, which is required to converge the output RVO2/OUT of the downstream $O_2$ sensor 6 to the target value MVO2/TARGET, according to the adaptive sliding mode control process.

The algorithm of a processing sequence to be carried out by the identifier 15, the estimator 16, and the sliding mode controller 17 is constructed as follows:

The identifier 15 serves to sequentially calculates on a real-time basis the identified gain coefficients ar1 hat, ar2 hat, br1 hat in order to minimize a modeling error of the downstream exhaust system E1, and carries out its identifying process as follows:

The identifier 15 determines, in each of the control cycles of the downstream exhaust system controller 10, the value of a differential output RVO2(k) of the downstream $O_2$ sensor 6 in the present control cycle on the downstream exhaust system model (hereinafter referred to as "identified differential output RVO2(k) hat") according to the equation (2) shown below, using the values of the identified gain coefficients ar1(k−1) hat, ar2(k−1) hat, br1(k−1) hat determined in the preceding control cycle, the data of past values of the differential output RVO2 from the downstream $O_2$ sensor 6 as calculated by the subtractor 13 (more specifically, the differential output RVO2(k−1) in a 1st control cycle prior to the present control cycle and the differential output RVO2 (k−2) in a 2nd control cycle prior to the present control cycle), and the data of a past value of the differential output MVO2 from the upstream $O_2$ sensor 7 as calculated by the subtractor 14 (more specifically, the differential output MVO2(k−dr1−1) in a (dr1+1)th control cycle prior to the present control cycle.

$$R\hat{V}O2(k)=\hat{ar1}(k-1)\cdot RVO2(k-1)+\hat{ar2}(k-1)\cdot RVO2(k-2)+\hat{br1}(k-1)\cdot MVO2(k-dr1-1) \quad (2)$$

The equation (2) corresponds to the equation (1) expressing the downstream exhaust system model, as shifted into the past by one control cycle with the gain coefficients ar1, ar2, br1 being replaced with the respective identified gain coefficients ar1 hat (k−1), ar2 hat (k−1), br1 hat (k−1). The value of the dead time dr1 of the downstream exhaust system E1 in the third term of the equation (2) represents a preset value (constant value) as described above.

If vectors Θr, ξr defined by the following equations (3), (4) are introduced (the letter T in the equations (3), (4) represents a transposition), then the equation (2) is expressed by the equation (5):

$$\Theta r^T(k)=[\hat{ar1}(k)\hat{ar2}(k)\hat{br1}(k)] \quad (3)$$

$$\xi r^T(k)=[RVO2(k-1)\ RVO2(k-2)\ MVO2(k-dr1-1)] \quad (4)$$

$$R\hat{V}O2(k)=\Theta r^T(k-1)\cdot\xi r(k) \quad (5)$$

The identifier 15 also determines a difference id/er between the identified differential output RVO2(k) hat determined by the equation (2) or (5) and the present differential output RVO2 from the downstream $O_2$ sensor 6, as representing a modeling error of the downstream exhaust system model with respect to the actual downstream exhaust system E1 (the difference id/er will hereinafter be referred to as "identified error id/er"), according to the following equation (6):

$$id/er(k)=RVO2(k)-R\hat{V}O2(k) \quad (6)$$

The identifier 15 further determines new identified gain coefficients ar1(k) hat, ar2(k) hat, br1(k) hat, stated otherwise, a new vector Θr(k) having these identified gain coefficients as elements (hereinafter the new vector Θr(k) will be referred to as "identified gain coefficient vector Θr"), in order to minimize the identified error id/er, according to the equation (7) given below. That is, the identifier 15 varies the identified gain coefficients ar1(k−1) hat, ar2(k−1) hat, br1(k−1) hat determined in the preceding control cycle by a quantity proportional to the identified error id/er for thereby determining the new identified gain coefficients ar1(k) hat, ar2(k) hat, br1(k) hat.

$$\Theta r(k)=\Theta r(k-1)+K\theta r(k)\cdot id/er(k) \quad (7)$$

where KΘr represents a cubic vector determined by the following equation (8), i.e., a gain coefficient vector for determining a change depending on the identified error id/er of the identified gain coefficients ar1 hat, ar2 hat, br1 hat:

$$K\theta r(k)=\frac{\Pr(k-1)\xi r(k)}{1+\xi r^T(k)\cdot \Pr(k-1)\cdot\xi r(k)} \quad (8)$$

where Pr represents a cubic square matrix determined by a recursive formula expressed by the following equation (9):

$$\Pr(k)=\frac{1}{\lambda r1}\left[I-\frac{\lambda r2\cdot\Pr(k-1)\cdot\xi r(k)\cdot\xi r^T(k)}{\lambda r1+\lambda r2\cdot\xi r^T(k)\cdot\Pr(k-1)\cdot\xi r(k)}\right]\cdot\Pr(k-1) \quad (9)$$

where I represents a unit matrix.

In the equation (9), $\lambda r1$, $\lambda r2$ are established to satisfy the conditions $0<\lambda r1\leq 1$ and $0\leq\lambda r2<2$, and an initial value Pr(0) of Pr represents a diagonal matrix whose diagonal components are positive numbers.

Depending on how $\lambda r1$, $\lambda r2$ in the equation (9) are established, any one of various specific algorithms including a fixed gain method, a degressive gain method, a method of weighted least squares, a method of least squares, a fixed tracing method, etc. may be employed. According to the present embodiment, a method of least squares ($\lambda r1=\lambda r2=1$), for example, is employed.

Basically, the identifier 15 sequentially updates and determines in each control cycle the identified gain coefficients ar1 hat, ar2 hat, br1 hat of the downstream exhaust system model in order to minimize the identified error id/er according to the above algorithm (the processing sequence of a sequential method of least squares). Through this processing, it is possible to sequentially obtain the identified gain coefficients ar1 hat, ar2 hat, br1 hat which match the actual downstream exhaust system E1 on a real-time basis.

The above algorithm is the basic algorithm that is carried out by the identifier 15. The identifier 15 performs additional processes such as a limiting process, on the identified gain coefficients ar1 hat, ar2 hat, br1 hat in order to determine them. Such additional processes of the identifier 15 will be described later on.

The estimator 16 sequentially determines in each control cycle the estimated differential output RVO2 bar which is an estimated value of the differential output RVO2 from the downstream O₂ sensor 6 after the total dead time dr (=dr1+dr2) in order to compensate for the effect of the dead time dr1 of the downstream exhaust system E1 and the effect of the dead time dr2 of the system for generating an input to the downstream exhaust system E1 for the calculation of the target differential output MO2CMD with the sliding mode controller 17 as described in detail later on.

The dead time dr2 of the system for generating an input to the upstream exhaust system E1 (input generating system), i.e., the system which comprises the upstream exhaust system controller 11, the fuel processing controller 12, the internal combustion engine 1, and the upstream exhaust system E2, will be described below. The input generating system is significant as a system in which the downstream exhaust system controller 10 generates the actual differential output MVO2 of the upstream O₂ sensor 7 from the target differential output MO2CMD of the upstream O₂ sensor 7 as generated by the sliding mode controller 17 which will be described in detail later on. The dead time dr2 of the input generating system is a time required until the target differential output MO2CMD generated in each control cycle by the downstream exhaust system controller 10 is reflected in the actual differential output MVO2 of the upstream O₂ sensor 7. The dead time dr2 is generally the sum of the dead time of a system which comprises the fuel processing controller 12 and the internal combustion engine 1, and the dead time of the upstream exhaust system E2, and is longer as the rotational speed of the internal combustion engine 1 is lower. In this embodiment, the dead time dr2 of the input generating system is preset to a certain constant value (expressed by the number of control cycles) which is equal to or slightly longer than the actual dead time of the input generating system in a low rotational speed range of the internal combustion engine 1, e.g., an idling rotational speed of the internal combustion engine 1.

An algorithm for determining the estimated value for the differential output RVO2 of the downstream O₂ sensor 6 after the total dead time dr which is the sum of the dead time dr2 and the dead time dr1 of the downstream exhaust system E1, i.e., the estimated differential output RVO2 bar, is constructed as follows:

The total dead time dr is the dead time of a system comprising the downstream exhaust system E1 and the input generating system therefor. Therefore, in order to determine the estimated differential output RVO2 bar, it is necessary to take into account the response delay of the downstream exhaust system E1 and the response delay of the input generating system, particularly, the response delays of the upstream exhaust system E2 and the internal combustion engine 1 which is included in the input generating system. Because the response delay of the upstream exhaust system E2 and the response delay of the internal combustion engine 1 can be compensated for respectively by the upstream exhaust system controller 11 and the fuel processing controller 10 which will be described in detail later on, the downstream exhaust system controller 10 does not need to take into account the response delay of the input generating system. From the standpoint of the downstream exhaust system controller 10, therefore, the input generating system, i.e., the system for generating an input to the downstream exhaust system E1, may be regarded as a system in which the differential output MVO2(k) of the upstream O₂ sensor 7 as the output of the input generating system in each control cycle is in agreement with the target differential output MO2CMD(k−dr2) which the downstream exhaust system controller 10 gives to the upstream exhaust system controller 11 before the dead time dr2, as indicated by the following equation (10):

$$MVO2(k)=MO2CMDd(k-dr2) \tag{10}$$

At this time, by using the equation (1) of the downstream exhaust system model which expresses the behavior of the downstream exhaust system including the elements relative to its response delay, the estimated differential output RVO2 (k+dr) bar which is an estimated value for the differential output RVO2(k+dr) of the downstream O₂ sensor 6 after the total dead time dr in each control cycle can be expressed using time-series data RVO2(k), RVO2(k−1) of the differential output RVO2 of the downstream O₂ sensor 6 and time-series data MVO2(k+dr2−j) (=MVO2(k−dr1+dr−j), j=1, 2, . . . , dr) of the differential output MVO2 of the upstream sensor 7, according to the following equation (11):

$$\overline{RVO2}(k+dr) = ar1 \cdot RVO2(k) + ar2 \cdot RVO2(k-1) + \sum_{j=1}^{dr} \beta r(j) \cdot MVO2(k+dr2-j) \tag{11}$$

where
ar1=the first-row, first-column element of $Ar^{dr}$,
ar2=the first-row, second-column element of $Ar^{dr}$,
βr(j)=the first-row elements of $Ar^{j-1} \cdot Br$ (j=1, 2, . . . , dr)

$$Ar = \begin{bmatrix} ar1 & ar2 \\ 1 & 0 \end{bmatrix}$$

$$Br = \begin{bmatrix} br1 \\ 0 \end{bmatrix}$$

In the equation (11), the coefficients ar1, ar2 relative to the time-series data RVO2(k), RVO2(k−1) of the differential output RVO2 represent the first-row, first-column element and the first-row, second-column element of the drth power $Ar^{dr}$ (dr: total dead time) of the matrix Ar defined as described above with respect to the equation (11) (the matrix including the gain coefficients ar1, ar2 as elements), and the coefficient βr(j) (j=1, 2, . . . , dr) relative to the time-series data MVO2(k+dr2−j) of the differential output MVO2 represents the first-row elements of the product $Ar^{j-1} \cdot Br$ of the (j−1)th power $Ar^{j-1}$ (j=1, 2, . . . , dr) of the matrix Ar and the vector Br defined as described above (the matrix including the gain coefficient br1 as an element).

These coefficients ar1, ar2, and βr(j) (j=1, 2, . . . , dr) can be determining as the values of the gain coefficients ar1, ar2, br1, using the identified gain coefficients ar1 hat, ar2 hat, br1 hat which are calculated by the identifier 15 as described above.

The time-series data RVO2(k), RVO2(k−1) of the differential output RVO2.in the equation (11) are present and preceding values, respectively, of the differential output RVO2 calculated by the subtractor 13 in each control cycle.

The time-series data MVO2(k+dr2−j) (j=1, 2, . . . , dr) of the differential output MVO2 of the upstream O₂ sensor 7 in the equation (11), i.e., MVO2(k), . . . , MVO2(k−1), MVO2 (k−dr1), are calculated by the subtractor 14 prior to the present control cycle if the dead time dr2 of the system for generating an input to the downstream exhaust system E1 is dr2=1, i.e., if the dead time dr2 of the input generating system is about the same as the period of control cycles of the downstream exhaust system controller 10. In this case, the coefficients ar1, ar2, and βr(j) (j=1, 2, . . . , dr) can be determining using the latest identified gain coefficients ar1 hat, ar2 hat, br1 hat which are calculated by the identifier 15, and the estimated differential output RVO2(k+dr) bar can be determined in each control cycle according to the equation (11), using the time-series data RVO2(k), RVO2(k−1) prior to the present time of the differential output RVO2 of the downstream $O_2$ sensor 6 as calculated by the subtractor 13, and the time-series data MVO2(k), . . . , MVO2(k−1), MVO2(k−dr1) of the differential output MVO2 prior to the present time of the differential output MVO2 of the upstream $O_2$ sensor 7 as calculated by the subtractor 14.

Generally, however, the dead time dr2 of the system for generating an input to the downstream exhaust system E1 is longer than the period of the control cycles of the downstream exhaust system controller 10 (dr2≧2, e.g., dr2=12 in this embodiment). In this case, time-series data MVO2(k+dr2−j) (j=1, 2, . . . , dr) in the equation (11) includes future values MVO2(k+dr2−1), MVO2(k+1) of the differential output MVO2. While these future values MVO2(k+dr2−1), . . . , MVO2(k+1) of the differential output MVO2 cannot directly be obtained, they can be replaced with the target differential output MO2CMD for the upstream $O_2$ sensor 7 which has been generated in a past control cycle by the downstream exhaust system controller 10, according to the equation (10).

Specifically, using the equation (10), the future values MVO2(k+dr2−1), . . . , MVO2(k+1) of the differential output MVO2 are equal to the past values MO2CMD(k−1), . . . , MO2CMD(k−dr2+1), respectively, of the target differential output MO2CMD.

The estimator 16 calculates, in each control cycle, the estimated differential output RVO2(k+dr) bar according to the following equation (12), using the time-series data RVO2(k), RVO2(k−1) prior to the present time of the differential output RVO2 of the downstream $O_2$ sensor 6 as calculated by the subtractor 13, the time-series data MVO2(k), . . . , MVO2(k−1), MVO2(k−dr1) of the differential output MVO2 prior to the present time of the differential output MVO2 of the upstream $O_2$ sensor 7 as calculated by the subtractor 14, and the time-series data MO2CMD(k−1), MO2CMD(k−dr2+1) of the target differential output MO2CMD as generated in the past by the downstream exhaust system controller 10:

$$\overline{RVO2}(k+dr) = \alpha r1 \cdot RVO2(k) + \alpha r2 \cdot RVO2(k-1) + \sum_{j=1}^{dr2-1} \beta r(j) \cdot MO2CMD(k-j) + \sum_{j=dr2}^{dr} \beta r(j) \cdot MVO2(k+dr2-j)$$
(12)

where dr=dr1+dr2, dr2≧2.

The coefficients αr1, αr2, and βr(j) (j=1, 2, . . . , dr) required to calculate the equation (12) are calculated according to the definition given with respect to the equation (11), from the latest values (the values determined in the present control cycle) of the identified gain coefficients ar1 hat, ar2 hat, br1 hat calculated by the identifier 15. The dead time dr1 of the downstream exhaust system E1 and the dead time dr2 of the input generating system, which are required to calculate the equation (12), are of the values established as described above.

The above processing sequence is the basic algorithm executed by the estimator 16. The estimator 16 also calculates, in each control cycle, the estimated differential output RVO2(k+dr+1) bar of the $O_2$ sensor 6 after a time (dr+1) which is one control cycle longer than the total dead time dr. Such a calculating process will be described later on.

The sliding mode controller 17 will be described in detail below.

The sliding mode controller 17 according to the present embodiment sequentially determines, in each control cycle, the target differential output MO2CMD as a control input to be given to the downstream exhaust system E1 for converging the output RVO2/OUT of the downstream $O_2$ sensor 6 to the target value RVO2/TARGET, i.e., for converging the differential output RVO2 of the downstream $O_2$ sensor 6 to "0", according to an adaptive sliding mode control process which incorporates an adaptive control law for minimizing the effect of a disturbance, in the normal sliding mode control process. An algorithm for carrying out the adaptive sliding mode control process is constructed as follows:

A switching function required for the adaptive sliding mode control process of the sliding mode controller 17 and a hyperplane defined by the switching function (also referred to as a slip plane) will first be described below.

According to a basic concept of the sliding mode control process carried out by the sliding mode controller 17, a state quantity to be controlled (controlled quantity) is the time-series data of the differential output RVO2 of the downstream $O_2$ sensor 6 as calculated by the subtractor 13 in each control cycle, and a switching function σ1 for the sliding mode control process is defined according to the following equation (13). The switching function σ1 is defined by a linear function having as components a plurality of (two in this embodiment) time-series data RVO2(k), RVO2(k−1) prior to the present time of the differential output RVO2 of the downstream $O_2$ sensor 6, more specifically, differential outputs RVO2(k), RVO2(k−1) in the present and preceding control cycles. The vector Xr defined according to the equation (13) as a vector having the differential outputs RVO2(k), RVO2(k−1) as its components will hereinafter be referred to as a state quantity Xr.

$$\sigma 1(k) = sr1 \cdot RVO2(k) + sr2 \cdot RVO2(k-1)$$
$$= Sr \cdot Xr$$
(13)

$$\left(Sr = [sr1\ sr2],\ Xr = \begin{bmatrix} RVO2(k) \\ RVO2(k-1) \end{bmatrix}\right)$$

The coefficients sr1, sr2 relative to the components RVO2(k), RVO2(k−1) of the switching function σ1 are established in advance to meet the condition of the following equation (14):

$$-1 < \frac{sr2}{sr1} < 1$$
(14)

(when sr1 = 1, −1 < sr2 < 1)

In the present embodiment, for the sake of brevity, the coefficient sr1 is set to sr1=1 (sr2/sr1=sr2), and the coefficient sr2 (constant value) is established to satisfy the condition: −1<sr2<1.

With the switching function σ1 thus defined, the hyperplane for the sliding mode control process is defined by the equation σ1=0. Since the state quantity Xr is of the second degree, the hyperplane σ1=0 is represented by a straight line as shown in FIG. 4, and, at this time, the hyperplane is called also a switching function (A hyperplane in the sliding mode control process is often called a switching plane or a switching line depending on the degree of the phase space).

In the present embodiment, the time-series data of the estimated differential output RVO2 bar determined by the estimator 16 is actually used as the components of the switching function, as described later on.

Figure 4:
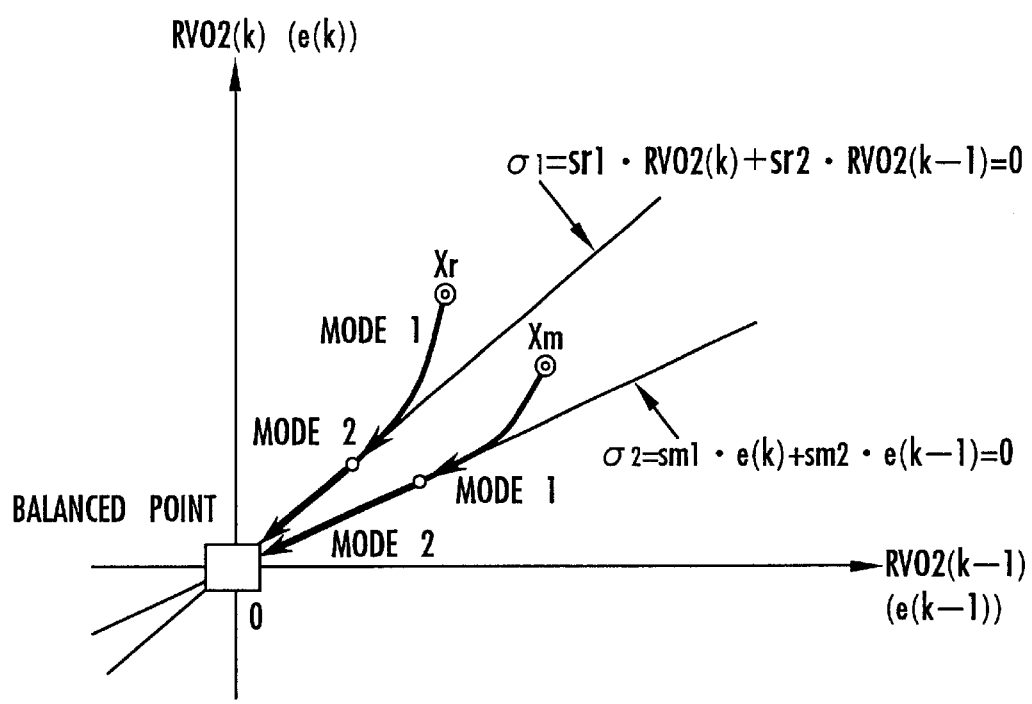
FIG. 4 is a diagram illustrative of a sliding mode control process employed by the plant control system shown in FIG. 1.

The adaptive sliding mode control process performed by the sliding mode controller 17 serves to converge the state quantity Xr=(RVO2(k), RVO2(k−1)) onto the hyperplane σ1=0 according to a reaching control law which is a control law for converging the state quantity Xr onto the hyperplane σ1=0, i.e., for converging the value of the switching function σ1 to "0", and an adaptive control law (adaptive algorithm) which is a control law for compensating for the effect of a disturbance in converging the state quantity Xr onto the hyperplane σ1=0 (mode 1 in FIG. 4). While converging the state quantity Xr onto the hyperplane σ1=0 according to an equivalent control input (holding the value of the switching function σ1 at "0"), the state quantity Xr is converged to a balanced point on the hyperplane σ1=0 where RVO2(k)=RVO2(k−1)=0, i.e., a point where time-series data RVO2/OUT(k), RVO2/OUT(k−1) of the output RVO2/OUT of the downstream $O_2$ sensor 6 are equal to the target value RVO2/TARGET (mode 2 in FIG. 4).

In the normal sliding mode control process, the adaptive control law is omitted in the mode 1, and the state quantity Xr is converged onto the hyperplane σ1=0 only according to the reaching control law.

The target differential output MO2CMD for the upstream $O_2$ sensor 7 which is to be generated by the sliding mode controller 17 for converging the state quantity Xr to the balanced point on the hyperplane σ1=0 is expressed as the sum of an equivalent control input U1eq which is an input component to be applied to the downstream exhaust system E1 according to the control law for converging the state quantity Xr onto the hyperplane σ1=0, an input U1rch (hereinafter referred to as "reaching control law input U1rch") to be applied to the downstream exhaust system E1 according to the reaching control law, and an input U1adp (hereinafter referred to as "adaptive control law input U1adp") to be applied to the downstream exhaust system E1 according to the adaptive control law (see the following equation (15)).

$$MO2CMD(k)=U1eq(k)+U1rch(k)+U1adp(k) \quad (15)$$

The equivalent control input U1eq, the reaching control law input U1rch, and the adaptive control law U1adp are determined on the basis of the downstream exhaust system model expressed by the equation (1), and the equation (10) representative of the behavior of the system for generating an input to the downstream exhaust system E1, as follows:

When the equation (10) is applied to the third term of the right side of the equation (1), the following equation (16) is obtained:

$$RVO2(k+1) = ar1 \cdot RVO2(k) + ar2 \cdot RVO2(k-1) + \quad (16)$$
$$br1 \cdot MO2CMD(k-dr1-dr2)$$
$$= ar1 \cdot RVO2(k) + ar2 \cdot RVO2(k-1) +$$
$$br1 \cdot MO2CMD(k-dr)$$

The equation (16) expresses the behavior of the system which comprises the downstream exhaust system E1 and the input generating system therefor.

The equivalent control input U1eq which is an input to be applied to the downstream exhaust system E1 for converging the state quantity Xr onto the hyperplane σ1=0 (holding the value of switching function σ1) is the target differential output MO2CMD of the upstream $O_2$ sensor 7 which satisfies the condition: σ1(k+1)=σ1(k)=0. Using the equations (13), (16), the equivalent control input U1eq which satisfies the above condition is given by the following equation (17):

$$U1eq(k) = \frac{-1}{sr1 \cdot br1} \cdot \{[sr1 \cdot (ar1-1)+sr2] \cdot RVO2(k+dr) + \quad (17)$$
$$(sr1 \cdot ar2 - sr2) \cdot RVO2(k+dr-1)\}$$

The equation (17) is a basic formula for determining the equivalent control input U1eq(k) in each control cycle.

According to present embodiment, the reaching control law input U1rch is basically determined according to the following equation (18):

$$U1rch(k) = \frac{-1}{sr1 \cdot br1} \cdot F1 \cdot \sigma1(k+dr) \quad (18)$$

Specifically, the reaching control law input U1rch(k) in each control cycle is determined in proportion to the value of the switching function σ1(k+dr) after the total dead time dr, in view of the total dead time dr which is the sum of the dead time dr1 of the downstream exhaust system E1 and the dead time dr2 of the system for generating an input to the downstream exhaust system E1.

The coefficient F1 in the equation (18) which determines the gain of the reaching control law is established to satisfy the condition expressed by the following equation (19):

$$0<F1<2 \quad (19)$$

(Preferably, 0<F1<1)

The preferable condition expressed by the equation (19) is a condition preferable to prevent the value of the switching function σ1 from varying in an oscillating fashion (so-called chattering) with respect to "0".

The adaptive control law input U1adp is basically determined according to the following equation (20) (ΔT in the equation (20) represents the period (constant value) of the control cycles of the downstream exhaust system controller 10 and the upstream exhaust system controller 11:

$$U1adp(k) = \frac{-1}{sr1 \cdot br1} \cdot G1 \cdot \sum_{i=0}^{k+dr} (\sigma1(i) \cdot \Delta T) \quad (20)$$

The adaptive control law input U1adp in each control cycle is determined in proportion to an integrated value (which corresponds to an integral of the values of the switching function σ1) over control cycles of the product of values of the switching function σ1 until after the total dead time dr and the period ΔT of the control cycles, in view of the total dead time dr.

The coefficient G1 (which determines the gain of the adaptive control law) in the equation (20) is established to satisfy the condition of the following equation (21):

$$G1 = J \cdot \frac{2-F1}{\Delta T} \quad (21)$$
$$(0 < J < 2)$$

A specific process of deriving conditions for establishing the equations (19), (21) is described in detail in Japanese patent application No. 11-93741 and U.S. patent application Ser. No. 09/153,032, and will not be described in detail below.

The target differential air-fuel ratio MO2CMD generated by the sliding mode controller 17 as a control input to be given to the downstream exhaust system E1 may basically be determined as the sum (U1eq+U1rch+U1adp) of the equivalent control input U1eq, the reaching control law input U1rch, and the adaptive control law U1adp determined according to the respective equations (17), (18), (20). However, the differential outputs RVO2(k+dr), RVO2(k+dr−1) of the downstream $O_2$ sensor 6 and the value σ1(k+dr) of the switching function σ1, etc. used in the equations (17), (18), (20) cannot directly be obtained as they are values in the future.

Therefore, the sliding mode controller 17 uses the estimated differential outputs RVO2(k+dr) bar, RVO2(k+dr−1) bar determined by the estimator 16, instead of the differential outputs RVO2(k+dr), RVO2(k+dr−1) required to calculate the equation (17), and calculates the equivalent control input U1eq(k) in each control cycle according to the following equation (22):

$$U1eq(k) = \frac{-1}{sr1 \cdot br1} \cdot \{[sr1 \cdot (ar1 - 1) + sr2] \cdot \overline{RVO2}(k + dr) + \quad (22)$$
$$(sr1 \cdot ar2 - sr2) \cdot \overline{RVO2}(k + dr - 1)\}$$

According to present embodiment, furthermore, the sliding mode controller 17 actually uses time-series data of the estimated differential output RVO2 bar sequentially determined by the estimator 16 as described as a state quantity to be controlled. The sliding mode controller 17 defines a switching function σ1 bar according to the following equation (23) (the switching function σ1 bar corresponds to time-series data of the differential output RVO2 in the equation (13) which is replaced with time-series data of the estimated differential output RVO2 bar), in place of the switching function σ1 defined by the equation (13):

$$\overline{\sigma 1}(k) = sr1 \cdot \overline{RVO2}(k) + sr2 \cdot \overline{RVO2}(k-1) \quad (23)$$

The sliding mode controller 17 calculates the reaching control law input U1rch(k) in each control cycle according to the following equation (24), using the value of the switching function σ1 bar represented by the equation (23), rather than the value of the switching function σ1 for determining the reaching control law input U1rch according to the equation (18):

$$U1rch(k) = \frac{-1}{sr1 \cdot br1} \cdot F1 \cdot \overline{\sigma 1}(k + dr) \quad (24)$$

Similarly, the sliding mode controller 17 calculates the adaptive control law input U1adp(k) in each control cycle according to the following equation (25), using the value of the switching function of bar represented by the equation (23), rather than the value of the switching function σ1 for determining the adaptive control law input U1adp according to the equation (20):

$$U1adp(k) = \frac{-1}{sr1 \cdot br1} \cdot G1 \cdot \sum_{i=0}^{k+dr} (\overline{\sigma 1}(i) \cdot \Delta T) \quad (25)$$

The latest identified gain coefficients ar1(k) hat, ar2(k) hat, br1(k) hat which have been determined by the identifier 13 are basically used as the gain coefficients ar1, ar2, br1 that are required to calculate the equivalent control input U1eq, the reaching control law input U1rch, and the adaptive control law input U1adp according to the equations (22), (24), (25).

The sliding mode controller 17 determines the sum of the equivalent control input U1eq, the reaching control law input U1rch, and the adaptive control law input U1adp determined according to the equations (22), (24), (25), as the target differential output MO2CMD (see the equation (15)). The conditions for establishing the coefficients sr1, sr2, F1, G1 used in the equations (22), (24), (25) are as described above.

The target differential output MO2CMD determined by the sliding mode controller 17 as described above signifies a control input to be given to the downstream exhaust system E1 for converging the estimated differential output RVO2 bar from the downstream $O_2$ sensor 6 to "0", and as a result, for converging the output RVO2/OUT from the downstream $O_2$ sensor 6 to the target value RVO2/TARGET.

The above process is a calculating process (algorithm) for generating the target differential output MO2CMD for the upstream $O_2$ sensor 7 in each control cycle by the sliding mode controller 17.

According to the present embodiment, in order to prevent the air-fuel ratio of the internal combustion engine 1 from varying excessively and operate the internal combustion engine 1 stably, the sliding mode controller 17 limits the target differential output MO2CMD (=U1eq+U1rch+U1adp) determined from the equivalent control input U1eq, the reaching control law input U1rch, and the adaptive control law input U1adp according to the equation (15) to a predetermined allowable range, and then gives the limited target differential output MO2CMD to the upstream exhaust system controller 11 which will be described in detail later on. Specifically, in the above limiting process, if the target differential output MO2CMD determined according to the equation (15) exceeds the upper or lower limit of the predetermined allowable range, then the sliding mode controller 17 forcibly limits the value of the target differential output MO2CMD to the upper or lower limit of the predetermined allowable range.

The target differential output MO2CMD used by the estimator 16 to determine the estimated differential output RVO2 bar according to the equation (12) is the target differential output MO2CMD thus limited as described above.

The sliding mode controller 17 also temporarily determines a target differential output MO2CMD(k+1) in the next control cycle. Such a process of temporarily determining a target differential output MO2CMD(k+1) will be described later on.

The downstream exhaust system controller 10 carries out an additional process of determining the stability of the controlled state of the output VO2/OUT of the downstream $O_2$ sensor 6 according to the adaptive sliding mode control process which is executed by the sliding mode controller 17. Such an additional process will be described later on.

The upstream exhaust system controller 11 will be described below.

The upstream exhaust system controller 11 sequentially generates in predetermined control cycles (which are the same as those of the downstream exhaust system controller 10) the target air-fuel ratio KCMD (which is also a target value for the output KACT of the LAF sensor 8) required to converge the differential output MVO2 of the upstream $O_2$ sensor 7 to the target differential output MO2CMD, i.e., to converge the output MVO2/OUT to the target value MVO2/TARGET according to the same adaptive sliding mode control process as the adaptive sliding mode control process performed by the downstream exhaust system controller 10. While performing the above control process, the upstream exhaust system controller 11 compensates for the effects of the dead time and response delay of the upstream exhaust system E2 to be controlled, and the dead time of a system comprising the fuel processing controller 12 and the internal combustion engine 1, and behavioral changes of the upstream exhaust system E2, etc.

In order to carry out the above control process, the upstream exhaust system E2 is regarded as a system for generating the differential output MVO2 (=MVO2/OUT−MVO2/BASE=MVO2/OUT−RVO2/TARGET) of the upstream $O_2$ sensor 7, from the difference kact (=KACT−FLAF/BASE, hereinafter referred to as "differential air-fuel ratio kact") between the output KACT of the LAF sensor 8 as the air-fuel ratio of the internal combustion engine 1 as detected by the LAF sensor 8 and a predetermined reference value FLAF/BASE therefor, and the behavior of this system is modeled in advance. Specifically, the input given to the upstream exhaust system E2 is regarded as the differential air-fuel ratio kact, and the output generated by the upstream exhaust system E2 depending on the input is regarded as the differential output MVO2 of the upstream $O_2$ sensor 7, and a model is constructed to express the behavior of the upstream exhaust system E2 using the differential air-fuel ratio kact and the differential output MVO2.

The reference value FLAF/BASE for the air-fuel ratio of the internal combustion engine 1 (the output KACT of the LAF sensor 8) is a predetermined constant value which is a substantially central value of the target air-fuel ratio KCMD or the actual air-fuel ratio (the output KACT of the LAF sensor 8) of the internal combustion engine 1 at the time the plant control system performs the control process of converging the output RVO2/OUT from the downstream $O_2$ sensor 6 to the target value RVO2/TARGET.

In this embodiment, as with the downstream exhaust system model, the model expressing the behavior of the upstream exhaust system E2 (hereinafter referred to as "upstream exhaust system model") is represented by a discrete-time system model (more specifically, an autoregressive model having a dead time in the differential air-fuel ratio kact as an input to the upstream exhaust system E2) according to the following equation (26):

$$MVO2(k+1) = am1 \cdot MVO2(k) + am2 \cdot MVO2(k-1) + bm1 \cdot kact(k-dm1) \quad (26)$$

where "dm1" represents the number of control cycles of the upstream exhaust system controller 11 which represents the dead time present in the upstream exhaust system E2, i.e., the time required until the air-fuel ratio or the differential air-fuel ratio kact detected by the LAF sensor 8 in each control cycle is reflected in the output MVO2/OUT or the differential output MVO2 of the upstream $O_2$ sensor 7. In the present embodiment, the dead time dm1 is set to a predetermined constant value which is equal to or slightly longer than the actual dead time of the upstream exhaust system E2.

The terms of the right side of the equation (26) and the gain coefficients am1, am2, bm1 relative to the terms have the same technical meaning as those of the downstream exhaust system model (see the equation (1) and the description related thereto), and the gain coefficients am1, am2, bm1 are sequentially identified by an identifier which will be described later on.

The upstream exhaust system controller 11 basically carries out, in predetermined control cycles (of a constant period in synchronism with the control cycles of the downstream exhaust system controller 10), a processing sequence (algorithm) constructed base on the upstream exhaust system model expressed by the equation (26) for sequentially generating a target value kcmd (which is the difference (=KCMD−FLAF/BASE) between the target air-fuel ratio KCMD and the reference value FLAF/BASE for the air-fuel ratio) for the differential air-fuel ratio kact which is to be given as a control input to the upstream exhaust system E2 in order to converge the differential output MVO2 of the upstream $O_2$ sensor 7 to the target differential output MO2CMD generated by the downstream exhaust system controller 10. The upstream exhaust system controller 11 adds the reference value FLAF/BASE for the air-fuel ratio (hereinafter referred to as "air-fuel ratio reference value FLAF/BASE") to the target value kcmd (hereinafter referred to as "target differential air-fuel ratio kcmd") to generate the target air-fuel ratio KCMD.

Figure 5:
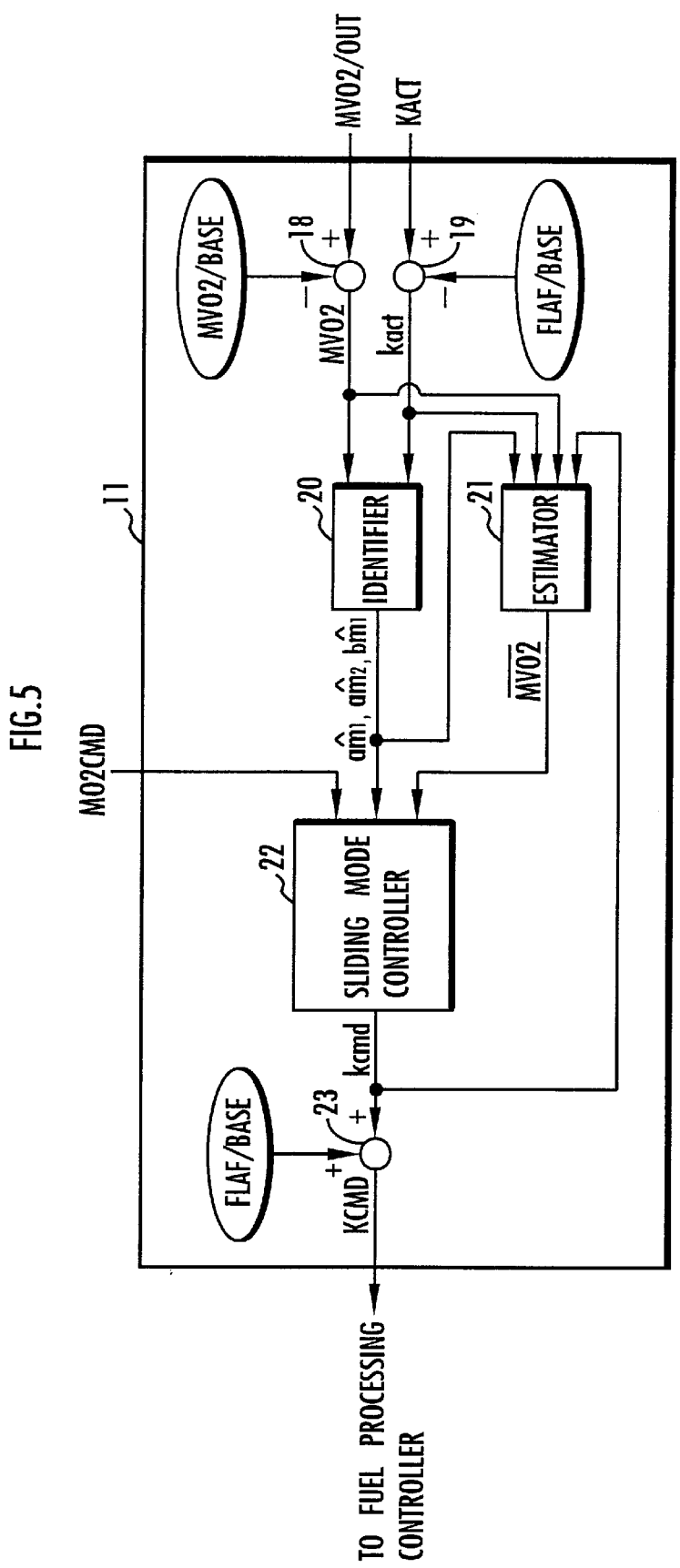
FIG. 5 is a block diagram showing a basic arrangement of an upstream exhaust system controller in the plant control system shown in FIG. 1.

To carry out the above processing sequence, the upstream exhaust system controller 11 has a functional arrangement shown in FIG. 5.

As shown in FIG. 5, the upstream exhaust system controller 11 has a subtractor 18 for subtracting the reference value MVO2/BASE (=RVO2/TARGET) from the output MVO2/OUT of the upstream $O_2$ sensor 7 to sequentially calculate the differential output MVO2 of the upstream $O_2$ sensor 7, a subtractor 19 for subtracting the air-fuel ratio reference value FLAF/BASE from the output KACT (the detected air-fuel ratio) of the LAF sensor 8 to sequentially calculate the differential air-fuel ratio kact, and an identifier 20 (identifying means) for sequentially calculating identified values am1 hat, am2 hat, bm1 hat of the gain coefficients am1, am2, bm1 (hereinafter referred to as "identified gain coefficients am1 hat, am2 hat, bm1 hat") of the upstream exhaust system model. The upstream exhaust system controller 11 also has an estimator 21 (second estimating means) for sequentially determining an estimated value MVO2 bar of the differential output MVO2 from the upstream $O_2$ sensor 7 (hereinafter referred to as "estimated differential output MVO2 bar") as data representing an estimated value (predicted value) of the output MVO2/OUT from the upstream $O_2$ sensor 7 after a total dead time dm (=dm1+dm2) which is the sum of the dead time dm1 of the upstream exhaust system E2 and the dead time dm2 of a system which comprises the fuel processing controller 12 and the internal combustion engine 1 (such a system will hereinafter be referred to as "system for generating an input to the upstream exhaust system E2"). The upstream exhaust system controller 11 further includes a sliding mode controller 22 for sequentially determining the target differential air-fuel ratio kcmd as data representing the target air-fuel ratio KCMD of the internal combustion engine 1, which is required to converge the differential output MVO2 of the upstream $O_2$ sensor 7 to the target differential output MO2CMD generated by the downstream exhaust system controller 10, i.e., to converge the output MVO2/OUT of the upstream $O_2$ sensor 7 to the target value MVO2/TARGET, according to the adaptive sliding mode control process, and an adder 23 for adding the air-fuel ratio reference value FLAF/BASE to the target differential air-fuel ratio kcmd to sequentially generate the target air-fuel ratio to be given to the fuel processing controller 12.

The differential output MVO2 of the upstream $O_2$ sensor 7 determined by the subtractor 18 is the same as the differential output MVO2 determined by the subtractor 14 of the downstream exhaust system controller 10. If the differential output MVO2 is supplied from the downstream exhaust system controller 10 to the upstream exhaust system controller 11, then the subtractor 18 of the upstream exhaust system controller 11 may be dispensed with.

The algorithm of a processing sequence to be carried out by the identifier 20, the estimator 21, and the sliding mode controller 22 is constructed as follows:

The identifier 20 sequentially calculates, on a real-time basis, the identified gain coefficients am1 hat, am2 hat, bm1 hat in order to minimize a modeling error of the upstream exhaust system model with respect to the actual upstream exhaust system E2.

The processing sequence (identifying process) of the identifier 20 is carried out as follows: The processing sequence of the identifier 20 will briefly be described below because it is the same as the processing sequence of the identifier 15 of the downstream exhaust system controller 10 as described above.

The identifier 20 determines, in each control cycle, the value of a differential output MVO2(k) of the upstream $O_2$ sensor 7 in the present control cycle on the upstream exhaust system model (hereinafter referred to as "identified differential output MVÔ2(k) hat") according to the equation (27) shown below.

$$M\hat{V}O2(k)=a\hat{m}1(k-1)\cdot MVO2(k-1)+a\hat{m}2(k-1)\cdot MVO2(k-2)+b\hat{m}1(k-1)\cdot kact(k-dm1-1) \quad (27)$$

The dead time dm1 of the upstream exhaust system E1 in the third term of the equation (27) is of a preset value (constant value) as described above.

The identifier 20 also determines the difference id/em between the identified differential output MVO2 hat and the present differential output MVO2(k) from the upstream $O_2$ sensor 7, i.e., an identified error representing a modeling error of the upstream exhaust system model with respect to the actual upstream exhaust system E2, according to the following equation (28):

$$id/em(k)=MVO2(k)-M\hat{V}O2(k) \quad (28)$$

The identifier 20 varies, in each control cycle, the identified gain coefficients am1 hat, am2 hat, bm1 hat by a quantity proportional to the identifying error id/em to determine new identified gain coefficients am1 hat, am2 hat, bm1 hat according to the following equation (29):

$$\Theta m(k)=\Theta m(k-1)+K\theta m(k)\cdot id/em(k) \quad (29)$$

In the equation (29), $\Theta m$ represents a vector defined according to the following equation (30):

$$\Theta m^T(k)=[a\hat{m}1(k) a\hat{m}2(k) b\hat{m}1(k)] \quad (30)$$

In the equation (29), $K\theta m$ represents a cubic vector determined according to the following equation (32), i.e., a gain coefficient vector for determining a change depending on the identified error id/em of the identified gain coefficients am1 hat, am2 hat, bm1 hat, using a vector $\xi m$ defined by the following equation (31):

$$\xi m^T(k) = [MVO2(k-1) MVO2(k-2) MVO2(k-dm1-1)] \quad (31)$$

$$K\theta m(k) = \frac{Pm(k-1)\xi m(k)}{1+\xi m^T(k)\cdot Pm(k-1)\cdot \xi m(k)} \quad (32)$$

were Pm represents a cubic square matrix determined by a recursive formula expressed by the following equation (33):

$$Pm(k) = \frac{1}{\lambda m1}\left[I - \frac{\lambda m2 \cdot Pm(k-1)\cdot \xi m(k)\cdot \xi m^T(k)}{\lambda m1 + \lambda m2 \cdot \xi m^T(k)\cdot Pm(k-1)\cdot \xi m(k)}\right]\cdot Pm(k-1) \quad (33)$$

where I represents a unit matrix.

In the equation (33), $\lambda m1$, $\lambda m2$ are established to satisfy the conditions $0<\lambda m1 \leq 1$ and $0 \leq \lambda m2<2$, and an initial value Pm(0) of Pm represents a diagonal matrix whose diagonal components are positive numbers.

Depending on how $\lambda m1$, $\lambda m2$ in the equation (33) are established, any one of various specific algorithms including a fixed gain method, a degressive gain method, a method of weighted least squares, a method of least squares, a fixed tracing method, etc. may be employed. According to the present embodiment, a method of least squares ($\lambda m1=\lambda m2=1$), for example, is employed.

Basically, the identifier 20 sequentially updates and determines in each control cycle the identified gain coefficients am1 hat, am2 hat, bm1 hat of the upstream exhaust system model in order to minimize the identified error id/em according to the above algorithm (the processing sequence of a sequential method of least squares).

The above algorithm is the basic algorithm that is carried out by the identifier 20.

The estimator 21 sequentially determines in each control cycle the estimated differential output MVO2 bar which is an estimated value of the differential output MVO2 from the upstream $O_2$ sensor 7 after the total dead time dm (=dm1+dm2) in order to compensate for the effect of the dead time dm1 of the upstream exhaust system E2 and the effect of the dead time dm2 of the system for generating an input to the upstream exhaust system E2 for the calculation of the target differential air-fuel ratio kcmd with the sliding mode controller 22 as described in detail later on.

The dead time dm2 of the system for generating an input to the upstream exhaust system E2 (input generating system), i.e., the system which comprises the fuel processing controller 12 and the internal combustion engine 1, will be described below. The input generating system is significant as a system which generates the actual air-fuel ratio KACT of the internal combustion engine 1 as detected by the LAF sensor 8 from the target air-fuel ratio KCMD generated by the upstream exhaust system controller 11. The dead time dm2 of the input generating system is a time required until the target air-fuel ratio KCMD generated in each control cycle by the upstream exhaust system controller 11 or its corresponding target differential air-fuel ratio kcmd is reflected in the actual air-fuel ratio detected by the LAF sensor 8 or its corresponding differential air-fuel ratio kact. The dead time dm2 is longer as the rotational speed of the internal combustion engine 1 is lower. In this embodiment, the dead time dm2 of the input generating system is preset to a certain constant value (expressed by the number of control cycles of the upstream exhaust system controller 11) which is equal to or slightly longer than the actual dead time of the input generating system in a low rotational speed range of the internal combustion engine 1, e.g., an idling rotational speed of the internal combustion engine 1.

In the present embodiment, inasmuch as the period of the control cycles of the upstream exhaust system controller 11 is the same as the period of the control cycles of the downstream exhaust system controller 10, the values of the dead time dm2 and the dead time dm1 of the upstream exhaust system E2 remain the same even when expressed by the number of control cycles of the downstream exhaust system controller 10.

In the present embodiment, the process of generating the target differential output MO2CMD with the downstream exhaust system controller 10 and the process of generating the target air-fuel ratio KCMD with the upstream exhaust system controller 11 are carried out in synchronous control cycles. Therefore, a comparison between a system which is a combination of the upstream exhaust system E2 and the system (comprising the fuel processing controller 12 and the internal combustion engine 1) for generating an input to the upstream exhaust system E2 and a system for generating an input to the downstream exhaust system controller 10, which system is a combination of the above system and the upstream exhaust system controller 11, indicates that the upstream exhaust system controller 11 which is included in only the latter system does not have a substantial dead time. Therefore, the dead time dr2 of the system for generating an input to the downstream exhaust system controller 10 and the dead time of the system which is a combination of the upstream exhaust system E2 and the system for generating an input to the upstream exhaust system E2, i.e., the total dead time dm, are set to the same value (dm=dr2).

An algorithm for determining the estimated value for the differential output MVO2 of the upstream $O_2$ sensor 7 after the total dead time dm which is the sum of the dead time dm1 of the upstream exhaust system E2 and the dead time dm2 of the system for generating an input to the upstream exhaust system E2, i.e., the estimated differential output MVO2 bar, is constructed as described below. The basic idea of this algorithm is identical to that of the estimator 16 of the downstream exhaust system controller 10, and hence will briefly be described below.

The total dead time dm is the dead time of the system which comprises the upstream exhaust system E2 and the system for generating an input to the upstream exhaust system E2. The response delay of the input generating system, particularly of the internal combustion engine 1 included therein, can be compensated for by the fuel processing controller 12. From the standpoint of the upstream exhaust system controller 11, therefore, the input generating system, i.e., the system for generating an input to the upstream exhaust system E2, may be regarded as a system in which the differential air-fuel ratio kact(k) (=KACT(k)−FLAF/BASE) as the output of the input generating system in each control cycle is in agreement with the target differential air-fuel ratio kcmd(k−dm2) (=KCMD(k−dm2)−FLAF/BASE) representing the target air-fuel ratio KCMD(d−dm2) which the upstream exhaust system controller 11 gives to the fuel processing controller 12 before the dead time dm2, as indicated by the following equation (34):

kact(k)=kcmd(k−dm2)

(KACT(k)=KCMD(k−dm2))     (34)

At this time, by using the equation (26) which expresses the upstream exhaust system model, the estimated differential output MVO2(k+dm) bar which is an estimated value for the differential output MVO2(k+dm) of the upstream $O_2$ sensor 7 after the total dead time dm in each control cycle can be expressed using time-series data MVO2(k), MVO2(k−1) of the differential output MVO2 of the upstream $O_2$ sensor 7 and time-series data kact(k+dm2−j) (=kact(k−dm1+dm−j), j=1, 2, . . . , dm) of the differential air-fuel ratio kact obtained from the output KACT of the LAF sensor 8 (the detected air-fuel ratio), according to the following equation (35):

$$\overline{MVO2}(k+dm) = \alpha m1 \cdot MVO2(k) + \alpha m2 \cdot MVO2(k-1) + \sum_{j=1}^{dm} \beta m(j) \cdot kact(k+dm2-j) \quad (35)$$

where
    $\alpha m1$=the first-row, first-column element of $Am^{dm}$,
    $\alpha m2$=the first-row, second-column element of $Am^{dm}$, $\beta m(j)$=the first-row elements of $Am^{j-1} \cdot Bm$ (j=1,2, . . . , dm)

$$Am = \begin{bmatrix} am1 & am2 \\ 1 & 0 \end{bmatrix}$$

$$Bm = \begin{bmatrix} bm1 \\ 0 \end{bmatrix}$$

In the equation (35), the coefficients $\alpha m1$, $\alpha m2$ relative to the time-series data MVO2(k), MVO2(k−1) of the differential output MVO2, and the coefficient $\beta m(j)$ (j=1, 2, . . . , dm) relative to the time-series data kact(k+dm2−j) of the differential air-fuel ratio kact are as defined with respect to the equation (35).

Generally, the dead time dm2 of the system for generating an input to the upstream exhaust system E2 is dm2≧2 (dm2=6 in this embodiment). In this case, kact(k+dm2−1), . . . , kact(k+1) of the time-series data kact(k+dm2−j) (j=1, 2, . . . , dm) of the differential air-fuel ratio kact in the equation (35) are future values of the differential air-fuel ratio kact. While these future values cannot directly be obtained from the output KACT of the LAF sensor 8, they can be replaced with the target differential output kcmd which has been generated in the past by the sliding mode controller 22 whose details will be described later on, according to the equation (34).

When the future values are replaced with the target differential output kcmd, the equation (35) is replaced with the following equation (36):

$$\overline{MVO2}(k+dm) = \alpha m1 \cdot MVO2(k) + \alpha m2 \cdot MVO2(k-1) + \quad (36)$$

$$\sum_{j=1}^{dm2-1} \beta m(j) \cdot kcmd(k-j) +$$

$$\sum_{i=dm2}^{dm} \beta m(i) \cdot kact(k+dm2-i)$$

where dm=dm1+dm2, dm2≧2.

The estimator 21 calculates, in each control cycle of the upstream exhaust system controller 11, the estimated differential output MVO2(k+dr) bar according to the above equation (36), using the time-series data MVO2(k), MVO2(k−1) prior to the present time of the differential output MVO2 of the upstream $O_2$ sensor 7 as calculated by the subtractor 18, the time-series data kact(k), . . . , kact(k−1), kact(k−dm1) of the differential air-fuel ratio kact prior to the present time as calculated from the output KACT (the detected air-fuel ratio) of the LAF sensor 8 by the subtractor 19, and the time-series data kcmd(k−1), . . . , kcmd(k−dm2+1) of the target differential output kcmd as generated in the past by the sliding mode controller 22.

The coefficients $\alpha m1$, $\alpha m2$, and $\beta m(j)$ (j=1, 2, . . . , dm) required to calculate the equation (36) are calculated basically using the latest values (the values determined in the present control cycle) of the identified gain coefficients am1 hat, am2 hat, bm1 hat determined by the identifier 20. The dead time dm1 of the upstream exhaust system E2 and the dead time dm2 of the system for generating an input to the upstream exhaust system E2, which are required to calculate the equation (36), are of the values established as described above.

The above processing sequence is the basic algorithm executed by the estimator 21. If the dead time dm2 of the system for generating an input to the upstream exhaust system E2 is about the same as the period of the control cycles of the upstream exhaust system controller 11, i.e., dm2=1, then the estimator 21 can calculate the estimated differential output MVO2(k+dr) bar directly according to the equation (35).

The sliding mode controller 22 will be described in detail below.

As with the sliding mode controller 17 of the downstream exhaust system controller 10, the sliding mode controller 22 sequentially determines, in each control cycle, the target differential output kcmd as a control input to be given to the upstream exhaust system E2 for converging the output MVO2/OUT of the upstream $O_2$ sensor 7 to the target value MVO2/TARGET, i.e., for converging the differential output MVO2 of the upstream $O_2$ sensor 7 to the target differential output MO2CMD, according to an adaptive sliding mode control process. An algorithm for carrying out the adaptive sliding mode control process is constructed as follows:

A switching function required for the adaptive sliding mode control process of the sliding mode controller 22 will first be described below.

The target differential output MO2CMD(k) for the upstream $O_2$ sensor 7 which is generated in each control cycle by the downstream exhaust system controller 10 is significant as a target value for the differential output MVO2 of the upstream $O_2$ sensor 7 after the dead time dr2 (=the total dead time dm) of the system for generating an input to the downstream exhaust system E1, i.e., the system comprising the upstream exhaust system controller 11, the fuel processing controller 12, the internal combustion engine 1, and the upstream exhaust system E2, as can be seen from the above equation (10). Therefore, the target differential air-fuel ratio kcmd to be generated in each control cycle by the sliding mode controller 22 is a control input to be given to the upstream exhaust system E1 for converging the differential output MVO2 of the upstream $O_2$ sensor 7 to the target differential output MO2CMD generated by the downstream exhaust system controller 10 prior to the dead time dr2 of the system for generating an input to the downstream exhaust system E1.

As described above, the dead time dr2 of the system for generating an input to the downstream exhaust system E1 is equal to the total dead time dm (=dm1+dm2) which is the sum of the dead time dm1 of the upstream exhaust system E2 and the dead time dm2 of the system for generating an input to the upstream exhaust system E2.

Consequently, the sliding mode controller 22 may generate, in each control cycle, the target differential air-fuel ratio kcmd for converging the differential output MVO2 of the upstream $O_2$ sensor 7 to the target differential output MO2CMD generated by the downstream exhaust system controller 10 prior to the total dead time dm.

According to a basic concept of the adaptive sliding mode control process carried out by the sliding mode controller 22, a difference e defined according to the equation (37) shown below, i.e., the difference e(k) (hereinafter referred to as "error output e of the upstream $O_2$ sensor 7) between the differential output MVO2(k) of the upstream $O_2$ sensor 7 as calculated by the subtractor 18 in each control cycle and the target differential output MO2CMD(k-dm) generated by the downstream exhaust system controller 11 prior to the total dead time dm as a target value for the differential output MVO2(k), is used as a state quantity to be controlled (controlled quantity) to be controlled according to the adaptive sliding mode control process by the sliding mode controller 22. The error output e(k) is equal to the difference (=MVO2/OUT(k)−MVO2/TARGET(k−dm)) between the output MVO2/OUT(k) (=MVO2(k)+MVO2/BASE) of the upstream $O_2$ sensor 7 and the target value MVO2/TARGET (k−dm) (=MO2CMD(k−dm)+MVO2/BASE) for the output MVO2/OUT of the upstream $O_2$ sensor 7 prior to the total dead time dm.

$$e(k)=MVO2(k)-MO2CMD(k-dm) \tag{37}$$

Basically, the sliding mode controller 22 defines a switching function σ2 for the sliding mode control process using the error output e according to the equation (38) shown below. Specifically, the switching function σ2 is defined by a linear function having as components time-series data MVO2(k), MVO2(k−1) prior to the present time of the error output e of the upstream $O_2$ sensor 7.

$$\begin{aligned}\sigma 2(k) &= sm1 \cdot e(k) + sm2 \cdot e(k-1) \\ &= sm1 \cdot (MVO2(k) - MO2CMD(k-dm)) + \\ &\quad sm2 \cdot (MVO2(k-1) - MO2CMD(k-dm-1)) \\ &= Sm \cdot Xm\end{aligned} \tag{38}$$

$$\left(Sm = [sm1 \ sm2], Xm = \begin{bmatrix} e(k) \\ e(k-1) \end{bmatrix}\right)$$

The vector Xm defined in the equation (38) as a vector having the error outputs e(k), e(k−1) as its elements is hereinafter called a state quantity Xm.

As with the switching function σ1 with respect to the sliding mode controller 17, the coefficients sm1, sm2 relative to the elements e(k), e(k−1) of the switching function σ2 are established to meet the condition of the following equation (39):

$$-1 < \frac{sm2}{sm1} < 1 \tag{39}$$

(when $sm1 = 1, -1 < sm2 < 1$)

In the present embodiment, for the sake of brevity, the coefficient sm1 is set to sm1=1 (sm2/sm1=sm2), and the coefficient sm2 is established to satisfy the condition: −1<sm2<1.

With the switching function $\sigma_2$ thus defined, the hyperplane for the sliding mode control process which is defined by the equation σ2=0 is represented by a straight line as shown in FIG. 4, as with the switching function σ1 with respect to the sliding mode controller 17 of the downstream exhaust system controller 10.

In the present embodiment, the values of the coefficients sm1, sm2, sr1, sr2 are established such that the absolute value of the ratio of the coefficients sm1, sm2 (=sm2/sm1, representing the gradient of the hyperplane σ2=0) of the switching function σ2 relative to the sliding mode controller 22 is smaller than the absolute value of the ratio of the coefficients sr1, sr2 (=sr2/sr1) of the switching function al relative to the sliding mode controller 17, as described later on.

As with the adaptive sliding mode control process performed by the sliding mode controller 17, the adaptive sliding mode control process performed by the sliding mode controller 22 serves to converge the state quantity Xm=(e(k), e(k−1)) onto the hyperplane σ2=0 according to the reaching control law and the adaptive control law (adaptive algorithm) onto the hyperplane σ2=0 (mode 1 in FIG. 4) and converge the state quantity Xm to a balanced point on the hyperplane σ2=0 where e(k)=e(k−1)=0 while converging the state quantity Xm onto the hyperplane σ2=0 according to an equivalent control input (mode 2 in FIG. 4).

The target differential air-fuel ratio kcmd which is to be generated by the sliding mode controller 22 as a control input to be given to the upstream exhaust system E2 for converging the state quantity Xm to the balanced point on the hyperplane $\sigma 2=0$ is expressed as the sum of an equivalent control input U2eq, a reaching control law input U2rch according to the reaching control law, and an adaptive control law input U2adp according to the adaptive control law (see the following equation (40)).

$$\text{kcmd}(k) = U2eq(k) + U2rch(k) + U2adp(k) \tag{40}$$

The equivalent control input U2eq, the reaching control law input U2rch, and the adaptive control law U2adp are determined on the basis of the upstream exhaust system model expressed by the equation (26), and the equation (34) representative of the system for generating an input to the upstream exhaust system E2, as follows:

When the equation (34) is applied to the third term of the right side of the equation (26), the following equation (41) is obtained:

$$\begin{aligned} MVO2(k+1) &= am1 \cdot MVO2(k) + am2 \cdot MVO2(k-1) + \\ & \quad bm1 \cdot \text{kcmd}(k - dm1 - dm2) \\ &= am1 \cdot MVO2(k) + am2 \cdot MVO2(k-1) + \\ & \quad bm1 \cdot \text{kcmd}(k - dm) \end{aligned} \tag{41}$$

The equation (41) expresses the behavior of the system which comprises the upstream exhaust system E2 and the input generating system therefor.

The equivalent control input U2eq is the target differential air-fuel ratio kcmd which satisfies the condition: $\sigma 2(k+1) = \sigma 2(k) = 0$ in the equation (41). Using the equations (38), (41), the equivalent control input U2eq which satisfies the above condition is given by the following equation (42):

$$\begin{aligned} U2eq(k) = \frac{-1}{sm1 \cdot bm1} \cdot & \\ \{[sm1 \cdot (am1 - 1) + sm2] \cdot MVO2(k+dm) + & \\ (sm1 \cdot am2 - sm2) \cdot MVO2(k+dm-1) - & \\ sm1 \cdot (MO2CMD(k+1) - MO2CMD(k)) - & \\ sm2 \cdot (MO2CMD(k) - MO2CMD(k-1))\} & \end{aligned} \tag{42}$$

The equation (42) is a basic formula for determining the equivalent control input U2eq(k) in each control cycle.

The reaching control law input U2rch(k) in each control cycle is determined in proportion to the value of the switching function $\sigma 2(k+dm)$ after the total dead time dm which is the sum of the dead time dm1 of the upstream exhaust system E2 and the dead time dm2 of the system for generating an input to the upstream exhaust system E2, as with the reaching control law input U1rch with respect to the sliding mode controller 17, according to the following equation (43):

$$U2rch(k) = \frac{-1}{sm1 \cdot bm1} \cdot F2 \cdot \sigma 2(k+dm) \tag{43}$$

The coefficient F2 in the equation (43) which determines the gain of the reaching control law is established to satisfy the condition expressed by the following equation (44):

$$0 < F2 < 2 \tag{44}$$

(Preferably, $0 < F2 < 1$)

The adaptive control law input U2adp(k) in each control cycle is determined in proportion to the integrated value (corresponding to the integral of the value of the switching function $\sigma 2$) in each control cycle of the product $\sigma 2 \cdot \Delta T$ of the switching function $\sigma 2$ and the control cycle period $\Delta T$ until after the total dead time dm, as wit the adaptive control law input U1adp with respect to the sliding mode controller 17, according to the following equation (45):

$$U2adp(k) = \frac{-1}{sm1 \cdot bm1} \cdot G2 \cdot \sum_{i=0}^{k+dm} (\sigma 2(i) \cdot \Delta T) \tag{45}$$

The coefficient G2 (which determines the gain of the adaptive control law), in the equation (45) is established to satisfy the condition of the following equation (46):

$$G2 = J^1 \cdot \frac{2 - F2}{\Delta T} \tag{46}$$

$$(0 < J^1 < 2)$$

The target differential air-fuel ratio kcmd generated by the sliding mode controller 22 as a control input to be given to the upstream exhaust system E2 may basically be determined as the sum (U2eq+U2rch+U2adp) of the equivalent control input U2eq, the reaching control law input U2rch, and the adaptive control law U2adp determined according to the respective equations (42), (43), (45).

In order to determine $\sigma 2(k+dm)$ required to calculate the reaching control law input U2rch and the adaptive control law U2adp according to the respective equations (43), (45), a future value MVO2(k+dm) of the differential output MVO2 is needed as can be seen from the above equation (38).

In this embodiment, as with the sliding mode controller 17, the sliding mode controller 22 uses a switching function $\sigma 2$ bar according to the following equation (47) in place of the switching function $\sigma 2$:

$$\overline{\sigma 2}(k) = sm1 \cdot (\overline{MVO2}(k) - MO2CMD(k-dm)) + sm2 \cdot (\overline{MVO2}(k-1) - MO2CMD(k-dm-1)) \tag{47}$$

In the equation (47), the time-series data of the differential output MVO2 relative to the error output e which is an element of the switching function $\sigma 2$ is replaced with time-series data of the estimated differential output MVO2 bar which is an estimated value of the differential output MVO2.

The sliding mode controller 22 calculates the reaching control law input U2rch(k) and the adaptive control law input U2adp(k) in each control cycle according to the following equations (48), (49) using the value of the switching function $\sigma 2$ bar represented by the equation (47), rather than "$\sigma 2$" in the equations (43), (45):

$$U2rch(k) = \frac{-1}{sm1 \cdot bm1} \cdot F2 \cdot \overline{\sigma 2}(k+dm) \tag{48}$$

$$U2adp(k) = \frac{-1}{sm1 \cdot bm1} \cdot G2 \cdot \sum_{i=0}^{k+dm} (\overline{\sigma 2}(i) \cdot \Delta T) \tag{49}$$

With respect to the equivalent control input U2eq, the differential outputs MVO2(k+dm), MVO2(k+dm−1) of the upstream $O_2$ sensor 7 used in the equation (42) are values in the future, and cannot directly be obtained. The target differential output MO2CMD(k+1) used in the equation (42) has not yet been calculated in the process performed by the sliding mode controller 17 of the downstream exhaust system controller 10.

The sliding mode controller 22 determines an equivalent control input U2eq(k) in each control cycle according to the following equation (50) in which the differential outputs MVO2(k+dm), MVO2(k+dm−1) in the equation (42) are replaced with estimated differential outputs MVO2(k+dm) bar, MVO2(k+dm−1) bar determined as their estimated values (predicted values) by the estimator 21:

$$U2eq(k) = \frac{-1}{sm1 \cdot bm1} \cdot \qquad (50)$$
$$\{[sm1 \cdot (am1 - 1) + sm2] \cdot \overline{MVO2}(k + dm) +$$
$$(sm1 \cdot am2 - sm2) \cdot \overline{MVO2}(k + dm - 1) -$$
$$sm1 \cdot (MO2CMD(k + 1) - MO2CMD(k)) -$$
$$sm2 \cdot (MO2CMD(k) - MO2CMD(k - 1))\}$$

The target differential output MO2CMD(k+1) in one control cycle before used in the equation (50) is temporarily determined in each control cycle by the downstream exhaust system controller 10, and the determined temporary target differential output MO2CMD(k+1) is used.

The downstream exhaust system controller 10 determines the temporary target differential output MO2CMD(k+1) as follows:

In the downstream exhaust system controller 10, the estimator 16 determines in each control cycle the estimated differential output RVO2(k+dr) bar which is an estimated value for the differential output RVO2 of the downstream O$_2$ sensor 6 after the total dead time dr, and also temporarily determines the estimated differential output RVO2(k+dr+1) bar after a time (dr+1) (hereinafter referred to as "required estimation time (dr+1)") which is one control cycle longer than the total dead time dr. The sliding mode controller 17 of the downstream exhaust system controller 10 calculates the target differential output MO2CMD(k) in each cycle as described above, and also temporarily determines the target differential output MO2CMD(k+1) in one control cycle before (in the future) using the estimated differential output RVO2(k+dr+1), bar after the required estimation time (dr+1).

The estimator 16 calculates the estimated differential output RVO2(k+dr+1) bar after the required estimation time (dr+1) as follows:

The estimator 16 temporarily determines in each control cycle the estimated differential output RVO2(k+dr+1) bar after the required estimation time (dr+1) according to the following equation (51) which is obtained by shifting both sides of the equation (12) into the future by one control cycle (replacing "k" in both sides with "k+1") and applying the equations (1), (10) to the right side of the equation. The estimated differential output RVO2(k+dr+1) bar calculated according to the equation (51) will hereinafter referred to as "temporary estimated differential output RVO2(k+dr+1) bar".

$$\overline{RVO2}(k + dr + 1) = \alpha r1p \cdot RVO2(k) + \alpha r2p \cdot RVO2(k - 1) + \qquad (51)$$
$$\sum_{j=1}^{dr2} \beta rp(j) \cdot MO2CMD(k + 1 - j) +$$
$$\sum_{i=dr2+1}^{dr+1} \beta rp(i) \cdot MVO2(k + 1 + dr2 - i)$$

where
$\alpha r1p$=the first-row, first-column element of $Ar^{dr+1}$,
$\alpha r2p$=the first-row, second-column element of $Ar^{dr+1}$,
$\beta rp(j)$=the first-row elements of $Ar^{j-1} \cdot Br$ (j=1,2, . . . , dr+1)

$$Ar = \begin{bmatrix} ar1 & ar2 \\ 1 & 0 \end{bmatrix}$$

$$Br = \begin{bmatrix} br1 \\ 0 \end{bmatrix}$$

In the equation (51), the coefficients $\alpha r1p$, $\alpha r2p$, $\beta rp(j)$ (j=1,2, . . . , dr+1) are defined as described above with respect to the equation (51). These coefficients are basically calculated from the latest identified gain coefficients ar1(k) hat, ar2(k) hat, br1(k) hat which are calculated by the identifier 15 as the identified values of the gain coefficients ar1, ar2, br1 in each control cycle. The coefficients $\alpha r1p$, $\alpha r2p$ are different from the $\alpha r1$, $\alpha r2$ in the equation (12), but coefficients $\beta rp(1)$, $\beta rp(2)$, . . . , $\beta rp(dr)$ of the coefficients $\beta rp(j)$ (j=1,2, . . . , dr+1) are the same as the respective coefficients $\beta r(1)$, $\beta r(2)$, . . . , $\beta r(dr)$ in the equation (12).

The sliding mode controller 17 temporarily determines the equivalent control input U1eq(k+1), the reaching control law input U1rch(k+1), and the adaptive control law input U1adp(k+1) in one control cycle before in each control cycle according to the following equations (52), (53), (54) which are obtained by shifting both sides of the equations (22), (24), (25) into the future by one control cycle:

$$U1eq(k + 1) = \frac{-1}{sr1 \cdot br1} \cdot \{[sr1 \cdot (ar1 - 1) + sr2] \cdot \qquad (52)$$
$$\overline{RVO2}(k + dr + 1) +$$
$$(sr1 \cdot ar2 - sr2) \cdot \overline{RVO2}(k + dr)\}$$

$$U1rch(k + 1) = \frac{-1}{sr1 \cdot br1} \cdot F1 \cdot \overline{\sigma1}(k + dr + 1) \qquad (53)$$

$$U1adp(k + 1) = \frac{-1}{sr1 \cdot br1} \cdot G1 \cdot \sum_{i=0}^{k+dr+1} (\overline{\sigma1}(i) \cdot \Delta T) \qquad (54)$$

The sum of the equivalent control input U1eq(k+1), the reaching control law input U1rch(k+1), and the adaptive control law input U1adp(k+1) is determined as the target differential output MO2CMD(k+1) in one control cycle before according to the equation (55) shown below. The target differential output MO2CMD(k+1) thus determined will be referred to as "temporary target differential output MO2CMD(k+1)".

$$MO2CMD(k+1)=U1eq(k+1)+U1rch(k+1)+U1adp(k+1) \qquad (55)$$

The temporary estimated differential output RVO2(k+dr+1) bar calculated by the estimator 16 according to the equation (51) is used as RVO2(k+dr+1) bar in the equation (52), and the estimated differential output RVO2(k+dr) bar calculated by the estimator 16 according to the equation (12) is used as RVO2(k+dr) bar in the equation (52).

The switching function σ1 required to calculate the equations (53), (54) is calculated according to the above equation

(23) using the temporary estimated differential output RVO2(k+dr+1) bar and the estimated differential output RVO2(k+dr) bar which are calculated by the estimator 16 according to the respective equations (50), (12).

The latest identified gain coefficients ar1(k) hat, ar2(k) hat, br1(k) hat which are determined by the identifier 15 (which are the same as those used to calculate the equations (22), (24), (25)) are basically used as the gain coefficients ar1, ar2, br1 required to calculate the equivalent control input U1eq(k+1), the reaching control law input U1rch(k+1), and the adaptive control law input U1adp(k+1) temporarily in one control cycle before according to the equations (52), (53), (54). The conditions for establishing the coefficients sm1, sm2, F2, G2 used in the equations (52), (53), (54) are established as described above.

The downstream exhaust system controller 10 limits the temporary target differential output MO2CMD(k+1) determined in one control cycle before by the sliding mode controller 17 as described above, and then gives the limited temporary target differential output MO2CMD(k+1) to the upstream exhaust system controller 11.

The sliding mode controller 22 of the upstream exhaust system controller 11 uses the temporary target differential output MO2CMD(k+1) generated in one control cycle before by the sliding mode controller 17 of the downstream exhaust system controller 10 to calculate the equivalent control input U2eq(k) in each control cycle according to the equation (50).

The sliding mode controller 22 determines the target differential air-fuel ratio kcmd(k) from the equivalent control input U2eq(k), the reaching control law input U2rch(k), and the adaptive control law input U2adp(k) which are calculated as described above, according to the equation (40).

The sliding mode controller 22 limits the target differential air-fuel ratio kcmd(k) calculated according to the equation (40) to a predetermined allowable range, in the same manner as the sliding mode controller 17, and then gives the target differential air-fuel ratio kcmd(k) to the adder 23.

According to the present embodiment, the target differential air-fuel ratio kcmd is calculated on the assumption that the target differential output MO2CMD is steadily "0" under a certain condition, i.e., the target value MVO2/TARGET for the output MVO2/OUT of the upstream $O_2$ sensor 7 is the same as the reference value MVO2/BASE (=RVO2/TARGET), as described later on.

The above process is the basic process that is carried out by the sliding mode controller 22.

The adder 23 adds the air-fuel ratio reference value FLAF/BASE to the target differential air-fuel ratio kcmd(k) thus generated by the sliding mode controller 22 to determine the target air-fuel ratio KCMD(k) in each control cycle, and gives the determined target air-fuel ratio KCMD(k) the fuel processing controller 12.

In the plant control system according to the present embodiment, the absolute value of the ratio of the coefficients sr1, sr2 (sr2/sr1) of the switching function σ1 used by the sliding mode controller 17 of the downstream exhaust system controller 10 is greater than the absolute value of the ratio of the coefficients sm1, sm2 (=sm2/sm1) of the switching function σ2 used by the sliding mode controller 22 of the upstream exhaust system controller 11.

Generally, the sliding mode control process (including the adaptive sliding mode control process) is a so-called response-indicating-type control process, and is capable of indicating a damping rate for converging a controlled quantity to a target value depending on the values of coefficients of a switching function used in the sliding mode control process.

For example, with the switching function σ1 used by the sliding mode controller 17 being converged to "0", since RVO2(k)=(−sr2/sr1)·RVO2(k−1) as is apparent from the equation (13), the absolute value of the ratio of the coefficients sr1, sr2 (sr2/sr1) determines the damping rate (damping rate per control cycle) of the differential output RVO2 as a controlled quantity of the sliding mode controller 17 (the damping rate is higher as |sr2/sr1| approaches "0" within the range of 0<|sr2/sr1|<1). This holds true for the coefficients sm1, sm2 of the switching function σ2 used by the sliding mode controller 22 (the ratios (sr2/sr1), (sm2/sm1) will hereinafter be referred to as "damping parameters Rpole, Mpole", respectively).

The sliding mode controllers 17, 22 basically serve to determine the target differential air-fuel ratio kcmd which is representative the target air-fuel ratio KCMD for the internal combustion engine 1 as a control input to an overall exhaust system E which comprises the combination of the downstream exhaust system E1 and the upstream exhaust system E2, for converging the output RVO2/OUT of the downstream $O_2$ sensor 6 to the target value RVO2/TARGET therefor according to their combined control processes. For preventing the control processes of the sliding mode controllers 17, 22 from interfering with each other to stabilize the output RVO2/OUT of the downstream $O_2$ sensor 6 which is an output of the overall exhaust system E, it is preferable that the feedback gain of the sliding mode controller 17 be smaller than the feedback gain of the sliding mode controller 22. The feedback gain of the sliding mode controller 17 signifies the rate of a change of the control input (the target differential output MO2CMD) of the downstream exhaust system E1 to a change of the output (the output RVO2/OUT or the differential output RVO2) of the downstream exhaust system E1. The feedback gain of the sliding mode controller 22 signifies the rate of a change of the control input (the target differential air-fuel ratio kcmd) of the upstream exhaust system E2 to a change of the output (the output MVO2/OUT or the differential output MVO2) of the upstream exhaust system E2.

In order to make the feedback gain of the sliding mode controller 17 smaller than the feedback gain of the sliding mode controller 22, the damping rate of the differential output RVO2 as a controlled quantity of the sliding mode controller 17 may be smaller than the damping rate of the error output e (see the equation (37) as a controlled quantity of the sliding mode controller 22.

In the present embodiment, the absolute value |Rpole| of the damping parameter Rpole with respect to the sliding mode controller 17 is greater than the absolute value |Mpole| of the damping parameter Mpole with respect to the sliding mode controller 22 (|Rpole|>|Mpole|), for thereby making the feedback gain of the sliding mode controller 17 smaller than the feedback gain of the sliding mode controller 22.

The fuel processing controller 12 will be described below.

Figure 6:
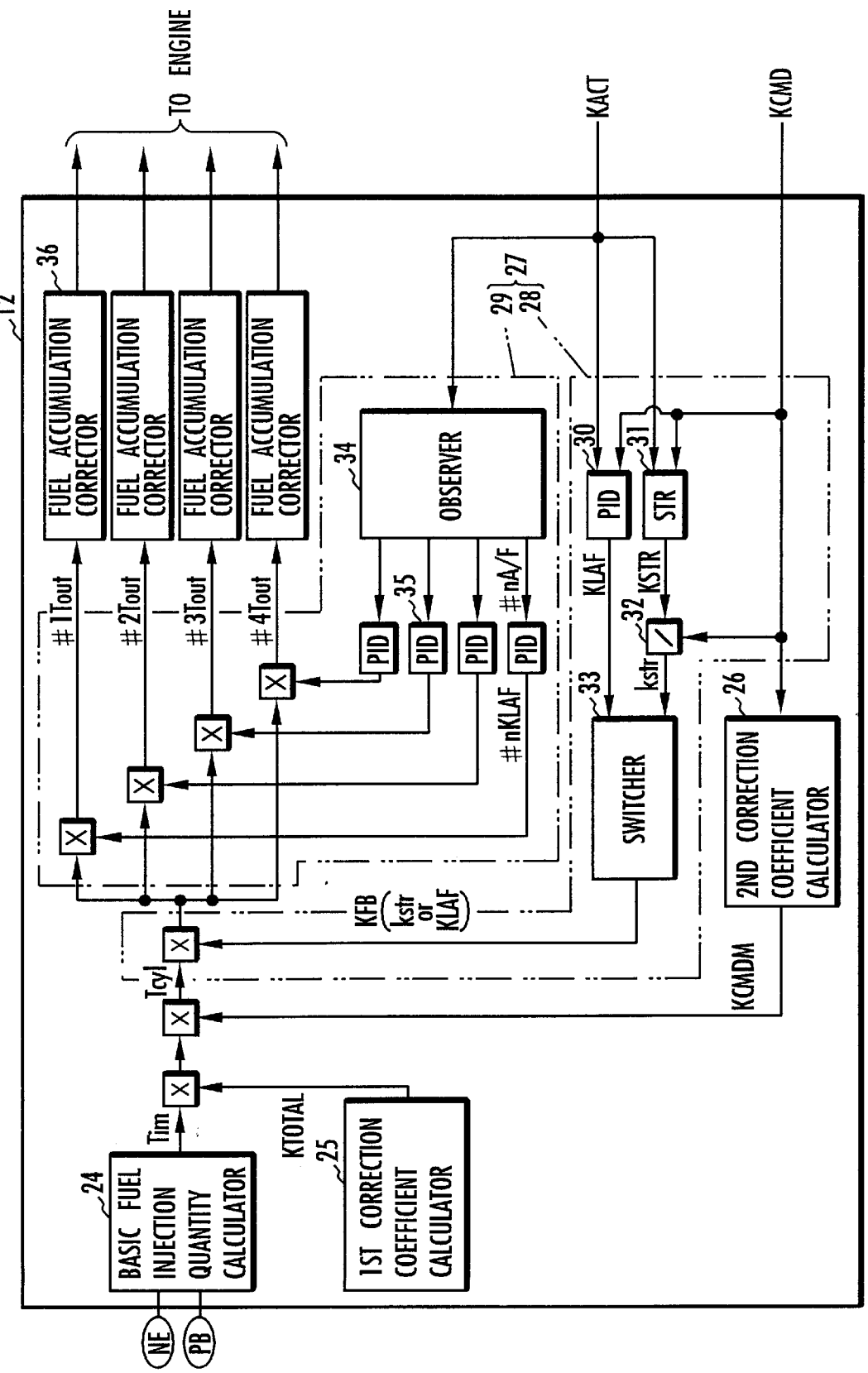
FIG. 6 is a block diagram of a fuel processing controller in the plant control system shown in FIG. 1.

As shown in FIG. 6, the fuel processing controller 12 has, as its main functions, a basic fuel injection quantity calculator 24 for determining a basic fuel injection quantity Tim to be injected into the internal combustion engine 1, a first correction coefficient calculator 25 for determining a first correction coefficient KTOTAL to correct the basic fuel injection quantity Tim, and a second correction coefficient calculator 26 for determining a second correction coefficient KCMDM to correct the basic fuel injection quantity Tim.

The basic fuel injection quantity calculator 24 determines a reference fuel injection quantity (fuel supply quantity) from the rotational speed NE and intake pressure PB of the internal combustion engine 1 using a predetermined map, and corrects the determined reference fuel injection quantity depending on the effective opening area of a throttle valve (not shown) of the internal combustion engine 1, thereby calculating a basic fuel injection quantity Tim.

The first correction coefficient KTOTAL determined by the first correction coefficient calculator 25 serves to correct the basic fuel injection quantity Tim in view of an exhaust gas recirculation ratio of the internal combustion engine 1, i.e., the proportion of an exhaust gas contained in an air-fuel mixture introduced into the internal combustion engine 1, an amount of purged fuel supplied to the internal combustion engine 1 when a canister (not shown) is purged, a coolant temperature, an intake temperature, etc. of the internal combustion engine 1.

The second correction coefficient KCMDM determined by the second correction coefficient calculator 26 serves to correct the basic fuel injection quantity Tim in view of the charging efficiency of an air-fuel mixture due to the cooling effect of fuel flowing into the internal combustion engine 1 depending on a target air-fuel ratio KCMD determined by the upstream exhaust system controller 11.

The fuel processing controller 12 corrects the basic fuel injection quantity Tim with the first correction coefficient KTOTAL and the second correction coefficient KCMDM by multiplying the basic fuel injection quantity Tim by the first correction coefficient KTOTAL and the second correction coefficient KCMDM, thus producing a demand fuel injection quantity Tcyl for the internal combustion engine 1.

Specific details of processes for calculating the basic fuel injection quantity Tim, the first correction coefficient KTOTAL, and the second correction coefficient KCMDM are disclosed in detail in Japanese laid-open patent publication No. 5-79374 and U.S. Pat. No. 5,253,630, and will not be described below.

The fuel processing controller 12 also has, in addition to the above functions, a feedback controller 27 for adjusting a fuel injection quantity of the internal combustion engine 1 according to a feedback control process so as to converge the output signal KACT of the LAF sensor 8 (the detected air-fuel ratio) toward the target air-fuel ratio KCMD which is sequentially generated by the upstream exhaust system controller 11.

The feedback controller 27 comprises a general feedback controller 28 for feedback-controlling a total air-fuel ratio for all the cylinders of the internal combustion engine 1 and a local feedback controller 29 for feedback-controlling an air-fuel ratio for each of the cylinders of the internal combustion engine 1.

The general feedback controller 28 sequentially determines a feedback correction coefficient KFB to correct the demand fuel injection quantity Tcyl (by multiplying the demand fuel injection quantity Tcyl) so as to converge the output signal KACT from the LAF sensor 8 toward the target air-fuel ratio KCMD.

The general feedback controller 28 comprises a PID controller 30 for determining a feedback manipulated variable KLAF as the feedback correction coefficient KFB depending on the difference between the output signal KACT from the LAF sensor 8 and the target air-fuel ratio KCMD according to a known PID control process, and an adaptive controller 31 (indicated by "STR" in FIG. 6) for adaptively determining a feedback manipulated variable KSTR for determining the feedback correction coefficient KFB in view of changes in operating condition s of the internal combustion engine 1 or characteristic changes thereof from the output signal KACT from the LAF sensor 8 and the target air-fuel ratio KCMD.

In the present embodiment, the feedback manipulated variable KLAF generated by the PID controller 30 is of "1" and can be used directly as the feedback correction coefficient KFB when the output signal KACT (the detected air-fuel ratio) from the LAF sensor 8 is equal to the target air-fuel ratio KCMD. The feedback manipulated variable KSTR generated by the adaptive controller 31 becomes the target air-fuel ratio KCMD when the output signal KACT from the LAF sensor 8 is equal to the target air-fuel ratio KCMD. A feedback manipulated variable kstr (=KSTR/KCMD) which is produced by dividing the feedback manipulated variable KSTR by the target air-fuel ratio KCMD with a divider 32 can be used as the feedback correction coefficient KFB.

The feedback manipulated variable KLAF generated by the PID controller 30 and the feedback manipulated variable kstr which is produced by dividing the feedback manipulated variable KSTR from the adaptive controller 31 by the target air-fuel ratio KCMD are selected one at a time by a switcher 33. A selected one of the feedback manipulated variable KLAF and the feedback manipulated variable kstr is used as the feedback correction coefficient KFB. The demand fuel injection quantity Tcyl is corrected by being multiplied by the feedback correction coefficient KFB. Details of the general feedback controller 28 (particularly, the adaptive controller 31) will be described later on.

The local feedback controller 29 comprises an observer 34 for estimating real air-fuel ratios #nA/F (n=1, 2, 3, 4) of the respective cylinders from the output signal KACT from the LAF sensor 8, and a plurality of PID controllers 35 (as many as the number of the cylinders) for determining respective feedback correction coefficients #nKLAF for fuel injection quantities for the cylinders from the respective real air-fuel ratios #nA/F estimated by the observer 21 according to a PID control process so as to eliminate variations of the air-fuel ratios of the cylinders.

Briefly stated, the observer 34 estimates a real air-fuel ratio #nA/F of each of the cylinders as follows: A system from the internal combustion engine 1 to the LAF sensor 8 (where the exhaust gases from the cylinders are combined) is considered to be a system for generating an air-fuel ratio detected by the LAF sensor 8 from a real air-fuel ratio #nA/F of each of the cylinders, and is modeled in view of a chronological contribution of the air-fuel ratio of each of the cylinders of the internal combustion engine 1 to the air-fuel ratio detected by the LAF sensor 8. Based on the modeled system, a real air-fuel ratio #nA/F of each of the cylinders is estimated from the output signal KACT from the LAF sensor 8.

Details of the observer 34 are disclosed in Japanese laid-open patent publication No. 7-83094 and U.S. Pat. No. 5,531,208, for example, and will not be described below.

Each of the PID controllers 35 of the local feedback controller 29 divides the output signal KACT from the LAF sensor 8 by an average value of the feedback correction coefficients #nKLAF determined by the respective PID controllers 35 in a preceding control cycle to produce a quotient value, and uses the quotient value as a target air-fuel ratio for the corresponding cylinder. Each of the PID controllers 35 then determines a feedback correction coefficient #nKLAF in a present control cycle so as to eliminate any difference between the target air-fuel ratio and the estimated value of the corresponding real air-fuel ratio #nA/F determined by the observer 34.

The local feedback controller 29 multiplies a value, which has been produced by multiplying the demand fuel injection quantity Tcyl by the feedback correction coefficient KFB produced by the general feedback controller 28, by the feedback correction coefficient #nKLAF for each of the cylinders, thereby determining an output fuel injection quantity #nTout (n=1, 2, 3, 4) for each of the cylinders.

The output fuel injection quantity #nTout thus determined for each of the cylinders is corrected for accumulated fuel particles on intake pipe walls of the internal combustion engine 1 by a fuel accumulation corrector 36 in the fuel processing controller 12. The corrected output fuel injection quantity #nTout is applied to each of fuel injectors (not shown) of the internal combustion engine 1, which injects fuel into each of the cylinders with the corrected output fuel injection quantity #nTout.

The correction of the output fuel injection quantity in view of accumulated fuel particles on intake pipe walls is disclosed in detail in Japanese laid-open patent publication No. 8-21273 and U.S. Pat. No. 5,568,799, for example, and will not be described in detail below.

The general feedback controller 28, particularly, the adaptive controller 31, will be described below.

As shown in FIG. 6, the general feedback controller 28 effects a feedback control process to converge the output KACT (detected air-fuel ratio) from the LAF sensor 8 toward the target air-fuel ratio KCMD as described above. If such a feedback control process were carried out under the known PID control only, it would be difficult keep stable controllability against dynamic behavioral changes including changes in the operating conditions of the internal combustion engine 1, characteristic changes due to aging of the internal combustion engine 1, etc.

Figure 7:
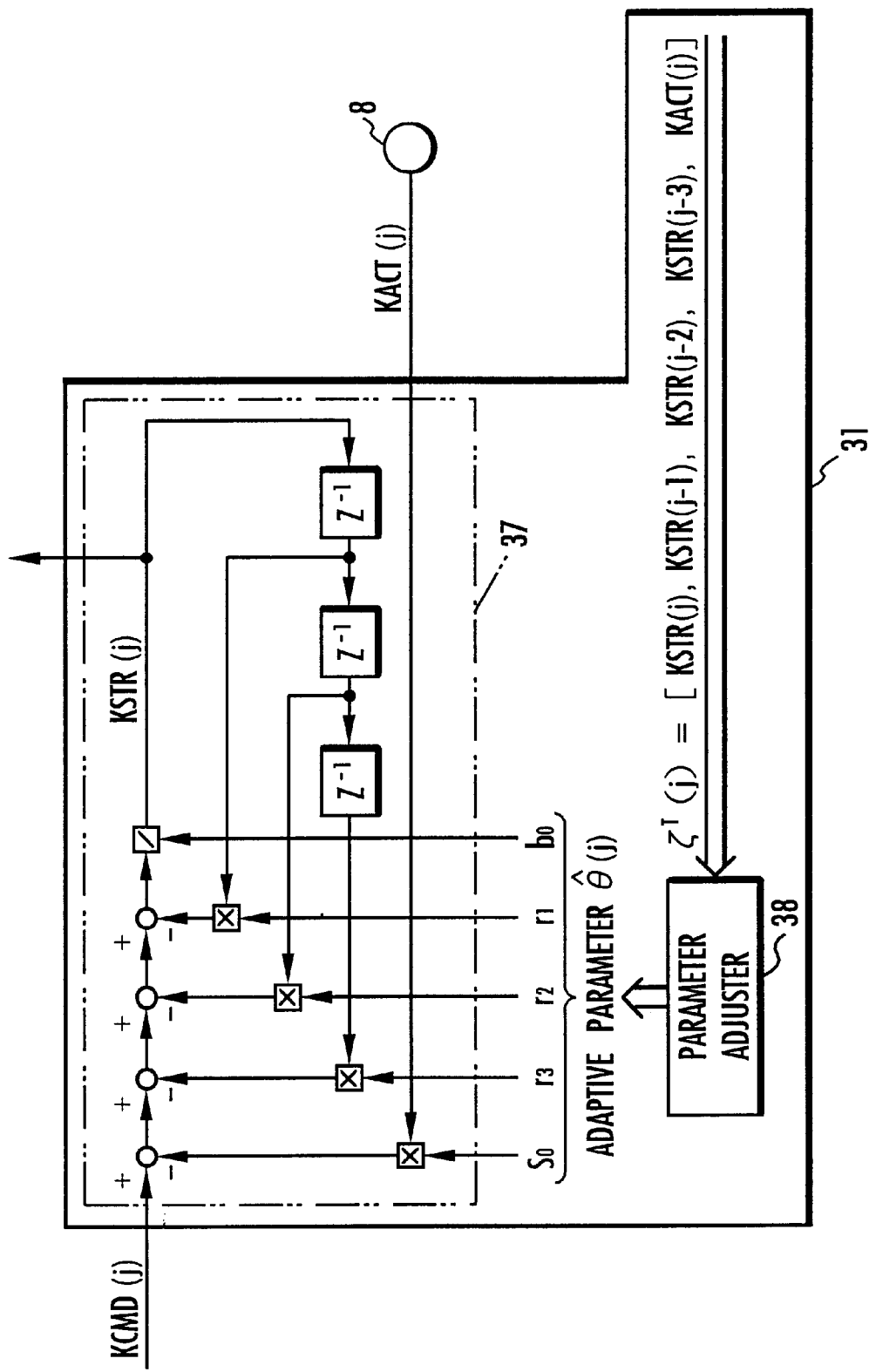
FIG. 7 is a block diagram of an adaptive controller in the fuel processing controller shown in FIG. 6.

The adaptive controller 31 is a recursive-type controller which makes it possible to carry out a feedback control process while compensating for dynamic behavioral changes of the internal combustion engine 1. As shown in FIG. 7, the adaptive controller 31 comprises a parameter adjuster 38 for establishing a plurality of adaptive parameters using the parameter adjusting law proposed by I. D. Landau, et al., and a manipulated variable calculator 37 for calculating the feedback manipulated variable KSTR using the established adaptive parameters.

The parameter adjuster 38 will be described below. According to the parameter adjusting law proposed by I. D. Landau, et al., when polynomials of the denominator and the numerator of a transfer function $B(Z^{-1})/A(Z^{-1})$ of a discrete-system object to be controlled are generally expressed respectively by equations (56), (57), given below, an adaptive parameter $\hat{\theta}$ (j) (j indicates the number of a control cycle) established by the parameter adjuster 38 is represented by a vector (transposed vector) according to the equation (58) given below. An input $\zeta(j)$ to the parameter adjuster 38 is expressed by the equation (59) given below. In the present embodiment, it is assumed that the internal combustion engine 1, which is an object to be controlled by the general feedback controller 28, is considered to be a plant of a first-order system having a dead time $d_p$ corresponding to three control cycles (a time corresponding to three combustion cycles of the internal combustion engine 1), and m=n=1, $d_p$=3 in the equations (56)–(59), and five adaptive parameters $s_0$, $r_1$, $r_2$, $r_3$, $b_0$ are established (see FIG. 7). In the upper and middle expressions of the equation (59), $u_s$, $y_s$ generally represent an input (manipulated variable) to the object to be controlled and an output (controlled variable) from the object to be controlled. In the present embodiment, the input is the feedback manipulated variable KSTR and the output from the object (the internal combustion engine 1) is the output KACT (detected air-fuel ratio) from the LAF sensor 8, and the input $\zeta(j)$ to the parameter adjuster 38 is expressed by the lower expression of the equation (59) (see FIG. 7).

$$A(Z^{-1}) = 1 + a1Z^{-1} + \ldots + anZ^{-n} \tag{56}$$

$$B(Z^{-1}) = b0 + b1Z^{-1} + \ldots + bmZ^{-m} \tag{57}$$

$$\hat{\theta}^T(j) = [\hat{b}_0(j), \hat{B}_R(Z^{-1}, j), \hat{S}(Z^{-1}, j)] \tag{58}$$
$$= [b_0(j), r_1(j), \ldots, r_{m+d_p-1}(j), s_0(j), \ldots, s_{n-1}(j)]$$
$$= [b_0(j), r_1(j), r_2(j), r_3(j), s_0(j)]$$

$$\zeta^T(j) = [us(j), \ldots, us(j-m-dp+1), ys(j), \ldots, \tag{59}$$
$$ys(j-n+1)]$$
$$= [us(j), us(j-1), us(j-2), us(j-3), ys(j)]$$
$$= [KSTR(j), KSTR(j-1), KSTR(j-2),$$
$$KSTR(j-3), KACT(j)]$$

The adaptive parameter $\hat{\theta}$ hat expressed by the equation (58) is made up of a scalar quantity element $b_0$ hat$^{-1}$ ($Z^{-1}$, j) for determining the gain of the adaptive controller 31, a control element $\hat{B}_R$ hat ($Z^{-1}$, j) expressed using a manipulated variable, and a control element $\hat{S}$ ($Z^{-1}$, j) expressed using a controlled variable, which are expressed respectively by the following equations (60)–(62) (see the block of the manipulated variable calculator 37 shown in FIG. 7):

$$\hat{b}_0^{-1}(j) = \frac{1}{b_0} \tag{60}$$

$$\hat{B}_R(Z^{-1}, j) = r_1 Z^{-1} + r_2 Z^{-2} + \ldots + r_{m+d_p-1} Z^{-(n+d_p-1)} \tag{61}$$
$$= r_1 Z^{-1} + r_2 Z^{-2} + r_3 Z^{-3}$$

$$\hat{S}(Z^{-1}, j) = s_0 + s_1 Z^{-1} + \ldots + s_{n-1} Z^{-(n-1)} \tag{62}$$
$$= s_0$$

The parameter adjuster 38 establishes coefficients of the scalar quantity element and the control elements, described above, and supplies them as the adaptive parameter $\hat{\theta}$ hat expressed by the equation (58) to the manipulated variable calculator 37. The parameter adjuster 38 calculates the adaptive parameter $\hat{\theta}$ hat so that the output KACT from the LAF sensor 8 will agree with the target air-fuel ratio KCMD, using time-series data of the feedback manipulated variable KSTR from the present to the past and the output KACT and the output KACT from the LAF sensor 8.

Specifically, the parameter adjuster 38 calculates the adaptive parameter $\hat{\theta}$ hat according to the following equation (63):

$$\hat{\theta}(j) = \hat{\theta}(j-1) + \Gamma(j-1) \cdot \zeta(j-d_p) \cdot e^*(j) \tag{63}$$

where $\Gamma(j)$ represents a gain matrix (whose degree is indicated by m+n+$d_p$) for determining a rate of establishing the adaptive parameter $\hat{\theta}$ hat, and $e^*(j)$ an estimated error of the adaptive parameter $\hat{\theta}$ hat. $\Gamma(j)$ and $e^*(j)$ are expressed respectively by the following recursive formulas (64), (65):

$$\Gamma(j) = \frac{1}{\lambda_1(j)} \cdot \left[ \Gamma(j-1) - \right. \tag{64}$$

-continued $$\frac{\lambda_2(j)\cdot\Gamma(j-1)\cdot\zeta(j-d_p)\cdot\zeta^T(j-d_p)\cdot\Gamma(j-1)}{\lambda_1(j)+\lambda_2(j)\cdot\zeta^T(j-d_p)\cdot\Gamma(j-1)\cdot\zeta(j-d_p)}\Bigg]$$

where $0<\lambda_1(j)\leq 1$, $0\leq\lambda_2(j)<2$, $\Gamma(0)>0$.

$$e^*(j)=\frac{D(Z^{-1})\cdot KACT(j)-\hat{\theta}^T(j-1)\cdot\zeta(j-d_p)}{1+\zeta^T(j-d_p)\cdot\Gamma(j-1)\cdot\zeta(j-d_p)} \tag{65}$$

where $D(Z^{-1})$ represents an asymptotically stable polynomial for adjusting the convergence. In the present embodiment, $D(Z^{-1})=1$.

Various specific algorithms including the degressive gain algorithm, the variable gain algorithm, the fixed trace algorithm, and the fixed gain algorithm are obtained depending on how $\lambda_1(i)$, $\lambda_2(j)$ in the equation (64) are selected. For a time-dependent plant such as a fuel injection process, an air-fuel ratio, or the like of the internal combustion engine 1, either one of the degressive gain algorithm, the variable gain algorithm, the fixed gain algorithm, and the fixed trace algorithm is suitable.

Using the adaptive parameter θ hat ($s_0$, $r_1$, $r_2$, $r_3$, $b_0$) established by the parameter adjuster 38 and the target air-fuel ratio KCMD calculated by the upstream exhaust system controller 12, the manipulated variable calculator 37 determines the feedback manipulated variable KSTR according to a recursive formula expressed by the following equation (66):

$$KSTR=1/b_0\cdot[KCMD(j)-s_0\cdot KACT(j)-r_1\cdot KSTR(j-1)-r_2\cdot KSTR(j-2)-r_3\cdot KSTR(j-3)] \tag{66}$$

The manipulated variable calculator 37 shown in FIG. 7 represents a block diagram of the calculations according to the equation (66).

The feedback manipulated variable KSTR determined according to the equation (66) becomes the target air-fuel ratio KCMD insofar as the output KACT of the LAF sensor 8 agrees with the target air-fuel ratio KCMD. Therefore, the feedback manipulated variable KSTR is divided by the target air-fuel ratio KCMD by the divider 32 for thereby determining the feedback manipulated variable kstr that can be used as the feedback correction coefficient KFB.

As is apparent from the foregoing description, the adaptive controller 31 thus constructed is a recursive-type controller taking into account dynamic behavioral changes of the internal combustion engine 1 which is an object to be controlled. Stated otherwise, the adaptive controller 31 is a controller described in a recursive form to compensate for dynamic behavioral changes of the internal combustion engine 1, and more particularly a controller having a recursive-type adaptive parameter adjusting mechanism.

A recursive-type controller of this type may be constructed using an optimum regulator. In such a case, however, it generally has no parameter adjusting mechanism. The adaptive controller 31 constructed as described above is suitable for compensating for dynamic behavioral changes of the internal combustion engine 1.

The details of the adaptive controller 31 have been described above.

The PID controller 30, which is provided together with the adaptive controller 31 in the general feedback controller 28, calculates a proportional term (P term), an integral term (I term), and a derivative term (D term) from the difference between the output KACT of the LAF sensor 8 and the target air-fuel ratio KCMD, and calculates the total of those terms as the feedback manipulated variable KLAF, as is the case with the general PID control process. In the present embodiment, the feedback manipulated variable KLAF is set to "1" when the output KACT of the LAF sensor 8 agrees with the target air-fuel ratio KCMD by setting an initial value of the integral term (I term) to "1", so that the feedback manipulated variable KLAF can be used as the feedback correction coefficient KFB for directly correcting the fuel injection quantity. The gains of the proportional term, the integral term, and the derivative term are determined from the rotational speed and intake pressure of the internal combustion engine 1 using a predetermined map.

The switcher 33 of the general feedback controller 28 outputs the feedback manipulated variable KLAF determined by the PID controller 30 as the feedback correction coefficient KFB for correcting the fuel injection quantity if the combustion in the internal combustion engine 1 tends to be unstable as when the temperature of the coolant of the internal combustion engine 1 is low, the internal combustion engine 1 rotates at high speeds, or the intake pressure is low, or if the output KACT of the LAF sensor 8 is not reliable due to a response delay of the LAF sensor 8 as when the target air-fuel ratio KCMD changes largely or immediately after the air-fuel ratio feedback control process has started, or if the internal combustion engine 1 operates highly stably as when it is idling and hence no high-gain control process by the adaptive controller 31 is required. Otherwise, the switcher 33 outputs the feedback manipulated variable kstr which is produced by dividing the feedback manipulated variable KSTR determined by the adaptive controller 31 by the target air-fuel ration KCMD, as the feedback correction coefficient KFB for correcting the fuel injection quantity. This is because the adaptive controller 31 effects a high-gain control process and functions to converge the output KACT of the LAF sensor 8 quickly toward the target air-fuel ratio KCMD, and if the feedback manipulated variable KSTR determined by the adaptive controller 31 is used when the combustion in the internal combustion engine 1 is unstable or the output KACT of the LAF sensor 8 is not reliable, then the air-fuel ratio control process tends to be unstable.

Such operation of the switcher 33 is disclosed in detail in Japanese laid-open patent publication No. 8-105345 and U.S. Pat. No. 5,558,075, and will not be described in detail below.

Operation of the plant control system will be described below.

First, a process, carried out by the fuel processing controller 12, of determining a fuel injection quantity for the internal combustion engine 1 will be described below with reference to FIGS. 6 and 8. The fuel processing controller 12 calculates a fuel injection quantity in control cycles in synchronism with a crankshaft angle period (TDC) of the internal combustion engine 1 as follows:

The fuel processing controller 12 reads outputs from various sensors including sensors for detecting the rotational speed NE and intake pressure PB of the internal combustion engine 1, the downstream and upstream $O_2$ sensors 6, 7, the LAF sensor 8 in STEPa. At this time, the outputs RVO2/OUT, MVO2/OUT of the downstream and upstream $O_2$ sensors 6, 7 which are required by the processing carried out by the downstream and upstream exhaust system controllers 10, 11, and the output KACT of the LAF sensor 8 are given via the fuel processing controller 12 to the downstream and upstream exhaust system controllers 10, 11. Therefore, the read data including the RVO2/OUT, MVO2/OUT, KACT, including data obtained in past control cycles, are stored in a time-series fashion in a memory (not shown).

Then, the basic fuel injection quantity calculator 24 corrects a fuel injection quantity corresponding to the rotational speed NE and intake pressure PB of the internal combustion engine 1 depending on the effective opening area of the throttle valve, thereby calculating a basic fuel injection quantity Tim in STEPb. The first correction coefficient calculator 25 calculates a first correction coefficient KTOTAL depending on the coolant temperature and the amount by which the canister is purged in STEPc.

The fuel processing controller 12 decides whether the target air-fuel ratio KCMD generated by the upstream exhaust system controller 11 is to be used or not, i.e., determines ON/OFF of an air-fuel ratio manipulating process, and sets a value of a flag f/prism/on which represents ON/OFF of the air-fuel ratio manipulating process in STEPd. When the value of the flag f/prism/on is "0", it means that the target air-fuel ratio KCMD generated by the upstream exhaust system controller 11 is not to be used (OFF), and when the value of the flag f/prism/on is "1", it means that the target air-fuel ratio KCMD generated by the upstream exhaust system controller 11 is to be used (ON).

Figure 9:
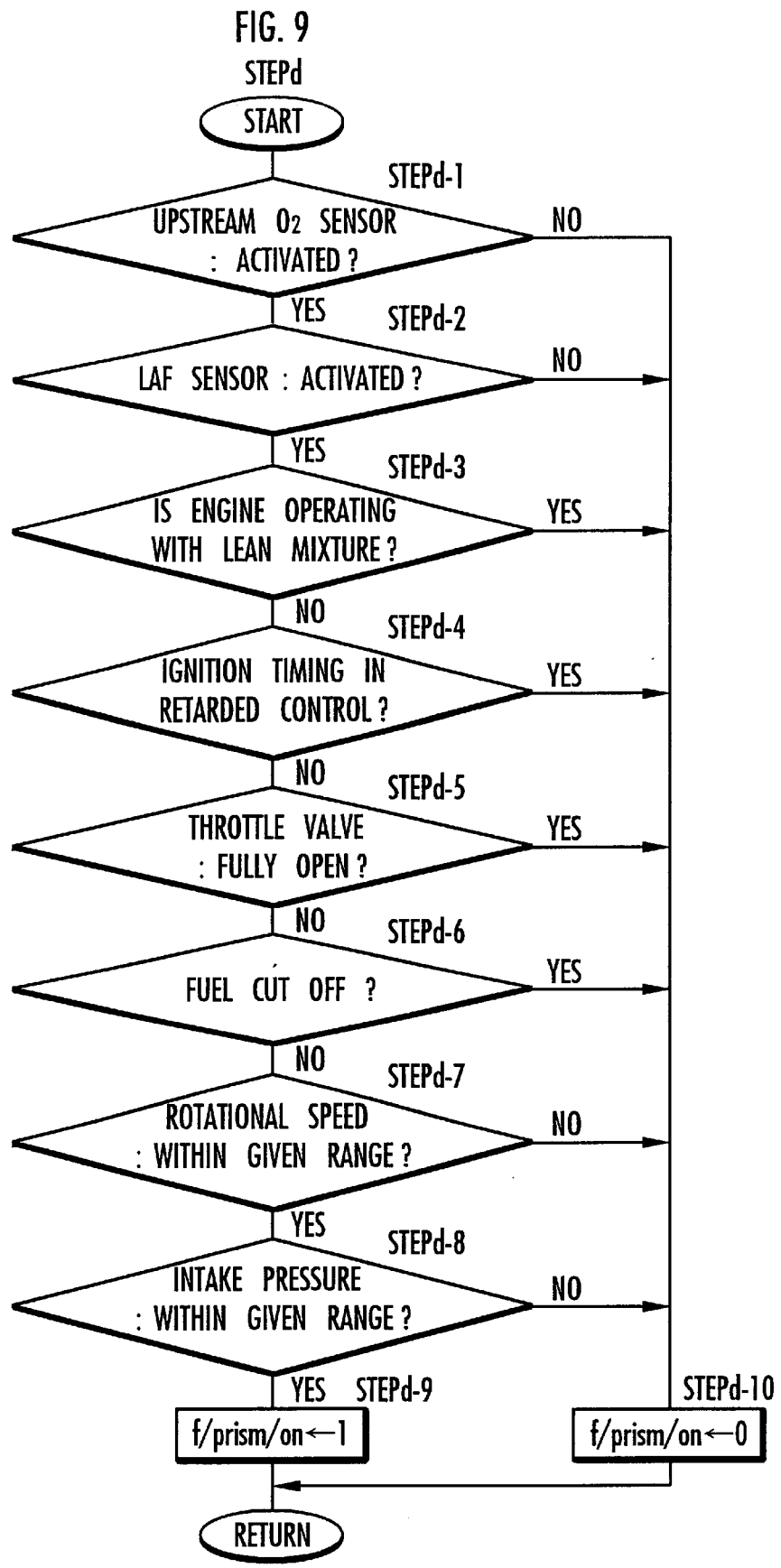
FIG. 9 is a flowchart of a subroutine of the flowchart shown in FIG. 8.

The deciding subroutine of STEPd is shown in detail in FIG. 9. As shown in FIG. 9, the fuel processing controller 12 decides whether the upstream $O_2$ sensor 7 is activated or not in STEPd-1 and the LAF sensor 8 is activated or not in STEPd-2. The fuel processing controller 12 decides whether the upstream $O_2$ sensor 7 is activated or not based on the output voltage of the upstream $O_2$ sensor 7, for example, and decides whether the LAF sensor 8 is activated or not based on the resistance of a sensor device thereof.

If neither one of the upstream $O_2$ sensor 7 and the LAF sensor 8 is activated, since detected data from the upstream $O_2$ sensor 7 or the LAF sensor 8 for use by the fuel processing controller 12 is not accurate enough, the value of the flag f/prism/on is set to "0" in STEPd-10.

Then, the fuel processing controller 12 decides whether the internal combustion engine 1 is operating with a lean air-fuel mixture or not in STEPd-3. The fuel processing controller 12 decides whether the ignition timing of the internal combustion engine 1 is retarded for early activation of the catalytic converters 3, 4 immediately after the start of the internal combustion engine 1 or not in STEPd-4. The fuel processing controller 12 decides whether the throttle valve of the internal combustion engine 1 is fully open or not in STEPd-5. The fuel processing controller 12 decides whether the supply of fuel to the internal combustion engine 1 is being stopped or not in STEPd-6. If either one of the conditions of these steps is satisfied, then since it is not preferable to control the supply of fuel to the internal combustion engine 1 using the target air-fuel ratio KCMD generated by the upstream exhaust system controller 11, the value of the flag f/prism/on is set to "0" in STEPd-10.

The fuel processing controller 12 then decides whether the rotational speed NE and the intake pressure PB of the internal combustion engine 1 fall within respective given ranges or not respectively in STEPd-7, STEPd-8. If either one of the rotational speed NE and the intake pressure PB does not fall within its given range, then since it is not preferable to control the supply of fuel to the internal combustion engine 1 using the target air-fuel ratio KCMD generated by the upstream exhaust system controller 11, the value of the flag f/prism/on is set to "0" in STEPd-10.

If the conditions of STEPd-1, STEPd-2, STEPd-7, STEPd-8 are satisfied, and the conditions of STEPd-3, STEPd-4, STEPd-5, STEPd-6 are not satisfied (the internal combustion engine 1 is in normal operation in these cases), then the value of the flag f/prism/on is set to "1" to use the target air-fuel ratio KCMD generated by the upstream exhaust system controller 11 for controlling the supply of fuel to the internal combustion engine 1 in STEPd-9.

Figure 8:
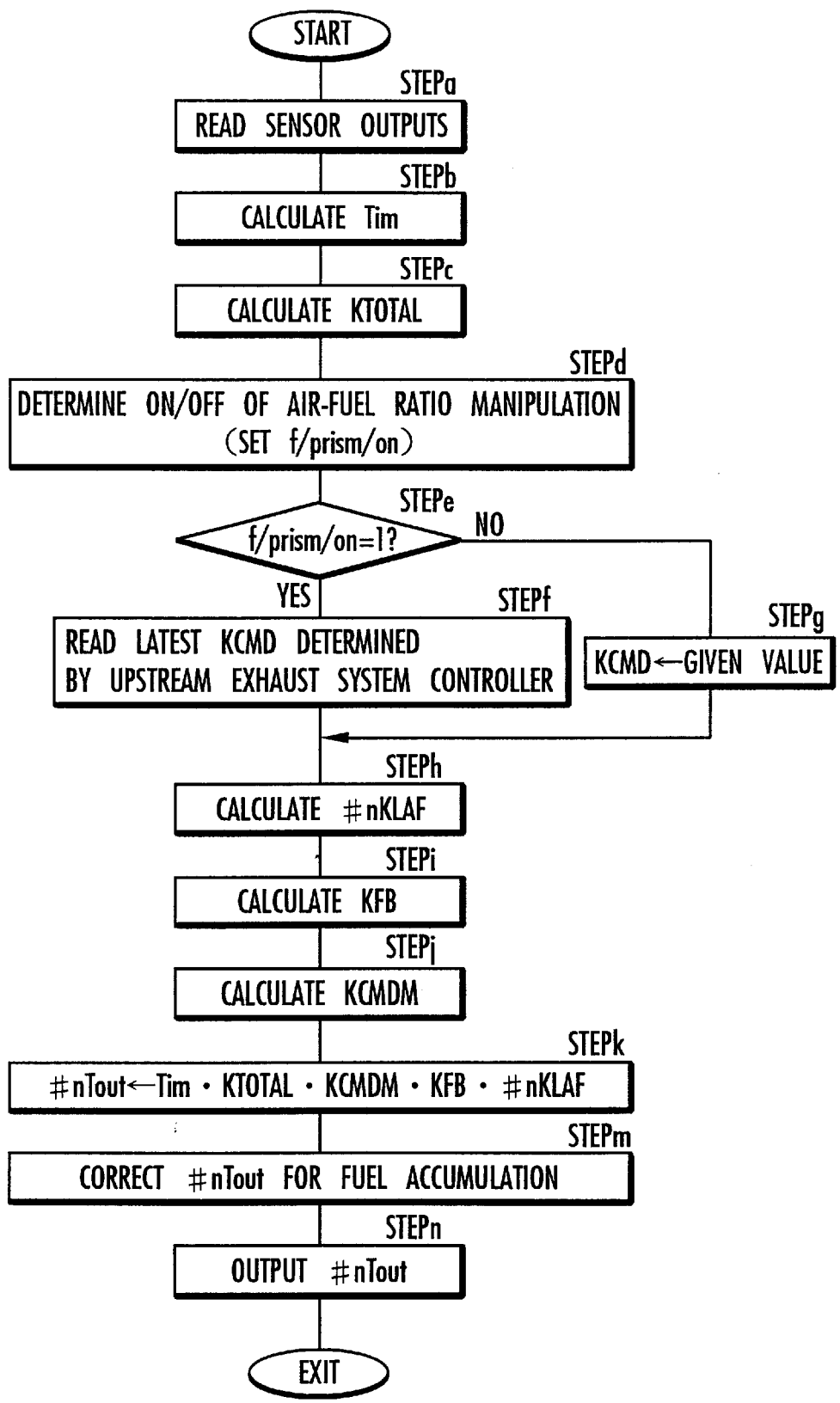
FIG. 8 is a flowchart of a processing sequence of the fuel processing controller in the plant control system shown in FIG. 1.

In FIG. 8, after the value of the flag f/prism/on has been set, the fuel processing controller 12 determines the value of the flag f/prism/on in STEPe. If f/prism/on=1, then the fuel processing controller 12 reads the target air-fuel ratio KCMD generated by the upstream exhaust system controller 11 in STEPf. If f/prism/on=0, then the fuel processing controller 12 sets the target air-fuel ratio KCMD to a predetermined value in STEPg. The predetermined value to be established as the target air-fuel ratio KCMD is determined from the rotational speed NE and intake pressure PB of the internal combustion engine 1 using a predetermined map, for example.

In the local feedback controller 29, the PID controllers 35 calculates respective feedback correction coefficients #nKLAF in order to eliminate variations between the cylinders, based on actual air-fuel ratios #nA/F of the respective cylinders which have been estimated from the output KACT of the LAF sensor 8 by the observer 34, in STEPh. Then, the general feedback controller 28 calculates a feedback correction coefficient KFB in STEPi.

Depending on the operating conditions of the internal combustion engine 1, the switcher 33 selects either the feedback manipulated variable KLAF determined by the PID controller 30 or the feedback manipulated variable kstr which has been produced by dividing the feedback manipulated variable KSTR determined by the adaptive controller 31 by the target air-fuel ratio KCMD (normally, the switcher 33 selects the feedback manipulated variable kstr). The switcher 33 then outputs the selected feedback manipulated variable KLAF or kstr as a feedback correction coefficient KFB.

When switching the feedback correction coefficient KFB from the feedback manipulated variable KLAF from the PID controller 30 to the feedback manipulated variable kstr from the adaptive controller 31, the adaptive controller 31 determines a feedback manipulated variable KSTR in a manner to hold the correction coefficient KFB to the preceding correction coefficient KFB (=KLAF) as long as in the cycle time for the switching in order to avoid an abrupt change in the correction coefficient KFB. When switching the feedback correction coefficient KFB from the feedback manipulated variable kstr from the adaptive controller 31 to the feedback manipulated variable KLAF from the PID controller 30, the PID controller 30 calculates a present correction coefficient KLAF in a manner to regard the feedback manipulated variable KLAF determined by itself in the preceding cycle time as the preceding correction coefficient KFB (=kstr).

After the feedback correction coefficient KFB has been calculated, the second correction coefficient calculator 12 calculates in STEPj a second correction coefficient KCMDM depending on the target air-fuel ratio KCMD determined in STEPf or STEPg.

Then, the fuel processing controller 12 multiplies the basic fuel injection quantity Tim, determined as described above, by the first correction coefficient KTOTAL, the second correction coefficient KCMDM, the feedback correction coefficient KFB, and the feedback correction coefficients #nKLAF of the respective cylinders, determining output fuel injection quantities #nTout of the respective cylinders in STEPk. The output fuel injection quantities #nTout are then corrected for accumulated fuel particles on intake pipe walls of the internal combustion engine 1 by the fuel accumulation correctors 36 in STEPm. The corrected output fuel injection quantities #nTout are applied to the non-illustrated fuel injectors of the internal combustion engine 1 in STEPn.

In the internal combustion engine 1, the fuel injectors inject fuel into the respective cylinders according to the respective output fuel injection quantities #nTout.

The above calculation of the output fuel injection quantities #nTout and the fuel injection of the internal combustion engine 1 are carried out in successive cycles synchronous with the crankshaft angle period (TDC) of the internal combustion engine 1 for controlling the air-fuel ratio of the internal combustion engine 1 in order to converge the output KACT of the LAF sensor 8 (the detected air-fuel ratio) toward the target air-fuel ratio KCMD. While the feedback manipulated variable kstr from the adaptive controller 31 is being used as the feedback correction coefficient KFB, the output KACT of the LAF sensor 8 is quickly converged toward the target air-fuel ratio KCMD with high stability against behavioral changes such as changes in the operating conditions of the internal combustion engine 1 or characteristic changes thereof. A response delay of the internal combustion engine 1 is also appropriately compensated for.

Figure 10:
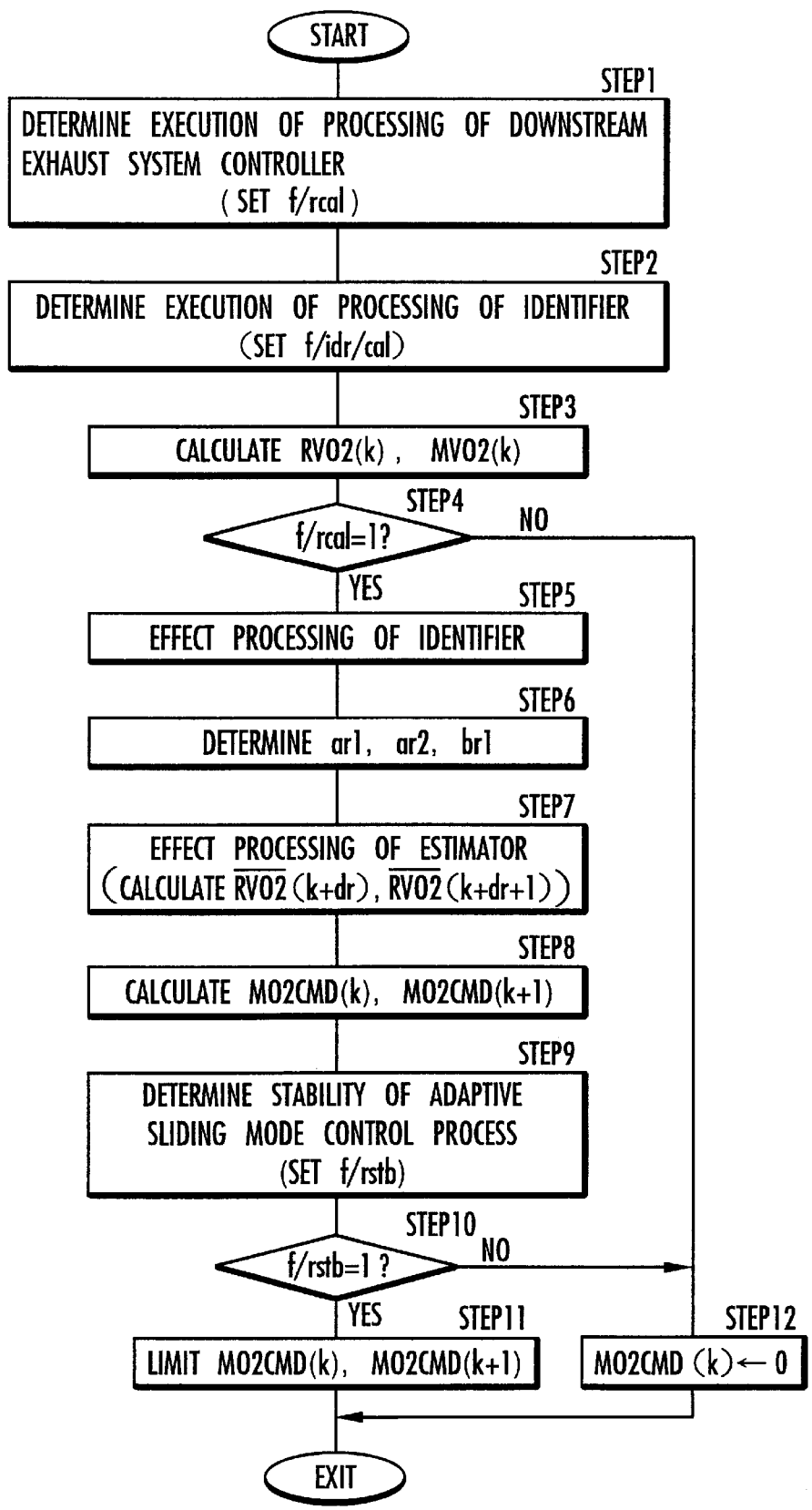
FIG. 10 is a flowchart of an overall processing sequence of the downstream exhaust system controller in the plant control system shown in FIG. 1.
Figure 15:
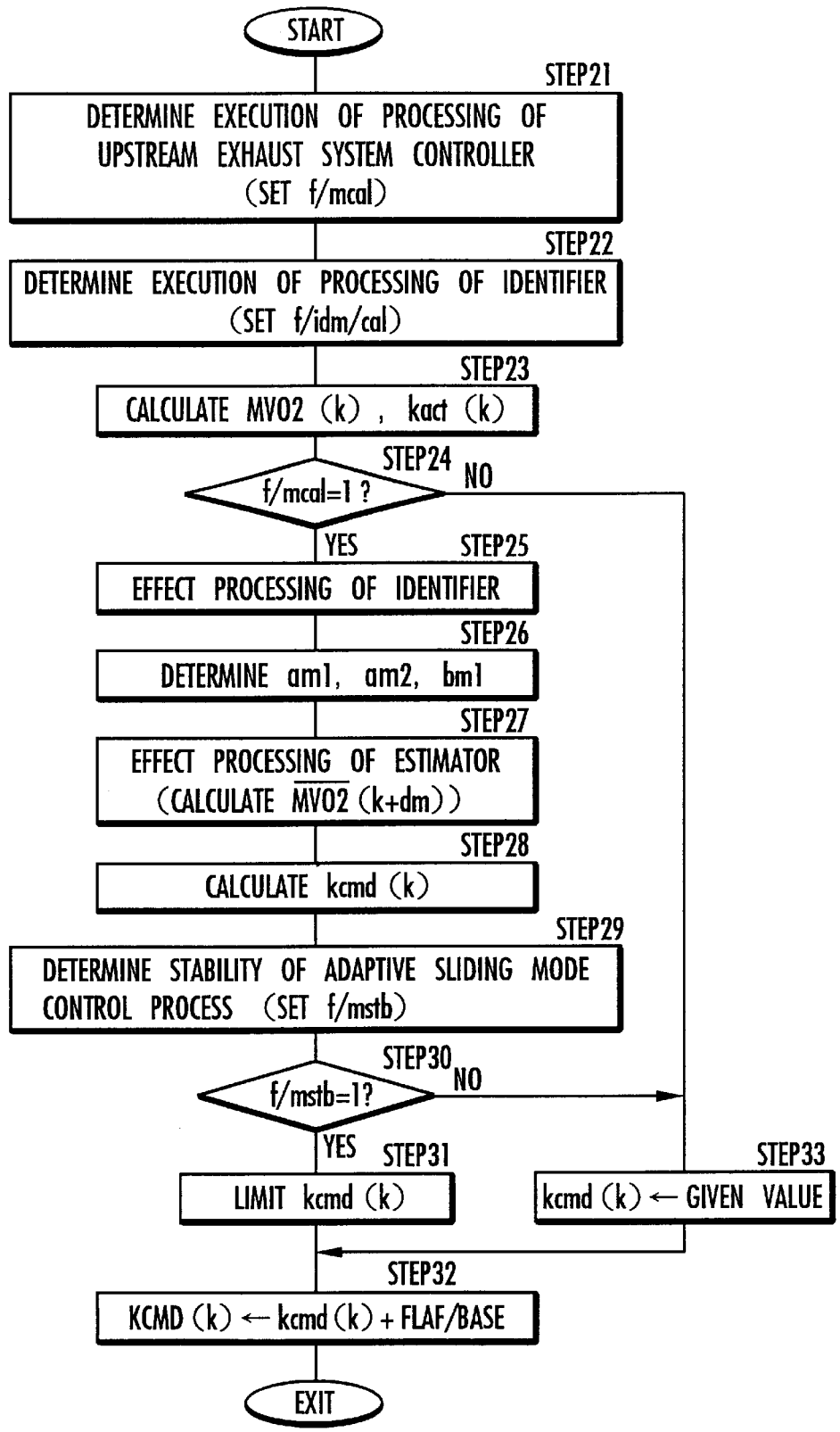
FIG. 15 is a flowchart of an overall processing sequence of the upstream exhaust system controller in the plant control system shown in FIG. 1.

Concurrent with the above fuel control for the internal combustion engine 1, i.e., the above adjustment and control of the fuel injection quantity, the downstream exhaust system controller 10 and the upstream exhaust system controller 11 execute respective main routines shown in FIGS. 10 and 15 in control cycles of a constant period which are synchronized with each other.

The downstream exhaust system controller 10 will first be described below.

As shown in FIG. 10, the downstream exhaust system controller 10 decides whether its own processing (the processing of the identifier 15, the estimator 16, and the sliding mode controller 17) is to be executed or not, and sets a value of a flag f/rcal indicative of whether the processing is to be executed or not in STEP1. When the value of the flag f/rcal is "0", it means that the processing of the downstream exhaust system controller 10 is not to be executed, and when the value of the flag f/rcal is "1", it means that the processing of the downstream exhaust system controller 10 is to be executed.

Figure 11:
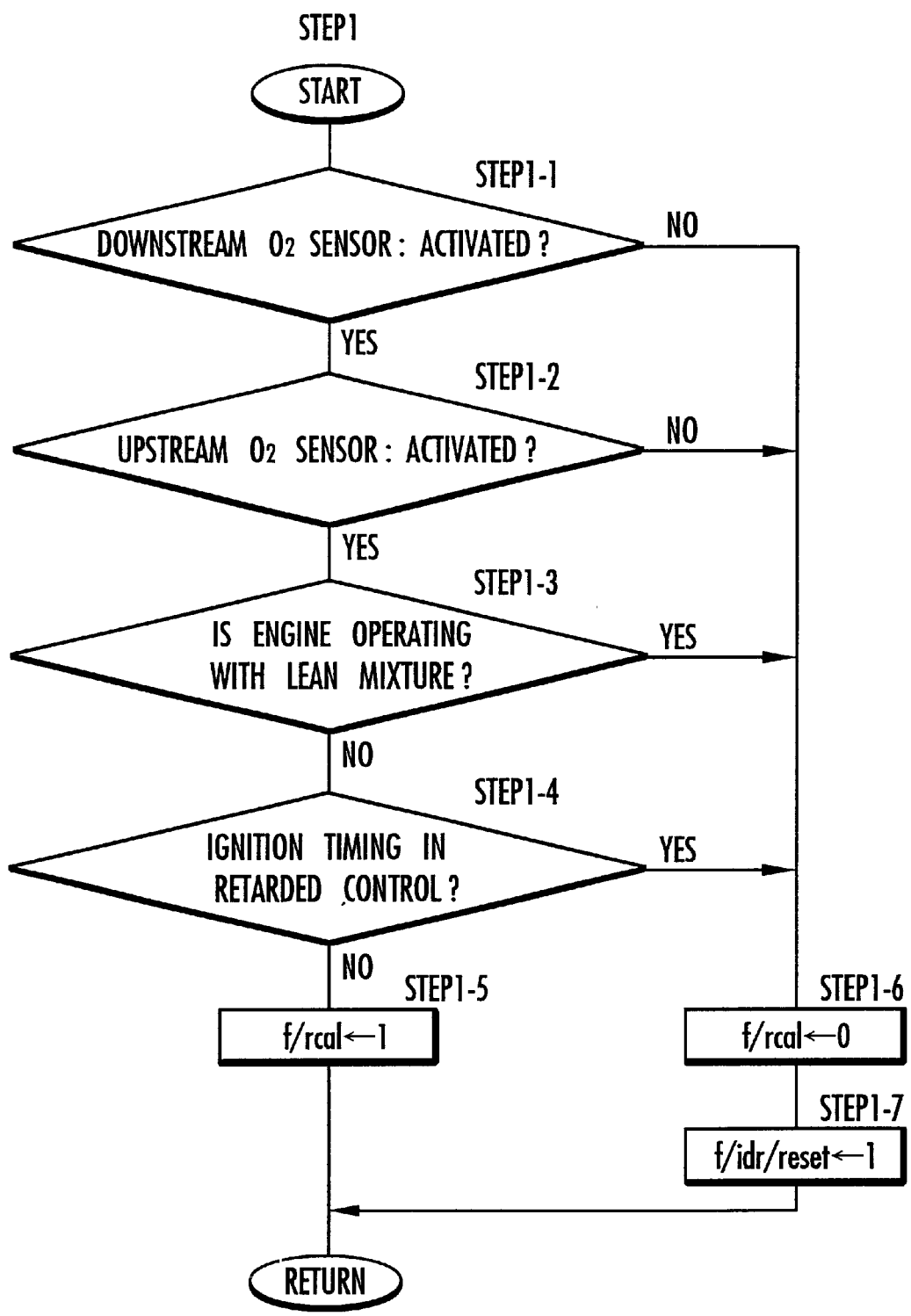
FIG. 11 is a flowchart of a subroutine of the flowchart shown in FIG. 10.

The deciding subroutine in STEP1 is shown in detail in FIG. 11. As shown in FIG. 11, the downstream exhaust system controller 10 decides whether the downstream $O_2$ sensor 6 is activated or not in STEP1-1 and whether the upstream $O_2$ sensor 7 is activated or not in STEP1-2. The downstream exhaust system controller 10 decides whether the downstream and upstream $O_2$ sensors 6, 7 are activated or not, based on the output voltages of these sensors 6, 7.

If neither one of the downstream and upstream $O_2$ sensors 6, 7 is activated, since output data (detected data) from the downstream and upstream $O_2$ sensors 6, 7 for use by the downstream exhaust system controller 10 are not accurate enough, the value of the flag f/rcal is set to "0" in STEP1-6. Then, in order to initialize the identifier 15 as described later on, the value of a flag f/idr/reset indicative of whether the identifier 15 is to be initialized or not is set to "1" in STEP1-7. When the value of the flag f/idr/reset is "1", it means that the identifier 15 is to be initialized, and when the value of the flag f/idr/reset is "0", it means that the identifier 15 is not to be initialized.

The downstream exhaust system controller 10 decides whether the internal combustion engine 1 is operating with a lean air-fuel mixture or not in STEP1-3. The downstream exhaust system controller 10 decides whether the ignition timing of the internal combustion engine 1 is retarded for early activation of the catalytic converters 3, 4 immediately after the start of the internal combustion engine 1 or not in STEP1-4. If the conditions of these steps are satisfied, then since the target air-fuel ratio KCMD calculated to adjust the output RVO2/OUT of the downstream $O_2$ sensor 6 to the target value RVO2/TARGET is not used for the fuel control for the internal combustion engine 1, the value of the flag f/rcal is set to "0" in STEP1-6, and the value of the flag f/idr/reset is set to "1" in order to initialize the identifier 15 in STEP1-7.

If the conditions of STEP1-1, STEP1-2 are satisfied and the conditions of STEP1-3, STEP1-4 are not satisfied, then the value of the flag f/rcal is set to "1" to generate the target differential output MO2CMD for the upstream $O_2$ sensor 7 for converging the output RVO2/OUT of the downstream $O_2$ sensor 6 to the target value RVO2/TARGET in STEP1-5.

In FIG. 10, after the above deciding subroutine, the downstream exhaust system controller 10 decides whether a process of identifying (updating) the gain coefficients ar1, ar2, br1 with the identifier 15 is to be executed or not, and sets a value of a flag f/idr/cal indicative of whether the process of identifying (updating) the gain coefficients ar1, ar2, br1 is to be executed or not in STEP2. When the value of the flag f/idr/cal is "0", it means that the process of identifying (updating) the gain coefficients ar1, ar2, br1 is not to be executed, and when the value of the flag f/idr/cal is "1", it means that the process of identifying (updating) the gain coefficients ar1, ar2, br1 is to be executed.

The deciding subroutine of STEP2 is carried out as follows: The downstream exhaust system controller 10 decides whether the throttle valve of the internal combustion engine 1 is fully open or not, and also decides whether the supply of fuel to the, internal combustion engine 1 is being stopped or not. If either one of these conditions is satisfied, then since it is impossible to adjust the gain coefficients ar1, ar2, br1 appropriately, the value of the flag f/idr/cal is set to "0". If neither one of these conditions is satisfied, then the value of the flag f/idr/cal is set to "1" to identify (update) the gain coefficients ar1, ar2, br1 with the identifier 15.

The downstream exhaust system controller 10 calculates the latest differential output RVO2(k) (=RVO2/OUT−RVO2/TARGET of the downstream $O_2$ sensor 6 and the latest differential output MVO2(k) (=MVO2/OUT−MVO2/BASE of the upstream $O_2$ sensor 7 respectively with the subtractors 13, 14 in STEP3. Specifically, the subtractors 13, 14 select latest ones of the time-series data of the output RVO2/OUT of the downstream $O_2$ sensor 6 and the output MVO2/OUT of the upstream $O_2$ sensor 7 which have been read and stored in the non-illustrated memory in STEPa shown in FIG. 8, and calculate the differential outputs RVO2(k), MVO2(k). The downstream exhaust system controller 10 stores the differential outputs RVO2(k), MVO2(k), as well as data calculated in the past, in a time-series manner in the non-illustrated memory.

Then, in STEP4, the downstream exhaust system controller 10 determines the value of the flag f/rcal set in STEP1. If the value of the flag f/rcal is "0", i.e., if the processing of the downstream exhaust system controller 10 is not to be executed, then the downstream exhaust system controller 10 forcibly sets the target differential output MO2CMD(k) which is a target value for the differential output MVO2 of the upstream $O_2$ sensor 7 in the present control cycle to "0" in STEP12. Then, the processing in the present control cycle is finished.

If the value of the flag f/rcal is "1" in STEP4, i.e., if the processing of the downstream exhaust system controller 10 is to be executed, then the downstream exhaust system controller 10 effects the processing of the identifier 15 in STEP5.

Figure 12:
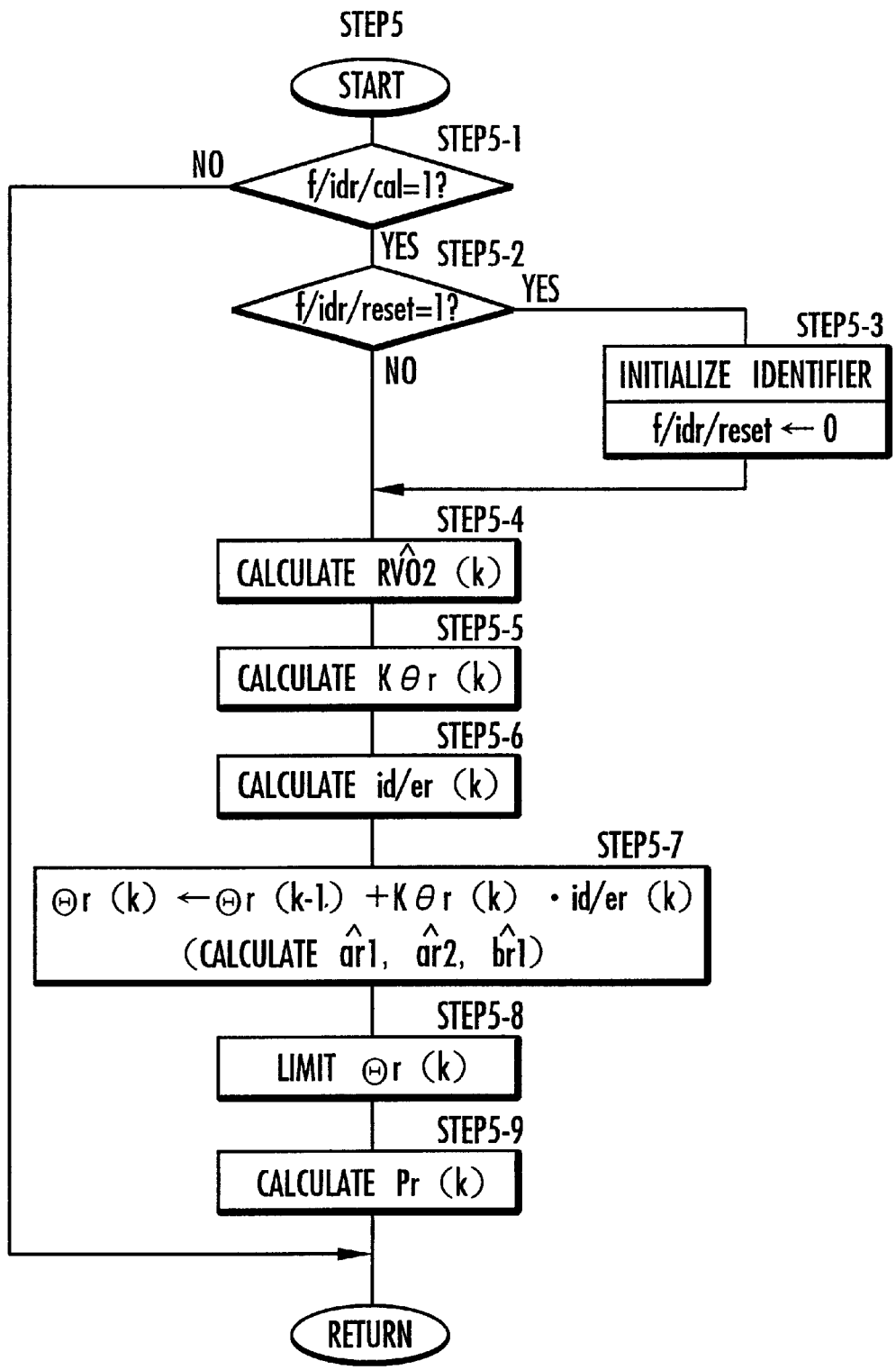
FIG. 12 is a flowchart of a subroutine of the flowchart shown in FIG. 10.

The processing subroutine of STEP5 is shown in detail in FIG. 12.

The identifier 15 determines the value of the flag f/idr/cal set in STEP2 in STEP5-1. If the value of the flag f/idr/cal is "0", i.e., if the throttle valve of the internal combustion engine 1 is fully open or the supply of fuel to the internal combustion engine 1 is being stopped, then since the process of identifying the gain coefficients ar1, ar2, br1 with the identifier 15 is not carried out, control immediately goes back to the main routine shown in FIG. 10.

If the value of the flag f/idr/cal is "1", then the identifier 15 determines the value of the flag f/idr/reset set in STEP1 with respect to the initialization of the identifier 15 in STEP5-2. If the value of the flag f/idr/reset is "1", the identifier 15 is initialized in STEP5-3. When the identifier 15 is initialized, the identified gain coefficients ar1 hat, ar2 hat, br1 hat are set to predetermined initial values (the identified gain coefficient vector $\Theta$r according to the equation (3) is initialized), and the elements of the matrix Pr (diagonal matrix) according to the equation (9) are set to predetermined initial values. The value of the flag f/idr/reset is reset to "0".

Then, the identifier 15 calculates the identified differential output RVO2(k) hat from the model of the downstream exhaust system E1 (see the equation (2)) which is expressed using the present identified gain coefficients ar1(k−1) hat, ar2(k−1) hat, br1(k−1) hat (the identified gain coefficients determined in the preceding control cycle) in STEP5-4. Specifically, the identifier 15 calculates the identified differential output RVO2(k) hat according to the equation (2), using the past data RVO2(k−1), RVO2(k−2) of the differential output RVO2 and the past data MVO2(k−dr1−1) of the differential output MVO2 which are calculated in each control cycle in STEP3, and the identified gain coefficients ar1(k−1) hat, ar2(k−1) hat, br1(k−1) hat.

The identifier 15 then calculates the vector K$\theta$r(k) to be used in determining the new identified gain coefficients ar1 hat, ar2 hat, br1 hat according to the equation (8) in STEP5-5. Thereafter, the identifier 15 calculates the identified error id/er(k) (see the equation (6)), in STEP5-6.

The identified error id/er(k) obtained in STEP5-6 may basically be calculated according to the equation (6). In the present embodiment, however, a value (=RVO2−RVO2 hat) calculated according to the equation (6) from the differential output RVO2 calculated in each control cycle in STEP3 (see FIG. 10), and the identified differential output RVO2 hat calculated in each control cycle in STEP5-4 is filtered with predetermined frequency-pass characteristics (specifically, low-pass characteristics) to calculate the identified error id/er(k).

The above filtering is carried out for the following reasons: The frequency characteristics of changes in the output of the downstream exhaust system E1 (the output RVO2/OUT of the downstream O$_2$ sensor 6) with respect to changes in the input of the downstream exhaust system E1 (the output MVO2/OUT of the upstream O$_2$ sensor 7) are generally of a high gain at low frequencies because of the effect of the second catalytic converter 4 included in the downstream exhaust system E1. Therefore, it is preferable to attach importance to the low-frequency behavior of the downstream exhaust system E1 in appropriately identifying the gain coefficients ar1, ar2, br1 of the model of the downstream exhaust system E1 depending on the actual behavior of the downstream exhaust system E1. According to the present embodiment, therefore, the identified error id/er(k) is determined by filtering the value (=RVO2−RVO2 hat) obtained according to the equation (6) with low-pass characteristics.

Both the differential output RVO2 and the identified differential output RVO2 hat may be filtered with the same frequency-pass characteristics. For example, after the differential output RVO2 and the identified differential output RVO2 hat have separately been filtered, the equation (6) may be calculated to determine the identified error id/er(k). The above filtering is carried out by a moving average process which is a digital filtering process.

After the identifier 15 has determined the identified error id/er(k), the identifier 15 calculates a new identified gain coefficient vector $\Theta$r(k), i.e., new identified gain coefficients ar1(k) hat, ar2(k) hat, br1(k) hat, according to the equation (7) using the identified error id/er(k) and K$\theta$r(k) calculated in SETP5-5 in STEP5-7.

After having calculated the new identified gain coefficients ar1(k) hat, ar2(k) hat, br1(k) hat, the identifier 15 limits the values of the gain coefficients ar1 hat, ar2 hat, br1 hat to meet predetermined conditions in STEP5-8. The identifier 15 updates the matrix Pr(k) according to the equation (9) for the processing of a next control cycle in STEP5-9, after which control returns to the main routine shown in FIG. 10.

The process of limiting the identified gain coefficients ar1 hat, ar2 hat, br1 hat in STEP5-8 comprises a process of limiting the combination of the values of the identified gain coefficients ar1 hat, ar2 hat, br1 hat to a certain combination, i.e., a process of limiting a point (ar1 hat, ar2 hat) to a predetermined region on a coordinate plane having ar1 hat, ar2 hat as components thereof, and a process of limiting the value of the identified gain coefficient br1 hat to a predetermined range. According to the former process, if the point (ar1(k) hat, ar2(k) hat) on the coordinate plate determined by the identified gain coefficients ar1(k) hat, ar2(k) hat calculated in STEP5-7 deviates from the predetermined region on the coordinate plane, then the values of the identified gain coefficients ar1(k) hat, ar2(k) hat are forcibly limited to the values of a point in the predetermined region. According to the latter process, if the value of the identified gain coefficient br1 hat calculated in STEP5-7 exceeds the upper or lower limit of the predetermined range, then the value of the identified gain coefficient br1 hat is forcibly limited to the upper or lower limit of the predetermined range.

The above process of limiting the identified gain coefficients ar1 hat, ar2 hat, br1 hat serves to keep stable the target differential output MO2CMD generated by the sliding mode controller 17 of the downstream exhaust system controller 10.

Specific details of the process of limiting the identified gain coefficients ar1 hat, ar2 hat, br1 hat are disclosed in Japanese laid-open patent publication No. 11-153051 and U.S. patent application Ser. No. 09/153,300, and hence will not be described below.

The processing subroutine of STEP5 for the identifier 15 has been described above.

In FIG. 10, after the processing of the identifier 15 has been carried out, the downstream exhaust system controller 10 determines the gain coefficients ar1, ar2, br1 in STEP6.

More specifically, if the value of the flag f/idr/cal established in STEP2 is "1", i.e., if the gain coefficients ar1, ar2, br1 have been identified by the identifier 15, then the gain coefficients ar1, ar2, br1 are set to the respective identified gain coefficients ar1(k) hat, ar2(k) hat, br1(k) hat (limited in STEP5-8) determined by the identifier 15 in STEP5. If f/idr/cal=0, i.e., if the gain coefficients ar1, ar2, br1 have not been identified by the identifier 15, then the gain coefficients ar1, ar2, br1 are set to respective predetermined values. The predetermined values to which the gain coefficients ar1, ar2, br1 are to be set if f/idr/cal=0, i.e., if the throttle valve of the internal combustion engine 1 is fully open or if the supply of fuel to the internal combustion engine 1 is being stopped, may be predetermined fixed values. However, if the condition in which f/idr/cal=0 is temporary, i.e., if the identifying process carried out by the identifier 15 is temporarily interrupted, then the gain coefficients ar1, ar2, br1 may be set to the identified gain coefficients ar1 hat, ar2 hat, br1 hat determined by the identifier 15 immediately before the flag f/idr/cal becomes 0.

Then, the downstream exhaust system controller 10 effects a processing operation of the estimator 16 in the main routine shown in FIG. 10, i.e., calculates the estimated differential output RVO2(k+dr) bar which is an estimated value for the differential output RVO2 of the downstream $O_2$ sensor 6 after the total dead time dr from the present control cycle and the estimated differential output RVO2(k+dr+1) bar which is a temporary estimated value for the differential output RVO2 of the downstream $O_2$ sensor 6 in one control cycle before in STEP7.

Specifically, the estimator 16 calculates the coefficients $\alpha r1$, $\alpha r2$, $\beta r(j)$ (j=1, 2, ..., dr) to be used in the equation (12) and the coefficients $\alpha r1p$, $\alpha r2p$, $\beta rp(j)$ (j=1, 2, ..., dr+1) to be used in the equation (51), using the gain coefficients ar1, ar2, br1 determined in STEP6 (these values are basically the identified gain coefficients ar1(k) hat, ar2(k) hat, br1(k) hat which have been limited in STEP5-8 shown in FIG. 12) according to the definitions in the equations (11), (51).

Since $\beta r(j)=\beta rp(j)$ (j=1, 2, ..., dr), the coefficients $\beta r(j)=$ (j=1, 2, ..., dr) do not need to be individually calculated as they are automatically calculated once the coefficients $\beta rp(j)$ (j=1, 2, ..., dr) are calculated.

Then, the estimator 16 calculates the estimated differential output RVO2(k+dr) bar (estimated value of the differential output RVO2 after the total dead time dr from the time of the present control cycle) according to the equation (12), using the two time-series data RVO2(k), RVO2(k−1) and the (dr1+1) time-series data MVO2(k), MVO2(k−1), ..., MVO2(k−dr1), from before the present control cycle, of the differential output RVO2 of the downstream $O_2$ sensor 6 and the differential output MVO2 of the upstream $O_2$ sensor 7 which are calculated in each control cycle in STEP3 shown in FIG. 10, the (dr2−1) time-series data MO2CMD(k−1), ..., MO2CMD(k−dr2+1) (obtained in STEP12 or STEP11 before the preceding control cycle) of the target differential output MO2CMD determined in the past control cycles by the downstream exhaust system controller 10, and the coefficients $\alpha r1$, $\alpha r2$, $\beta r(j)$ (j=1, 2, ..., dr) calculated as described above.

Similarly, the estimator 16 calculates the temporary estimated differential output RVO2(k+dr+1) bar (the temporary estimated value of the differential output RVO2 after elapse of a time that is one cycle longer than the total dead time dr, from the time of the present control cycle) according to the equation (51), using time-series data RVO2(k), RVO2(k−1) and MVO2(k), MVO2(k−1), ..., MVO2(k−dr1), MVO2(k−dr1−1) of the respective differential outputs RVO2, MVO2 prior to the present control cycle, the time-series data MO2CMD(k−1), ..., MO2CMD(k−dr2+1) of the target differential output MO2CMD in the past control cycles, and the coefficients $\alpha r1p$, $\alpha r2p$, $\beta rp(j)$ (j=1, 2, ..., dr+1) calculated as described above.

The estimated differential output RVO2(k+dr) bar and the temporary estimated differential output RVO2(k+dr+1) bar which have been calculated as described above are limited to a predetermined allowable range in order that their values will be prevented from being excessively large or small. If their values are in excess of the upper or lower limit of the predetermined allowable range, they are forcibly set to the upper or lower limit of the predetermined allowable range. In this manner, the values of the estimated differential output RVO2(k+dr) bar and the temporary estimated differential output RVO2(k+dr+1) bar are finally determined. Usually, however, the values calculated respectively according to the equations (12), (51) become the estimated differential output RVO2(k+dr) bar and the temporary estimated differential output RVO2(k+dr+1) bar, respectively.

After the estimator 16 has determined the estimated differential output RVO2(k+dr) bar and the temporary estimated differential output RVO2(k+dr+1) bar for the downstream $O_2$ sensor 6, the sliding mode controller 17 of the downstream exhaust system controller 10 calculates the target differential output MO2CMD(k) which is a target value for the differential output MVO2 of the upstream $O_2$ sensor 7 in the present control cycle and the temporary target differential output MO2CMD(k+1) which is a temporary target value in one control cycle before the present control cycle in STEP8.

Figure 13:
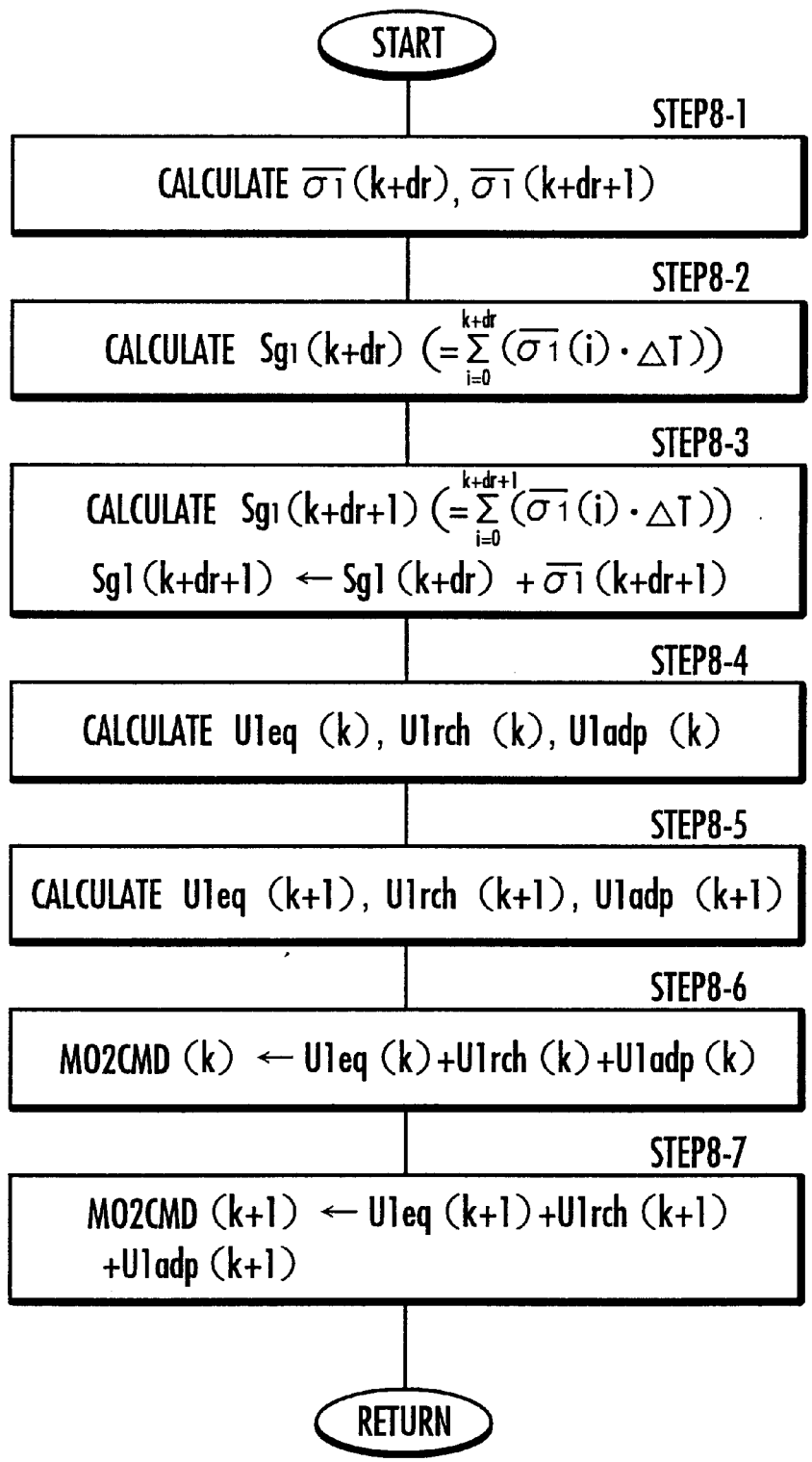
FIG. 13 is a flowchart of a subroutine of the flowchart shown in FIG. 10.

The calculating subroutine of STEP8 is shown in detail in FIG. 13.

As shown in FIG. 13, the sliding mode controller 17 calculates a value $\sigma1(k+dr)$ bar (corresponding to an estimated value, after the total dead time dr, of the switching function $\sigma1$ defined according to the equation (13)) of the switching function $\sigma1$ defined according to the equation (23) after the total dead time dr from the present control cycle, and a value $\sigma1(k+dr+1)$ bar (corresponding to an estimated value, after the time of (dr+1) control cycles, of the switching function $\sigma1$) of the switching function $\sigma1$ bar in one control cycle before the present control cycle in STEP8-1.

At this time, the value of the switching function $\sigma1(k+dr)$ bar is calculated according to the equation (23), using the present value RVO2(k+dr) bar and the preceding value RVO2(k+dr−1) bar (more accurately, their limited values) of the estimated differential output RVO2 bar determined according to the equation (12) by the estimator 16 in STEP7.

The value of the switching function $\sigma1(k+dr+1)$ bar is calculated according to the equation (23), using the present value RVO2(k+dr+1) bar of the temporary estimated differential output RVO2 bar determined according to the equation (51) by the estimator 16 in STEP7, and the present value RVO2(k+dr) bar of the estimated differential output RVO2 bar determined according to the equation (12).

If the switching function $\sigma1$, whether it may be the switching function $\sigma1(k+dr)$ bar or the switching function $\sigma1(k+dr+1)$ bar, is excessively large, then the value of the reaching control law input U1rch determined depending on the value of the switching function $\sigma1$ tends to be excessively large and the adaptive control law input U1adp tends to change abruptly, making the target differential output MO2CMD inappropriate in converging the output RVO2/OUT of the downstream $O_2$ sensor 6 stably to the target value RVO2/TARGET. According to the present embodiment, therefore, the value of the switching function $\sigma1$ is determined to fall within a predetermined allowable range, and if the value of the $\sigma1$ bar determined according to the equation (23) exceeds the upper or lower limit of the predetermined allowable range, then the value of the $\sigma1$ bar is forcibly set to the upper or lower limit of the predetermined allowable range.

Then, the sliding mode controller 17 accumulatively adds the product $\sigma1(k+dr)$ bar·$\Delta T$ of the value of the switching function $\sigma1(k+dr)$ bar calculated in each control cycle and the period $\Delta T$ (constant period) of the control cycles of the downstream exhaust system controller 10, i.e., adds the product $\sigma 1(k+dr)$ bar$\cdot \Delta T$ of the $\sigma 1(k+dr)$ bar calculated in the present control cycle and the period $\Delta T$ to the sum determined in the preceding control cycle, thereby calculating an integrated value (hereinafter referred to as "integrated value $Sg1(k+dr)$") of the $\sigma 1$ bar which is the calculated result of the term $\Sigma(\sigma 1$ bar$\cdot \Delta T)$ in the equation (25) in STEP8-2. Thereafter, the sliding mode controller 17 adds the switching function $\sigma 1(k+dr+1)$ bar calculated as described above in the present control cycle to the integrated value $Sg1(k+dr)$, thereby calculating an integrated value (hereinafter referred to as "integrated value $Sg1(k+dr+1)$") of the $\sigma 1$ bar which is the calculated result of the term $\Sigma(\sigma$ bar$\cdot \Delta T)$ in the equation (54) in STEP8-3.

In order to prevent the adaptive control law input U1adp, determined depending on either the integrated value $Sg1(k+dr)$ or and the integrated value $Sg1(k+dr+1)$, from becoming excessively large, the integrated value Sg1 is determined to fall within a predetermined allowable range. If the integrated value Sg1 determined by the above accumulative addition exceeds the upper or lower limit of the predetermined allowable range, then the integrated value Sg1 is forcibly set to the upper or lower limit of the predetermined allowable range.

The integrated values $Sg1(k+dr)$, $Sg1(k+dr+1)$ remain to be the present values (the values determined in the preceding control cycle) if the flag f/prism/on determined in STEPd in FIG. 8 is "0", i.e., if the target air-fuel ratio KCMD generated by the upstream exhaust system controller 11 is not used by the fuel processing controller 12.

Then, the sliding mode controller 17 calculates, STEP8-4, the equivalent control input U1eq(k), the reaching control law input U1rch(k), and the adaptive control law input U1adp(k) corresponding to the present control cycle according to the respective equations (22), (24), (25), using the present value $RVO2(k+dr)$ bar and the preceding value $RVO2(k+dr-1)$ bar of the estimated differential output RVO2 bar determined according to the equation (12) by the estimator 16 in STEP7, the switching function $\sigma 1(k+dr)$ bar and the integrated value $Sg1(k+dr)$ which have been determined respectively in STEP8-1, STEP8-2 in the present control cycle, and the gain coefficients ar1, ar2, br1 determined in STEP6 (these values are basically the identified gain coefficients ar1(k) hat, ar2(k) hat, br1hat determined by the identifier 15 in STEP5 in the present control cycle).

The sliding mode controller 17 calculates, STEP8-5, the equivalent control input U1eq(k+1), the reaching control law input U1rch(k+1), and the adaptive control law input U1adp(k+1) in one control cycle before the present control cycle according to the respective equations (52), (53), (54), using the present value $RVO2(k+dr+1)$ bar of the temporary estimated differential output RVO2 bar determined according to the equation (51) by the estimator 16 in STEP7, the present value $RVO2(k+dr)$ bar of the estimated differential output RVO2 bar determined according to the equation (12), the switching function $\sigma 1(k+dr+1)$ bar and the integrated value $Sg1(k+dr+1)$ which have been determined respectively in STEP8-1, STEP8-3 in the present control cycle, and the gain coefficients ar1, ar2, br1 determined in STEP6.

The sliding mode controller 17 adds the equivalent control input U1eq(k), the reaching control law input U1rch(k), and the adaptive control law input U1adp(k) determined in STEP8-4 according to the equation (15), thus calculating a target differential output MO2CMD(k) in the present control cycle, i.e., a control input to be given to the downstream exhaust system E1 for converging the output RVO2/OUT of the downstream $O_2$ sensor 6 to the target value RVO2/TARGET in STEP8-6.

Likewise, the sliding mode controller 17 adds the equivalent control input U1eq(k+1), the reaching control law input U1rch(k+1), and the adaptive control law input U1adp(k+1) determined in STEP8-5 according to the equation (55), thus calculating a temporary target differential output MO2CMD(k+1) which is the temporary target differential output MO2CMD in the next control cycle in STEP8-7.

Details of the processing sequence of the sliding mode controller 17 in STEP8 have been described above.

In FIG. 10, the sliding mode controller 17 carries out a process of determining the stability of the adaptive sliding mode control process carried out by the sliding mode controller 17, more specifically, the stability of a controlled state (hereinafter referred to as "RSLD controlled state") of the output RVO2/OUT of the downstream $O_2$ sensor 6 based on the adaptive sliding mode control process, and sets a value of a flag f/rstb indicative of whether the RSLD controlled state is stable or not in STEP9.

Figure 14:
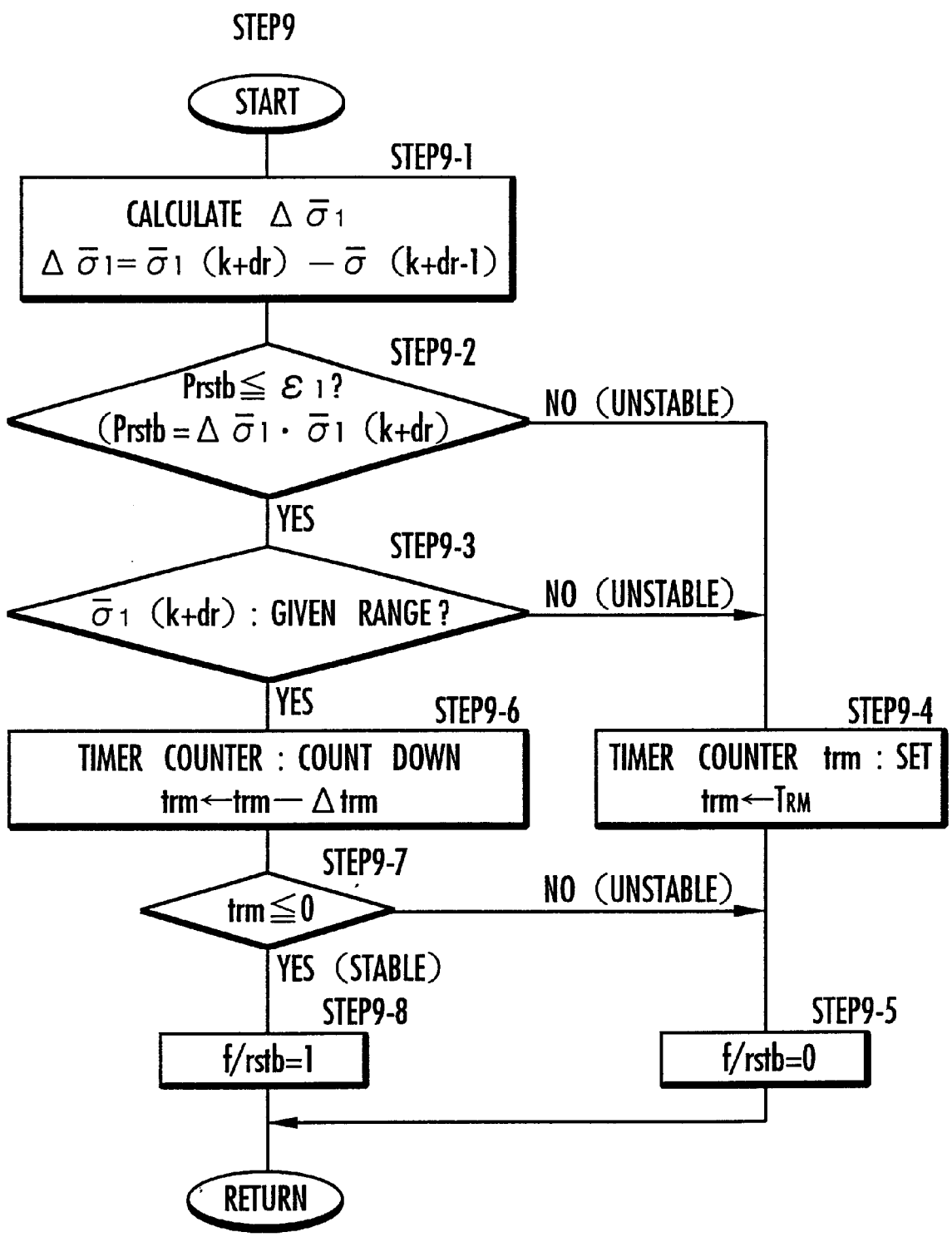
FIG. 14 is a flowchart of a subroutine of the flowchart shown in FIG. 10.

The process of determining the stability of the adaptive sliding mode control process is performed according to a flowchart shown in FIG. 14.

As shown in FIG. 14, the sliding mode controller 17 calculates a difference $\Delta\sigma 1$ bar (corresponding to a rate of change of the switching function $\sigma 1$ bar) between the present value $\sigma 1(k+dr)$ bar and the preceding value $\sigma 1(k+dr-1)$ bar of the switching function $\sigma 1$ bar calculated in STEP8-1 in STEP9-1.

Then, the sliding mode controller 17 decides whether or not a product $\Delta\sigma 1$ bar$\cdot \sigma 1(k+dr)$ bar (corresponding to the time-differentiated value of a Lyapunov function $\sigma$ bar $2/2$ relative to the $\sigma$ bar) of the difference $\Delta\sigma 1$ bar and the present value $\sigma 1(k+dr)$ bar of the switching function $\sigma 1$ bar is equal to or smaller than a predetermined value $\epsilon 1$ ($>0$) in STEP9-2.

The product $\Delta\sigma 1$ bar$\cdot \sigma 1(k+dr)$ bar (hereinafter referred to as "stability determining parameter Prstb") will be described below. When the stability determining parameter Prstb is Prstb>0, the value of the switching function bar is basically changing away from "0". When the stability determining parameter Prstb is Prstb$\leq$0, the value of the switching function $\sigma$ bar is basically converged to or converging to "0". Generally, in order to converge the controlled quantity stably to the target value in the sliding mode control process, it is necessary that the value of the switching function be stably converged to "0". Therefore, it can be determined whether the RSLD controlled state is stable or unstable depending on whether or not the value of the stability determining parameter Prstb is equal to or smaller than "0".

However, if the stability of the RSLD controlled state is judged by comparing the value of the stability determining parameter Prstb with "0", then the determined stability is affected merely when the switching function $\sigma 1$ bar contains slight noise.

According to the present embodiment, the predetermined value $\epsilon 1$ to be compared with the stability determining parameter Prstb ($=\Delta\sigma$ bar$\cdot \sigma(k+dr)$ bar) is of a positive value slightly greater than "0".

If Prstb>$\epsilon 1$ in STEP9-2, then the RSLD controlled state is judged as being unstable, and the value of a timer counter trm (count-down timer) is set to a predetermined initial value TRM (the timer counter trm is started) in order to inhibit the processing operation of the upstream exhaust system controller 11 using the target differential output MO2CMD(k) and the temporary target differential output MO2CMD(k+1) calculated in STEP8 for a predetermined time in STEP9-4. Thereafter, the value of the flag f/rstb is set to "0" (the flag f/rstb=0 represents that the RSLD controlled state is unstable) in STEP9-5. Thereafter, control returns to the main routine shown in FIG. 10.

If Prstb≦ε1 in STEP9-2, then the sliding mode controller 17 decides whether the present value σ1(k+dr) bar of the switching function σ1 bar falls within a predetermined range or not in STEP9-3.

If the present value σ1(k+dr) bar of the switching function σ1 bar does not fall within the predetermined range, then since the present value σ1(k+dr) bar of the switching function σ1 bar is spaced widely apart from "0", and hence the target differential output MO2CMD(k) or the temporary target differential output MO2CMD(k+1) determined in STEP8 may possibly be inappropriate in converging the output RVO2/OUT of the downstream $O_2$ sensor 6 stably to the target value RVO2/TARGET. Therefore, if the present value σ1(k+dr) bar of the switching function σ1 does not fall within the predetermined range in STEP9-3, then the RSLD controlled state is judged as being unstable, and the processing of STEP9-4 and STEP9-5 is executed to start the timer counter trm and set the value of the flag f/rstb to "0".

Because the value of the switching function σ1 bar is limited in the processing of STEP8-1 that is carried out by the sliding mode controller 17, the judging process of STEP9-3 may be dispensed with.

If the present value σ1(k+dr) bar of the switching function σ1 bar falls within the predetermined range in STEP9-3, then the sliding mode controller 17 counts down the timer counter trm for a predetermined time Δtrm in STEP9-6. The sliding mode controller 17 then decides whether or not the value of the timer counter trm is equal to or smaller than "0", i.e., whether a time corresponding to the initial value TRM has elapsed from the start of the timer counter trm or not, in STEP9-7.

If trm>0, i.e., if the timer counter trm is still measuring time and its set time has not yet elapsed, then the RSLD controlled state tends to be unstable as no substantial time has elapsed since the RSLD controlled state was judged as being unstable in STEP9-2 or STEP9-3. Therefore, the value of the flag f/rstb is set to "0" in STEP9-5.

If trm≦0 in STEP9-7, i.e., if the set time of the timer counter trm has elapsed, then the RSLD controlled state is judged as being stable, and the value of the flag f/rstb is set to "1" (the flag f/rstb=1 represents that the RSLD controlled state is stable) in STEP9-8.

The sliding mode controller 17 determines the stability of the RSLD controlled state according to the subroutine shown in FIG. 14. If the RSLD controlled state is judged as being unstable, then the value of the flag f/rstb is set to "0", and if the RSLD controlled state is judged as being stable, then the value of the flag f/rstb is set to "1".

The above process of determining the stability of the RSLD controlled state is illustrated by way of example. However, the stability of the RSLD controlled state may be determined by another process. For example, the frequency with which the value of the stability determining parameter Prstb is greater than the predetermined value ε1 in each predetermined period longer than the control cycles may be determined. If the frequency is in excess of a predetermined value, then the RSLD controlled state may be judged as being unstable. Otherwise, the RSLD controlled state may be judged as being stable.

Referring back to FIG. 10, after a value of the flag f/rstb indicative of the stability of the RSLD controlled state has been set, the sliding mode controller 17 determines the value of the flag f/rstb in STEP10. If the value of the flag f/rstb is "1", i.e., if the RSLD controlled state is judged as being stable, then the sliding mode controller 17 limits the target differential output MO2CMD(k) and the temporary target differential output MO2CMD(k+1) determined in STEP8 in the present control cycle in STEP11.

Specifically, the sliding mode controller 17 determines whether the value of each of the target differential output MO2CMD(k) and the temporary target differential output MO2CMD(k+1) falls within a predetermined allowable range or not. If the value of each of the target differential output MO2CMD(k) and the temporary target differential output MO2CMD(k+1) falls within the predetermined allowable range, then the sliding mode controller 17 forcibly limits the value of each of the target differential output MO2CMD(k) and the temporary target differential output MO2CMD(k+1) to the upper or lower limit of the predetermined allowable range.

If f/rstb=0 in STEP10, i.e., if the RSLD controlled state is judged as being unstable, then the sliding mode controller 17 forcibly sets the value of the target differential output MO2CMD(k) in the present control cycle to "0" in STEP12.

Details of the processing sequence of the downstream exhaust system controller 10 have been described above.

The target differential output MO2CMD finally determined in each control cycle in STEP11 or STEP12 is stored as time-series data for respective control cycles in a memory (not shown), and used in the processing operation of the estimator 16 in STEP7. Of the stored target differential output MO2CMD, the present and preceding values MO2CMD(k), MO2CMD(k−1) are given, together with the present value MO2CMD(k+1) of the temporary target differential output MO2CMD, to the upstream exhaust system controller 11.

The upstream exhaust system controller 11 will now be described below. Basic details of the processing sequence of the upstream exhaust system controller 11 are identical to those of the downstream exhaust system controller 10.

As shown in FIG. 15, the upstream exhaust system controller 11 decides whether its own processing (the processing of the identifier 20, the estimator 21, and the sliding mode controller 22) is to be executed or not, and sets a value of a flag f/mcal indicative of whether the processing is to be executed or not in STEP21. When the value of the flag f/mcal is "0" it means that the processing of the upstream exhaust system controller 11 is not to be executed, and when the value of the flag f/mcal is "1", it means that the processing of the upstream exhaust system controller 11 is to be executed.

Figure 16:
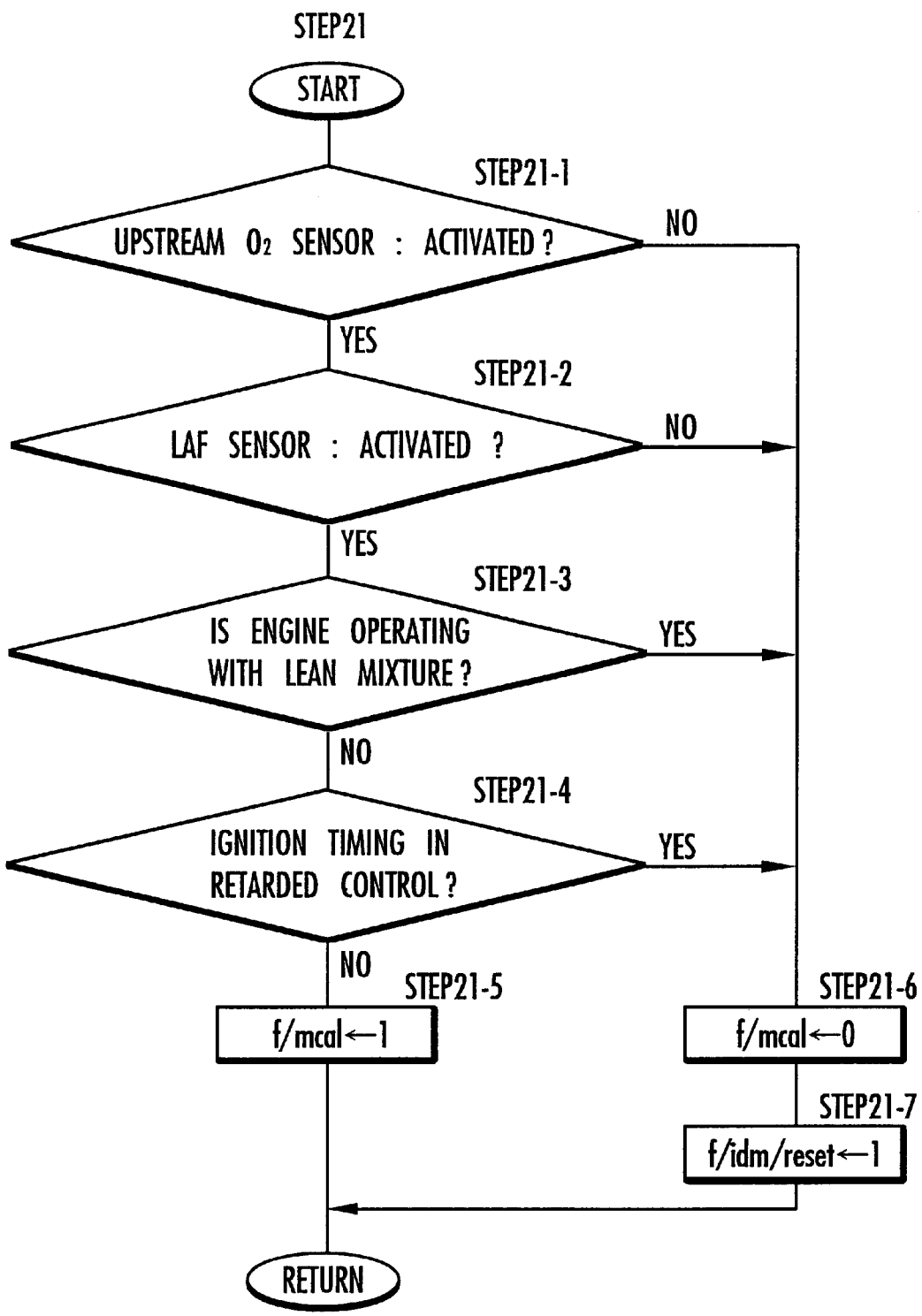
FIG. 16 is a flowchart of a subroutine of the flowchart shown in FIG. 15.

The deciding subroutine in STEP1 is shown in detail in FIG. 16. As shown in FIG. 16, the upstream exhaust system controller 11 decides whether the upstream $O_2$ sensor 7 is activated or not in STEP21-1 and whether the LAF sensor 8 is activated or not in STEP21-2 in the same manner as with the processing of STEP1-1, STEP1-2 carried out by the downstream exhaust system controller 10.

The upstream exhaust system controller 11 decides whether the internal combustion engine 1 is operating with a lean air-fuel mixture or not in STEP21-3. The upstream exhaust system controller 11 decides whether the ignition timing of the internal combustion engine 1 is retarded for early activation of the catalytic converters 3, 4 immediately after the start of the internal combustion engine 1 or not in STEP21-4.

If the conditions of STEP21-1, STEP21-2 are not satisfied, and if the conditions of STEP21-3, STEP21-4 are satisfied, then the flag f/mcal is set to "0" so as not to execute the processing of the upstream exhaust system controller 11 in STEP21-6. Then, in order to initialize the identifier 20, the value of a flag f/idm/reset indicative of whether the identifier 20 is to be initialized or not is set to "1" in STEP21-7. When the value of the flag f/idm/reset is "1", it means that the identifier 20 is to be initialized, and when the value of the flag f/idm/reset is "0", it means that the identifier 20 is not to be initialized.

If the conditions of STEP21-1, STEP21-2 are satisfied, and if the conditions of STEP21-3, STEP21-4 are not satisfied, then the flag f/mcal is set to "1" so as to execute the processing of the upstream exhaust system controller 11, i.e., to generate the target air-fuel ratio KCMD in STEP21-5.

In FIG. 15, after the above deciding subroutine, the upstream exhaust system controller 11 decides whether a process of identifying (updating) the gain coefficients am1, am2, bm1 with the identifier 20 is to be executed or not, and sets a value of a flag f/idm/cal indicative of whether the process of identifying (updating) the gain coefficients am1, am2, bm1 is to be executed or not in STEP22.

The deciding subroutine of STEP22 is carried out as follows: The upstream exhaust system controller 11 decides whether the throttle valve of the internal combustion engine 1 is fully open or not, and also decides whether the supply of fuel to the internal combustion engine 1 is being stopped or not. If either one of these conditions is satisfied, then the value of the flag f/idm/cal is set to "0". If neither one of these conditions is satisfied, then the value of the flag f/idm/cal is set to "1" to identify the gain coefficients am1, am2, bm1 with the identifier 20.

The upstream exhaust system controller 11 calculates the latest differential output MVO2(k) (=MVO2/OUT−MVO2/BASE of the upstream $O_2$ sensor 7 and the latest differential output kact(k) (=KACT−FLAF/BASE of the LAF sensor 8 respectively with the subtractors 18, 19 in STEP23. Specifically, the subtractors 18, 19 select latest ones of the time-series data of the output MVO2/OUT of the upstream $O_2$ sensor 7 and the output KACT of the LAF sensor 8 which have been read and stored in the non-illustrated memory in STEPa shown in FIG. 8, and calculate the differential outputs MVO2(k), kact(k). The upstream exhaust system controller 11 stores the differential outputs MVO2(k), kact(k), as well as data calculated in the past, in a time-series manner in the non-illustrated memory.

Then, in STEP24, the upstream exhaust system controller 11 determines the value of the flag f/mcal set in STEP21. If the value of the flag f/mcal is "0", i.e., if the processing of the upstream exhaust system controller 11 is not to be executed, then the upstream exhaust system controller 11 forcibly sets the target differential air-fuel ratio kcmd(k) in the present control cycle to a predetermined value in STEP33. The predetermined value in STEP33 may be a predetermined fixed value (for example, "0") or the value of the target differential air-fuel ratio kcmd determined in the preceding control cycle.

If the target differential air-fuel ratio kcmd(k) is set to the predetermined value, then the adder 23 in the upstream exhaust system controller 11 adds the air-fuel ratio reference value FLAF/BASE to the target differential air-fuel ratio kcmd(k), thereby determining the target air-fuel ratio KCMD(k) in the present control cycle in STEP32. Then, the processing in the present control cycle is finished.

If the value of the flag f/mcal is "1" in STEP24, i.e., if the processing of the upstream exhaust system controller 11 is to be executed, then the upstream exhaust system controller 11 effects the processing of the identifier 20 in STEP25.

Figure 17:
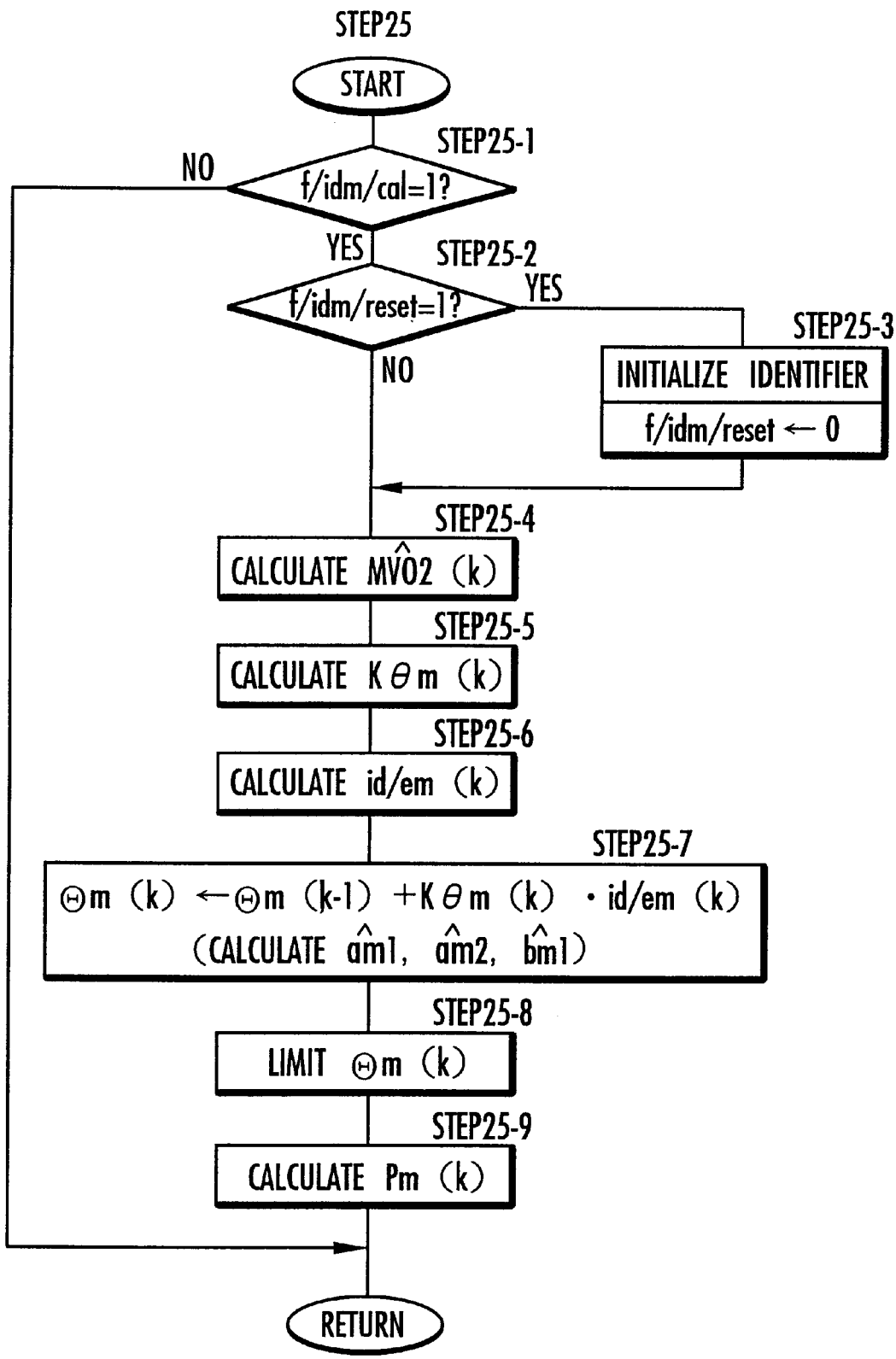
FIG. 17 is a flowchart of a subroutine of the flowchart shown in FIG. 15.

The processing subroutine of STEP25 is shown in detail in FIG. 17. The processing of the identifier 20 is the same as the processing of the identifier 15 in the downstream exhaust system controller 10, and hence will briefly be described below. Basically, the identifier 20 calculates identified gain coefficients am1(k) hat, am2(k) hat, bm1(k) hat in the present control cycle in STEP25-4, STEP25-5, STEP25-6, STEP25-7.

In STEP25-4, the identifier 20 calculates the identified differential output MVO2(k) hat according to the equation (27), using the past data MVO2(k−1), MVO2(k−2) of the differential output MVO2 and the past data kact(k−dm1−1) of the differential output kact which are calculated in each control cycle in STEP23, and the identified gain coefficients am1(k−1) hat, am2(k−1) hat, bm1(k−1) hat determined in the preceding control cycle.

In STEP25-5, the identifier 20 calculates the vector KΘm according to the equation (32).

In STEP25-6, the identifier 20 calculates the identified error id/em(k) by filtering a value calculated according to the equation (28) from the differential output MVO2 and the identified differential output MVO2 hat, with predetermined frequency-pass characteristics (specifically, low-pass characteristics). The filtering frequency-pass characteristics are determined in view of the frequency characteristics of the upstream exhaust system Ee2 including the first catalytic converter 3, and may not necessarily be the same as the filtering frequency-pass characteristics used by the identifier 15 in the downstream exhaust system controller 10.

In STEP25-7, the identifier 20 calculates identified gain coefficients am1(k) hat, am2(k) hat, bm1(k) hat according to the equation (29) using the identified error id/em(k) and KΘm(k). The identifier 20 limits the combination of the identified gain coefficients am1(k) hat, am2(k) hat to a certain combination and also limits the identified gain coefficient bm1(k) hat to a predetermined range in STEP25-8, thus finally determining the identified gain coefficients am1(k) hat, am2(k) hat, bm1(k) hat in the present control cycle.

If the value of the flag f/idm/cal set in STEP22 is "0", i.e., if the throttle valve of the internal combustion engine 1 is fully open or the supply of fuel to the internal combustion engine 1 is being stopped, then the above processing of the identifier 20 is not carried out (NO in STEP25-1). If the value of the flag f/idm/reset with respect to the initialization of the identifier 20 is "1" (YES in STEP25-2), the identifier 20 is initialized to initialize the identified gain coefficients am1 hat, am2 hat, bm1 hat in STEP25-3. In STEP25-8, STEP25-9, the matrix Pm(k) is updated according to the equation (33) for the processing of the next control cycle.

In the main routine shown in FIG. 15, after the processing of the identifier 20 is carried out, the upstream exhaust system controller 11 determines the values of the gain coefficients am1, am2, bm1 in STEP26.

More specifically, if the value of the flag f/idm/cal is "1", i.e., if the gain coefficients am1, am2, bm1 have been identified by the identifier 25, then the gain coefficients am1, am2, bm1 are set to the respective identified gain coefficients am1(k) hat, am2(k) hat, bm1(k) hat determined by the identifier 20 in STEP25. If f/idm/cal=0, i.e., if the gain coefficients am1, am2, bm1 have not been identified by the identifier 20, then the gain coefficients am1, am2, bm1 are set to respective predetermined values. These predetermined values may be predetermined fixed values. However, if the condition in which f/idm/cal=0 is temporary, i.e., if the identifying process carried out by the identifier 20 is temporarily interrupted, then the gain coefficients am1, am2, bm1 may be set to the identified gain coefficients am1 hat, am2 hat, bm1 hat determined by the identifier 20 immediately before the flag f/idm/cal becomes 0.

Then, the upstream exhaust system controller 11 effects a processing operation of the estimator 21, i.e., calculates the estimated differential output MVO2(k+dm) bar which is an estimated value for the differential output MVO2 of the upstream $O_2$ sensor 7 after the total dead time dm from the present control cycle in STEP27.

Specifically, the estimator 21 calculates the coefficients αm1, αm2, βm(j) (j=1, 2, ..., dm) to be used in the equation (36), using the gain coefficients am1, am2, bm1 determined in STEP26 (these values are basically the identified gain coefficients am1(k) hat, am2(k) hat, bm1(k) hat which have been limited in STEP25-8), according to the definition in the equation (35).

Then, the estimator 21 calculates the estimated differential output MVO2(k+dm) bar (estimated value of the differential output MVO2 after the total dead time dm from the time of the present control cycle) according to the equation (36), using the two time-series data MVO2(k), MVO2(k−1) and the (dm1+1) time-series data kact(k), kact(k−1), ..., kact(k−dm1), from before the present control cycle, of the differential output MVO2 of the upstream $O_2$ sensor 7 and the differential output kact of the LAF sensor 8 which are calculated in each control cycle in STEP23 shown in FIG. 15, the (dm2−1) time-series data kcmd(k−1), ..., kcmd(k−dm2+1) (obtained in STEP33 or STEP31 before the preceding control cycle) of the target differential air-fuel ratio kcmd determined in the past control cycles by the upstream exhaust system controller 11, and the coefficients αm1, αm2, βm(j) (j=1, 2, ..., dm) calculated as described above.

The estimated differential output MVO2(k+dm) which has been calculated as described above is limited to a predetermined allowable range in order that its value will be prevented from being excessively large or small. If its value is in excess of the upper or lower limit of the predetermined allowable range, it is forcibly set to the upper or lower limit of the predetermined allowable range. In this manner, the value of the estimated differential output MVO2(k+dm) bar is finally determined. Usually, however, the value calculated according to the equation (36) becomes the estimated differential output MVO2(k+dm) bar.

After the estimator 21 has determined the estimated differential output MVO2(k+dm) bar for the upstream $O_2$ sensor 7, the sliding mode controller 22 of the upstream exhaust system controller 11 calculates the target differential output kcmd(k) in the present control cycle in STEP28.

Figure 18:
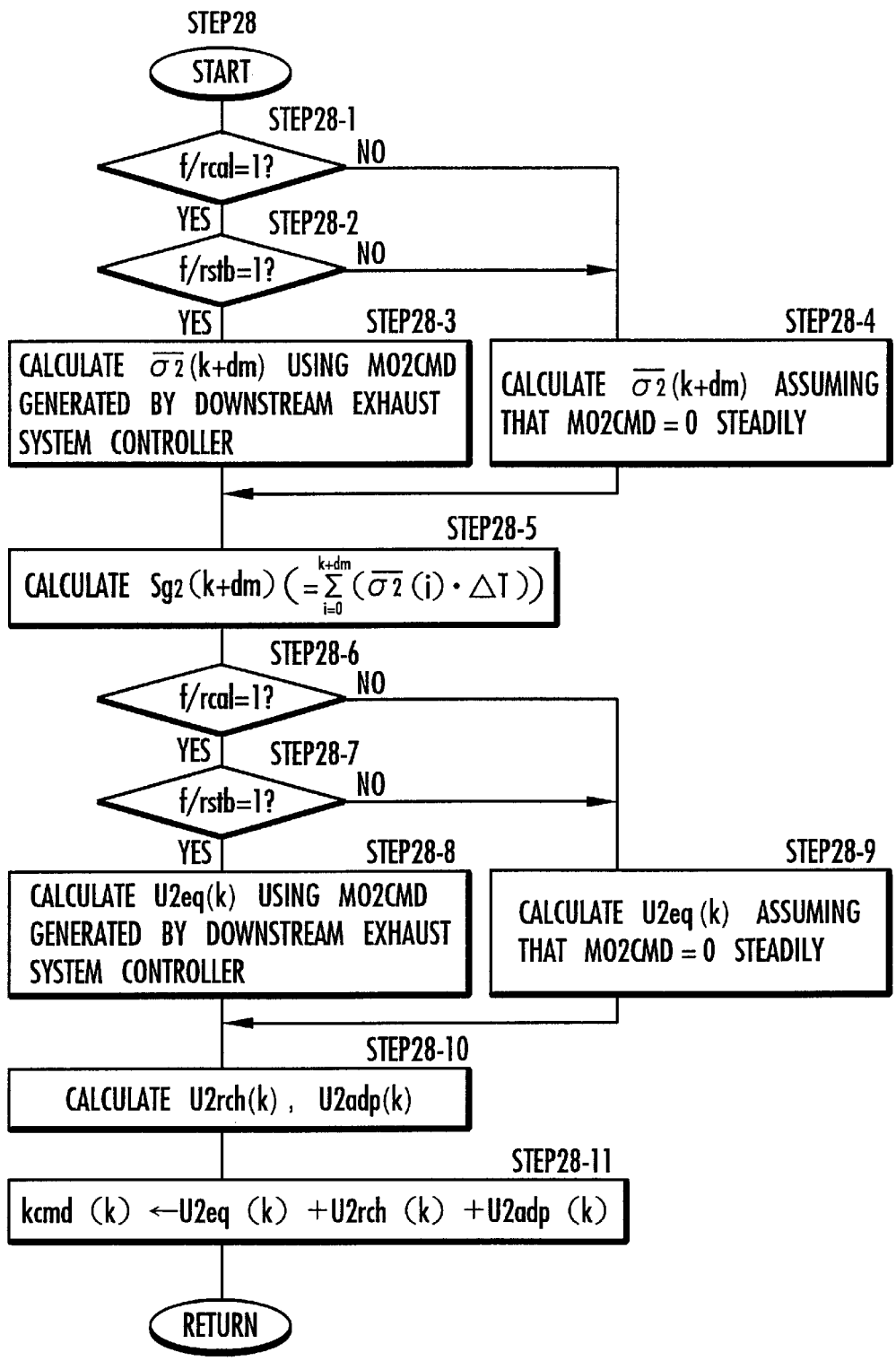
FIG. 18 is a flowchart of a subroutine of the flowchart shown in FIG. 15.

The calculating subroutine of STEP28 is shown in detail in FIG. 18.

The sliding mode controller 22 determines the values of the flags f/rcal, f/rstb set respectively in STEP1, STEP9 (FIG. 10) by the downstream exhaust system controller 10 respectively in STEP28-1, STEP28-2.

If f/rcal=1 and f/rstb=1, i.e., if the processing of the downstream exhaust system controller 10 is performed normally and the RSLD controlled state is judged as being stable (normal), then the sliding mode controller 22 calculates the value σ2(k+dm) bar of the switching function σ2 bar defined according to the equation (47) after the total dead time dm from the present control cycle (the value σ2(k+dm) bar corresponds to an estimated value after the total dead time dm of the switching function σ2 defined according to the equation (38)) according to the equation (47) using the target differential outputs MO2CMD(k), MO2CMD(k−1) generated in the present and preceding control cycles by the downstream exhaust system controller 10 in STEP28-3.

In calculating the value σ2(k+dm) bar of the switching function σ2 bar, the present value MOV2(k+dm) bar and the preceding value MVO2(k+dm−1) bar of the estimated differential output MVO2 bar determined according to the equation (36) by the estimator 21 in STEP27, more accurately the limited values of those values, are used.

If f/rcal=0 in STEP28-1, then since the processing of the downstream exhaust system controller 10 is not performed, the downstream exhaust system controller 10 cannot appropriately generate time-series data of the target differential output MO2CMD. In this case, since the flag f/mcal is set to "1" in STEP21 (FIG. 15), the situation where f/rcal=0 in STEP28-1 is a situation where the downstream $O_2$ sensor 6 has not yet been activated, as can be seen from a comparison between the flowchart shown in FIG. 16 relative to the setting of the flag f/mcal and the flowchart shown in FIG. 11 relative to the setting of the flag f/rcal.

If f/rstb=0 in STEP28-2, then since the RSLD controlled state is judged as being unstable, the downstream exhaust system controller 10 cannot appropriately generate time-series data of the target differential output MO2CMD.

In these cases, the sliding mode controller 22 determines that the target differential output MO2CMD is steadily "0", i.e., the target value MVO2/TARGET for the output MVO2/OUT of the upstream $O_2$ sensor 7 is steadily the same as the reference value MVO2/BASE (=RVO2/TARGET), and calculates the value of the switching function σ2(k+dm) bar according to the equation (47) in STEP28-4.

Specifically, the sliding mode controller 22 calculates the value of the switching function σ2(k+dm) bar according to the following equation (67) which is obtained when MO2CMD=0 in the equation (47):

$$\overline{\sigma2}(k) = sm1 \cdot \overline{MVO2}(k) + sm2 \cdot \overline{MVO2}(k-1) \qquad (67)$$

As in STEP28-3, the present value MOV2(k+dm) bar and the preceding value MVO2(k+dm−1) bar of the estimated differential output MVO2 bar determined by the estimator 21 in STEP27 are used.

For the same reasons as in STEP8-1 with respect to the downstream exhaust system controller 10, in STEP28-3 and STEP28-4, the value of the switching function σ2(k+dm) bar is determined to fall within a predetermined allowable range, and if the value of the σ2 bar determined as described above exceeds the upper or lower limit of the predetermined allowable range, then the value of the σ2 bar is forcibly set to the upper or lower limit of the predetermined allowable range.

Then, the sliding mode controller 22 accumulatively adds the product σ2(k+dm) bar·ΔT of the value of the switching function σ2(k+dm) bar calculated in each control cycle and the period ΔT (constant period) of the control cycles of the downstream and upstream exhaust system controllers 10, 11, i.e., adds the product σ2(k+dm) bar·ΔT of the σ2(k+dm) bar calculated in the present control cycle and the period ΔT to the sum determined in the preceding control cycle, thereby calculating an integrated value (hereinafter referred to as "integrated value Sg2(k+dm)") of the σ2 bar which is the calculated result of the term Σ(σ2 bar·ΔT) in the equation (49) in STEP28-5.

For the same reasons as in STEP8-2 with respect to the downstream exhaust system controller 10, the value of the integrated value Sg2(k+dm) is determined to fall within a predetermined allowable range, and if the integrated value Sg2 determined by the above accumulative addition exceeds the upper or lower limit of the predetermined allowable range, then the integrated value Sg2 is forcibly set to the upper or lower limit of the predetermined allowable range.

If the flag f/prism/on established in STEPd (FIG. 8) by the fuel processing controller 12 is "0", i.e., if the target air-fuel ratio KCMD generated by the upstream exhaust system controller 111 is not used by the fuel processing controller 12, then the integrated value Sg2(k+dm) is kept at the present value (the value determined in the preceding control cycle).

Then, the sliding mode controller 22 makes the same decisions as in STEP28-1, STEP28-2 in STEP28-6, STEP28-7. If f/rcal=1 and f/rstb=1 (normal), then the sliding mode controller 22 calculates, in STEP28-8, the equivalent control input U2eq(k) in the present control cycle according to the equation (50), using the present value MVO2(k+dm) bar and the preceding value MVO2(k+dm−1) bar of the estimated differential output MVO2 bar determined according to the equation (36) by the estimator 21 in STEP27, the present value MO2CMD(k+1) of the temporary target differential output MO2CMD and the present value MO2CMD (k) and the preceding value MO2CMD(k−1) of the target differential output MO2CMD calculated by the downstream exhaust system controller 10, and the gain coefficients ar1, ar2, br1 determined in step S26 (which are basically the identified gain coefficients am1(k) hat, am2(k) hat, bm1(k) hat determined by the identifier 20 in STEP25 in the present control cycle).

If f/rcal=0 in STEP28-6 or f/rstb=0 in STEP28-7, then the sliding mode controller 22 determines that the target differential output MO2CMD is steadily "0" as in STEP28-4, and calculates the equivalent control input U2eq(k) according to the equation (50) in STEP28-9.

In this case, the sliding mode controller 22 calculates the equivalent control input U2eq(k) according to the following equation (68) which is obtained when MO2CMD(k+1)=MO2CMD(k)=MO2CMD(k−1) in the equation (50):

$$U2eq(k) = \frac{-1}{sm1 \cdot bm1} \cdot \{[sm1 \cdot (am1-1) + sm2] \cdot \overline{MVO2}(k+dm) + (sm1 \cdot am2 - sm2) \cdot \overline{MVO2}(k+dm-1)\} \quad (68)$$

The sliding mode controller 22 calculates the reaching law input U2rch(k) and the adaptive law input U2adp(k) in the present control cycle according to the respective equations (48), (49), using the value of the switching function σ2(k+dm) bar determined in the present control cycle in STEP28-3 or STEP28-4, the integrated value Sg2(k+dm) of the switching function σ2 bar determined in STEP28-5, and the gain coefficient br1 determined in STEP26 in STEP28-10.

The sliding mode controller 22 adds the equivalent control input U2eq(k) determined in STEP28-8 or STEP28-9 and the reaching law input U1rch(k) and the adaptive law input U1adp(k) determined in STEP28-10 according to the equation (40) thereby to calculate the target differential air-fuel ratio kcmd(k) in the present control cycle in STEP28-11.

At this time, in an ordinary situation where f/rcal=1 and f/rstb=1, the calculated target differential air-fuel ratio kcmd (k) is a control input to be given to the upstream exhaust system E2, which is also a control input to be given to the entire exhaust system E, for converging the differential output MVO2 of the upstream $O_2$ sensor 7 to the target differential air-fuel ratio MO2CMD which the downstream exhaust system controller 10 has generated to converge the output RVO2/OUT of the downstream $O_2$ sensor 6 to the target value RVO2/TARGET. In a situation where f/rcal=0 or f/rstb=0, i.e., in a situation where the downstream exhaust system controller 10 is incapable of generating an appropriate target differential output MO2CMD for converging the output RVO2/OUT of the downstream $O_2$ sensor 6 to the target value RVO2/TARGET, the target differential air-fuel ratio kcmd(k) is a control input to be given to the upstream exhaust system E2 for converging the differential output MVO2 of the upstream $O_2$ sensor 7 to "0", i.e., for converging the output MVO2/OUT to the reference value MVO2/BASE (=RVO2/TARGET).

The details of the processing of the sliding mode controller 22 in STEP28 have been described above.

Referring back to FIG. 15, the sliding mode controller 22 performs a process of determining the stability of a controlled state (hereinafter referred to as "MSLD controlled state") of the output MVO2/OUT of the upstream $O_2$ sensor 7 based on the adaptive sliding mode control process which is performed by the sliding mode controller 22, and sets a value of a flag f/mstb indicative of whether the MSLD controlled state is stable or not in STEP29. When the value of the flag f/mstb is "0", it means that the MSLD controlled state is unstable, and when the value of the flag f/mstb is "1", it means that the MSLD controlled state is stable.

Figure 19:
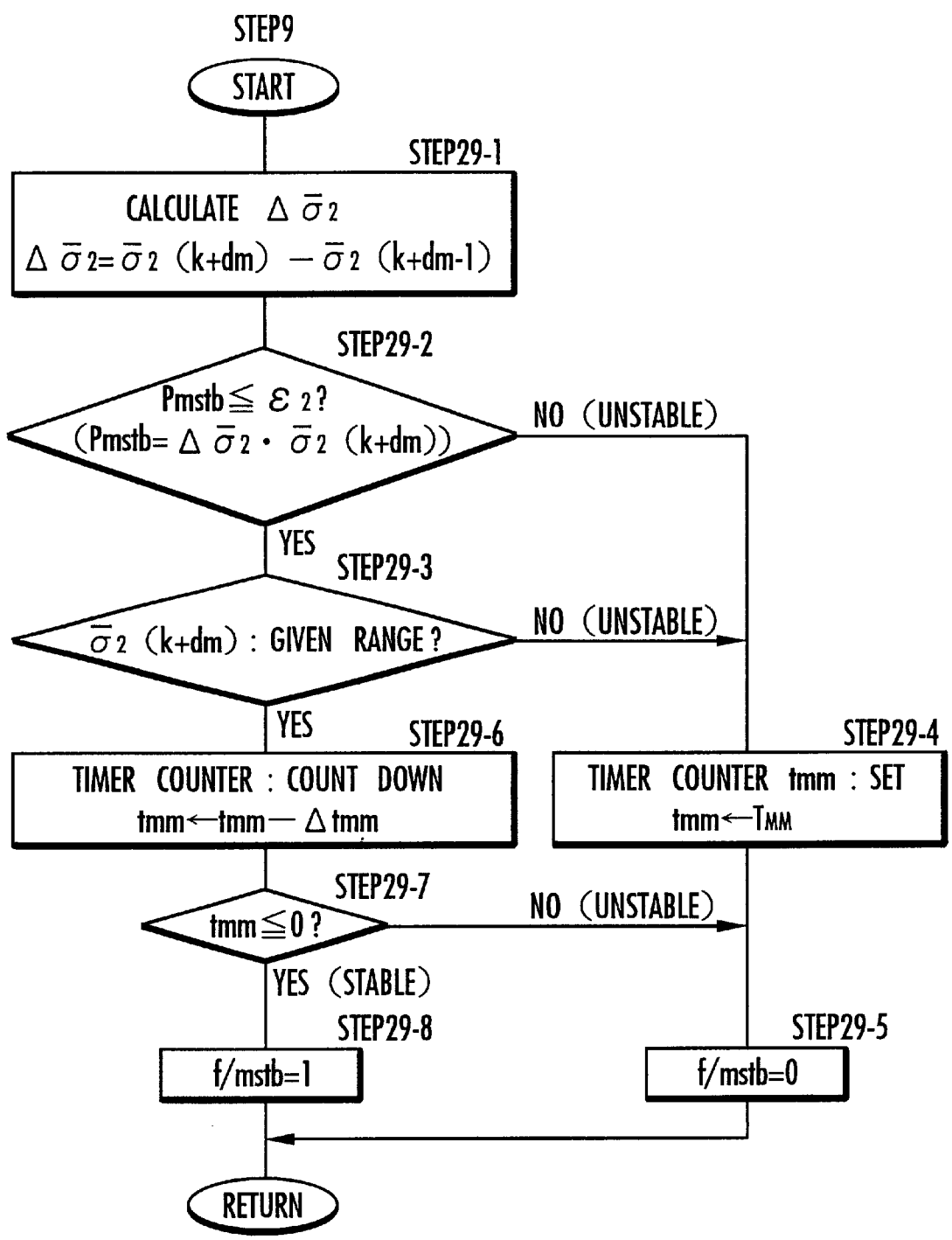
FIG. 19 is a flowchart of a subroutine of the flowchart shown in FIG. 15.

The process of determining the stability of the MSLD controlled state is carried out according to a flowchart shown in FIG. 19. Since the process of determining the stability of the MSLD controlled state is similar to the determining process carried out by the downstream exhaust system controller 10 in STEP9, the process of determining the stability of the MSLD controlled state will briefly be described below.

As shown in FIG. 19, the sliding mode controller 22 calculates a difference Δσ2 bar between the present value σ2(k+dm) bar and the preceding value σ2(k+dm−1) bar of the switching function σ2 bar calculated in STEP28-3 or STEP28-4 in STEP29-1. Then, the sliding mode controller 22 decides whether or not a stability determining parameter Pmstb represented by a product Δσ2 bar·σ2(k+dm) bar of the difference Δσ2 bar and the present value σ2(k+dm) bar of the switching function σ2 bar is equal to or smaller than a predetermined value ε2 in STEP29-2. The sliding mode controller 22 decides whether the present value σ2(k+dm) bar of the switching function σ2 bar falls within a predetermined range or not in STEP29-3. The predetermined value ε2 is a positive value slightly greater than "0".

If neither one of the conditions of STEP29-2, STEP29-3 is satisfied, then since the MSLD controlled state is judged as being unstable, the value of a timer counter tmm (countdown timer) is set to a predetermined initial value TMM (the timer counter tmm is started) in order to inhibit the determination of the target air-fuel ratio KCMD(k) based on the target differential air-fuel ratio kcmd(k) calculated in STEP28 for a predetermined time in STEP29-4. Thereafter, the value of the flag f/mstb is set to "0" in STEP29-5.

If both of the conditions of STEP29-2, STEP29-3 are satisfied, then the sliding mode controller 22 counts down the timer counter tmm for a predetermined time Δtmm in STEP29-6. The sliding mode controller 22 then decides whether or not the value of the timer counter tmm is equal to or smaller than "0", i.e., whether a time corresponding to the initial value TMM has elapsed from the start of the timer counter tmm or not, in STEP29-7.

If the timer counter tmm is still measuring time, then since a period of time that has elapsed after the MSLD controlled state is judged as being unstable in STEP29-2 or STEP29-3 is short, and the MSLD controlled state tends to be unstable, the value of the flag f/mstb is set to "0" in STEP29-5.

If the set time of the timer counter tmm has elapsed, then the MSLD controlled state is judged as being stable, and the value of the flag f/mstb is set to "1" in STEP29-8.

Inasmuch as the value of the switching function σ2 bar is limited in the processing of STEP28-3 or STEP28-4 which is carried out by the sliding mode controller 22, the decision process of STEP29-3 may be dispensed with.

As with the process of determining the stability of the RSLD controlled state with the sliding mode controller 17, the stability of the MSLD controlled state may be determined by another process.

In FIG. 15, after a value of the flag f/mstb indicative of the stability of the MSLD controlled state has been set, the sliding mode controller 22 determines the value of the flag f/mstb in STEP30. If f/mstb=1, i.e., if the MSLD controlled state is judged as being stable, then the sliding mode controller 22 limits the target differential air-fuel ratio kcmd (k) determined in STEP28 in the present control cycle in STEP31.

In the limiting process, the sliding mode controller 22 determines whether the value of the target differential air-fuel ratio kcmd(k) falls within a predetermined allowable range or not. If the value of the target differential air-fuel ratio kcmd(k) exceeds the upper or lower limit of the predetermined allowable range, then the sliding mode controller 22 forcibly limits the value of the target differential air-fuel ratio kcmd(k) to the upper or lower limit of the predetermined allowable range.

The adder 23 in the upstream exhaust system controller 11 adds the air-fuel ratio reference value FLAF/BASE to the target differential air-fuel ratio kcmd(k) thus limited, thereby determining the target air-fuel ratio KCMD(k) in the present control cycle in STEP32. Then, the processing in the present control cycle is finished.

If f/mstb=0 in STEP30, i.e., if the MSLD controlled state is judged as being unstable, then the sliding mode controller 22 forcibly sets the target differential air-fuel ratio kcmd(k) in the present control cycle to a predetermined value in STEP33.

After STEP33, the adder 23 in the upstream exhaust system controller 11 adds the air-fuel ratio reference value FLAF/BASE to the target differential air-fuel ratio kcmd(k), thereby determining the target air-fuel ratio KCMD(k) in the present control cycle in STEP32. Then, the processing in the present control cycle is finished.

Details of the operation of the plant control system according to the present embodiment have been described above.

The operation of the plant control system is summarized as follows: Basically, i.e., normally, the downstream exhaust system controller 10 calculates in each control cycle the target differential output MO2CMD corresponding to the target value for the output MVO2/OUT of the upstream $O_2$ sensor 7 as a control input to be given to the downstream exhaust system E1 in order to converge the output RVO2/OUT of the downstream $O_2$ sensor 6 to the target value RVO2/TARGET. The upstream exhaust system controller 11 calculates in each control cycle the target differential air-fuel ratio kcmd, and the target air-fuel ratio KCMD, as a control input to be given to the upstream exhaust system E2 in order to converge the differential output MVO2 of the upstream $O_2$ sensor 7 to the target differential output MVO2CMD. The fuel processing controller 12 adjusts the fuel injection quantity of the internal combustion engine 1 to converge the output (the detected air-fuel ratio) of the LAF sensor 8 to the target air-fuel ratio KCMD for thereby manipulating the air-fuel ratio of the internal combustion engine 1 into the target air-fuel ratio KCMD. As a result, the air-fuel ratio of the internal combustion engine 1 is manipulated in order to converge the output RVO2/OUT of the downstream $O_2$ sensor 6 to the target value RVO2/TARGET. The plant control system thus enables the exhaust gas purifier 5 to have an optimum exhaust gas purifying capability irrespective of aging of the catalytic converters 3, 4 of the exhaust gas purifier 5.

The downstream exhaust system controller 10 takes into account the total dead time dr that is the sum of the dead time dr1 of the downstream exhaust system E1, which is an object to be controlled by the downstream exhaust system controller 10, and the dead time dr2 of the system for generating an input to the downstream exhaust system E1 (the system made up of the upstream exhaust system controller 11, the fuel processing controller 12, the internal combustion engine 1, and the upstream exhaust system E2). The downstream exhaust system controller 10 calculates in each control cycle the target differential output MO2CMD (the target value for the differential output MVO2 of the upstream $O_2$ sensor 7) as a control input to be given to the downstream exhaust system E1 in order to converge the estimated differential output RVO2(k+dr) bar, which is calculated by the estimator 16 as an estimated value for the differential output RVO2 of the downstream $O_2$ sensor 6 after the total dead time dr, to "0", stated otherwise, to converge an estimated value (=RVO2(k+dr) bar+RVO2/TARGET) for the output RVO2/OUT of the downstream $O_2$ sensor 6 after the total dead time dr to the target value RVO2/TARGET.

Similarly, the upstream exhaust system controller 11 takes into account the total dead time dm that is the sum of the dead time dm1 of the upstream exhaust system E2, which is an object to be controlled by the upstream exhaust system controller 11, and the dead time dm2 of the system for generating an input to the upstream exhaust system E2 (the system made up of the fuel processing controller 12 and the internal combustion engine 1). The upstream exhaust system controller 11 calculates in each control cycle the target differential air-fuel ratio kcmd and the target air-fuel ratio KCMD (=kcmd+FLAF/BASE) as a control input to be given to the upstream exhaust system E2, which is also a control input to be given to the entire exhaust system E, in order to converge the estimated value (=MVO2(k+dm) bar+MVO2/BASE) for the output MVO2/OUT of the upstream $O_2$ sensor 7 corresponding to the estimated differential output MVO2(k+dm) bar, which is calculated by the estimator 21 as an estimated value for the differential output MVO2 of the upstream $O_2$ sensor 7 after the total dead time dm, to the target value MVO2/TARGET (=MO2CMD+MVO2/BASE) for the output MVO2/OUT of the upstream $O_2$ sensor 7 corresponding to the target differential output MO2CMD generated by the downstream exhaust system controller 10.

The downstream exhaust system controller 10 and the upstream exhaust system controller 11 is thus jointly capable of compensating for the effect of the dead time (=dr1+dm1) of the entire exhaust system E made up of the downstream exhaust system E1 and the upstream exhaust system E2, i.e., the system including the overall exhaust gas purifier 5 ranging from the LAF sensor 8 to the downstream $O_2$ sensor 6, in order to converge the output RVO2/OUT of the downstream $O_2$ sensor 6 to the target value RVO2/TARGET, and also compensating for the effect of the dead times dr2, dm2 of the input generating systems with respect to objects to be controlled respectively by the downstream exhaust system controller 10 and the upstream exhaust system controller 11. As a result, the control process of converging the output RVO2/OUT of the downstream $O_2$ sensor 6 to the target value RVO2/TARGET can be stabilized, and the exhaust gas purifier 5 can perform its desired purifying capability stably.

With respect to the estimator 16 of the downstream exhaust system controller 10, the effect of a response delay of the system for generating an input to the downstream exhaust system E1, which is an object to be controlled by the downstream exhaust system controller 10, can be compensated for by the upstream exhaust system controller 11 (particularly, the sliding mode controller 22) and the fuel processing controller 12 (particularly, the adaptive controller 31). Therefore, an element relative to a response delay to be taken into account in calculating the estimated differential output RVO2(k+dr) bar, which is an estimated value for the differential output RVO2 of the downstream $O_2$ sensor 6 after the total dead time dr, may be only the downstream exhaust system E1, and a response delay of the system for manipulating an input to the downstream exhaust system E1 does not need to be taken into account.

If the dead time dr1 of the downstream exhaust system E1 is relatively short, as if the second catalytic converter 4 included in the downstream exhaust system E1 is relatively small in size, then the estimated differential output RVO2 (k+dr) bar can be calculated in each control cycle with sufficient accuracy according to the above algorithm based on the downstream exhaust system model (the equation (1)) which represents the behavior of the downstream exhaust system E1 including the element relative to the response delay of the downstream exhaust system E1. The gain coefficients ar1, ar2, br1 which are parameters for defining the behavior of the downstream exhaust system model are sequentially identified on a real-time basis by the identifier 15 depending on the behavioral state of the downstream exhaust system E1. As a consequence, since the modeling error of the downstream exhaust system model with respect to the downstream exhaust system E1 is minimized, the accuracy of the estimated differential output RVO2(k+dr) bar is increased.

With respect to the estimator 21 of the upstream exhaust system controller 11, the effect of a response delay of the system for generating an input to the upstream exhaust system E2, which is an object to be controlled by the upstream exhaust system controller 11, can be compensated for by the fuel processing controller 12 (particularly, the adaptive controller 31). In calculating the estimated differential output MVO2(k+dm) bar, which is an estimated value for the differential output MVO2 of the upstream $O_2$ sensor 7 after the total dead time dm, the response delay of the system for manipulating an input to the upstream exhaust system E2 does not need to be taken into account. The total dead time dm to be taken into account by the estimator 21 is a relatively short time which is the sum of the dead time dm1 of the upstream exhaust system E2 which is part of the entire exhaust system E and the dead time dm2 of the fuel processing controller 12 and the internal combustion engine 1 which serve as the system for generating an input to the upstream exhaust system E2. Since the gain coefficients am1, am2, bm1 which are parameters for defining the behavior of the upstream exhaust system model (the equation 26) including the element relative to the response delay of the upstream exhaust system E2 are sequentially identified by the identifier 20, the modeling error of the upstream exhaust system model is held to a minimum. Accordingly, the estimated differential output MVO2(k+dm) bar can be calculated highly accurately in each control cycle according to the above algorithm based on the upstream exhaust system model.

As a result, the effect of the dead time which affects the control process of converging the output RVO2/OUT of the downstream $O_2$ sensor 6 to the target value RVO2/TARGET, such as the dead time of the exhaust gas purifier 5, can appropriately be compensated for to increase the stability of the control process. Particularly, because the estimated differential output MVO2(k+dm) bar relative to the estimator 21 of the upstream exhaust system controller 11 can be calculated highly accurately, the feedback control process (the adaptive sliding mode control process in this embodiment) for converging the differential output MVO2 of the upstream $O_2$ sensor 7 to the target differential output MO2CMD can be performed with a high gain. In addition, the quick responsiveness of the control process of converging the output RVO2/OUT of the downstream $O_2$ sensor 6 to the target value RVO2/TARGET can be increased.

The downstream exhaust system controller 10 and the upstream exhaust system controller 11, as considered in combination, serve to generate the target air-fuel ratio KCMD as a control input to the entire exhaust system E, as an object to be controlled, including the exhaust gas purifier 5, in order to converge the output RVO2/OUT of the downstream $O_2$ sensor 6, which is the output of the entire exhaust system E, to the target value RVO2/TARGET. Of the downstream exhaust system controller 10 and the upstream exhaust system controller 11, the downstream exhaust system controller 10 performs a control process relative to the downstream exhaust system E1 which is a downstream portion of the entire exhaust system E, and the upstream exhaust system controller 11 performs a control process relative to the upstream exhaust system E2 which is an upstream portion of the entire exhaust system E.

Therefore, the effect of disturbances acting on the entire exhaust system E can be distributed to and absorbed by the downstream exhaust system controller 10 and the upstream exhaust system controller 11. As compared with a single controller which would directly control the entire exhaust system E, i.e., a controller for directly generating the target air-fuel ratio KCMD to converge the output RVO2/OUT of the downstream $O_2$ sensor 6 to the target value RVO2/ TARGET, the downstream exhaust system controller 10 and the upstream exhaust system controller 11 can generate an appropriate target air-fuel ratio KCMD for stably converging the output RVO2/OUT of the downstream $O_2$ sensor 6 to the target value RVO2/TARGET, and the stability of the control process of converging the output RVO2/OUT of the downstream $O_2$ sensor 6 to the target value RVO2/TARGET can be increased.

In this embodiment, both the downstream exhaust system controller 10 and the upstream exhaust system controller 11 employ, as its feedback control process, the sliding mode control process that is intrinsically less susceptible to the effect of disturbances. The sliding mode control process used in the present embodiment is the adaptive sliding mode control process incorporating the adaptive control law (adaptive algorithm) for eliminating the effect of disturbances. The parameters (the gain coefficients ar1, ar2, br1) of the model of an object to be controlled which are required by the adaptive sliding mode control process of the downstream exhaust system controller 10, i.e., the downstream exhaust system model, are sequentially identified on a real-time basis by the identifier 15 depending on the behavioral state of the downstream exhaust system E1. Likewise, the parameters (the gain coefficients am1, am2, bm1) of the upstream exhaust system model which are required by the adaptive sliding mode control process of the upstream exhaust system controller 11 are sequentially identified on a real-time basis by the identifier 20 depending on the behavioral state of the upstream exhaust system E2.

Therefore, the control process of converging the output RVO2/OUT of the downstream $O_2$ sensor 6 to the target value RVO2/TARGET can be performed highly accurately with high stability without being affected by changes in the behavioral states of the downstream and upstream exhaust systems E1, E2 and disturbances.

In the present embodiment, the absolute value of the damping parameter Rpole (=sr2/sr1) with respect to the adaptive sliding mode control process in the downstream exhaust system controller 10 is greater than the absolute value of the damping parameter Mpole (=sm2/sm1) with respect to the adaptive sliding mode control in the upstream exhaust system controller 11, for thereby making the feedback gain of the downstream exhaust system controller 10 smaller than the feedback gain of the upstream exhaust system controller 11. Therefore, the stability of the control process of converging the output RVO2/OUT of the downstream $O_2$ sensor 6 to the target value RVO2/TARGET is reliably maintained.

In a situation where the downstream $O_2$ sensor 6 has not yet been activated, or the RSLD controlled state is judged as being unstable and the downstream exhaust system controller 10 cannot generate the target differential output MO2CMD appropriately, the sliding mode controller 22 of the upstream exhaust system controller 11 assumes that the target differential output MO2CMD is steadily "0", and generates the target differential air-fuel ratio kcmd. Stated otherwise, the sliding mode controller 22 generates the target differential air-fuel ratio kcmd on the assumption that the target value for the output MVO2/OUT of the upstream $O_2$ sensor 7 is the reference value MVO2/BASE (which is the same value as the target value RVO2/TARGET for the output RVO2/OUT of the downstream $O_2$ sensor 6. Therefore, the target air-fuel ratio KCMD generated by the upstream exhaust system controller 11 is an air-fuel ratio needed to converge the output MVO2/OUT of the upstream $O_2$ sensor 7 to the same target value as the target value RVO2/TARGET for the output RVO2/OUT of the downstream $O_2$ sensor 6. In this case, the air-fuel ratio of the internal combustion engine 1 is manipulated in order to cause the first catalytic converter 3 included in the upstream exhaust system E2 to perform an optimum purifying capability. Thus, it is possible to achieve as good a purifying capability as possible even in situations where the optimum purifying capability of the entire exhaust gas purifier 5 cannot be performed.

A plant control system according to a second embodiment of the present invention will be described below. The plant control system according to the second embodiment has the same system arrangement as the plant control system according to the first embodiment, but differs from the plant control system according to the first embodiment with respect to the processing that is carried out by the estimator 16 and the sliding mode controller 17 of the downstream exhaust system controller 10. Those parts of the plant control system according to the second embodiment which are identical to those of the plant control system according to the first embodiment are denoted by identical reference characters, and those parts and processing of the plant control system according to the second embodiment which are identical to those of the plant control system according to the first embodiment will not be described in detail below.

In the first embodiment described above, the estimator 16 of the downstream exhaust system controller 10 determines the estimated differential output MVO2(k+dr) bar which corresponds to an estimated value for the output RVO2/OUT from the downstream $O_2$ sensor 6 after the total dead time dr. However, if the dead time dr1 of the downstream exhaust system E1 is relatively short, as if the second catalytic converter 4 included in the downstream exhaust system E1 is relatively small in size, then it may possibly be difficult to keep the estimated differential output MVO2(k+dr) bar sufficiently accurate. In this case, it is preferable to achieve control stability by generating the target differential output MO2CMD corresponding to the target value MVO2/TARGET for the output MVO2/OUT of the upstream $O_2$ sensor 7 in order to converge the estimated value for the output RVO2/OUTPUT of the downstream $O_2$ sensor 6 after the dead time dr1 of the downstream exhaust system E1 to the target value RVO2/TARGET irrespective of the dead time dr2 of the system for manipulating an input to the downstream exhaust system E1.

In this embodiment, the estimator 16 of the downstream exhaust system controller 10 sequentially determines in each control cycle the estimated differential output RVO2(k+dr1) bar which is an estimated value for the differential output RVO2(k+dr1) of the downstream $O_2$ sensor 6 after the dead time dr1 of the downstream exhaust system E1. The estimator 16 then determines in each control cycle the temporary estimated differential output RVO2(k+dr1+1) bar which is a temporary estimated value for the differential output RVO2(k+dr1+1) of the downstream $O_2$ sensor 6 after a time (dr1+1) which is longer one control cycle than the dead time dr1, for the same reasons as with the first embodiment.

In this case, based on the same principles as in the first embodiment, the estimated differential output RVO2(k+dr1) bar is determined according to the following equation (69) based on the downstream exhaust system model (the equation (1)) according to the same idea as with the first embodiment, i.e., an equation where the dead times dr, dr2 in the equation (11) are replaced with "dr1", "0", respectively:

$$\overline{RVO2}(k+dr1) = \alpha R1 \cdot RVO2(k) + \alpha R2 \cdot RVO2(k-1) + \sum_{j=1}^{dr1} \beta R(j) \cdot MVO2(k-j) \quad (69)$$

where
 $\alpha R1$ =the first-row, first-column element of $Ar^{dr1}$,
 $\alpha R2$ =the first-row, second-column element of $Ar^{dr1}$,
 $\beta R(j)$ =the first-row elements of $Ar^{j-1} \cdot Br$ (j=1,2, ..., dr1)

$$Ar = \begin{bmatrix} ar1 & ar2 \\ 1 & 0 \end{bmatrix}$$

$$Br = \begin{bmatrix} br1 \\ 0 \end{bmatrix}$$

Specifically, the estimated differential output RVO2(k+dr1) bar is determined in each control cycle, using time-series data RVO2(k), RVO2(k−1) prior to the present time of the differential output RVO2 of the downstream $O_2$ sensor 6 and time-series data MVO2(k−1), ..., MVO2(k−dr1) in the past of the differential output MVO2 of the upstream $O_2$ sensor 7.

The coefficients $\alpha R1$, $\alpha R2$, and $\beta R(j)$ (j=1, 2, ..., dr1) in the equation (69) are as defined above with respect to the equation (69). As with the first embodiment, these coefficients $\alpha R1$, $\alpha R2$, and $\beta R(j)$ are calculated using the gain coefficients ar1, ar2, br1 determined in STEP6 shown in FIG. 10 (these gain coefficients ar1, ar2, br1 are basically the latest identified gain coefficients ar1(k), ar2(k), br1(k) calculated by the identifier 15).

The temporary estimated differential output RVO2(k+dr1+1) bar is determined according to the following equation (70) where "dr1" in the equation (69) is replaced with "dr1+1":

$$\overline{RVO2}(k+dr1+1) = \alpha R1P \cdot RVO2(k) + \alpha R2P \cdot RVO2(k-1) + \quad (70)$$
$$\sum_{j=1}^{dr1+1} \beta RP(j) \cdot MVO2(k-j)$$

where
  αR1P=the first-row, first-column element of $Ar^{dr1+1}$,
  αR2P=the first-row, second-column element of $Ar^{dr1+1}$,
  βRP(j)=the first-row elements of $Ar^{j-1} \cdot Br$ (j=1,2, ..., dr1+1)

$$Ar = \begin{bmatrix} ar1 & ar2 \\ 1 & 0 \end{bmatrix}$$

$$Br = \begin{bmatrix} br1 \\ 0 \end{bmatrix}$$

Specifically, the estimated differential output RVO2(k+dr1+1) bar is determined in each control cycle, using time-series data RVO2(k), RVO2(k−1) prior to the present time of the differential output RVO2 of the downstream $O_2$ sensor 6 and time-series data MVO2(k−1), ..., MVO2(k−dr1) in the past of the differential output MVO2 of the upstream $O_2$ sensor 7.

The coefficients αR1P, αR2P, and βRP(j) (j=1, 2, ..., dr1+1) in the equation (70) are as defined above with respect to the equation (70). As with the calculation of the estimated differential output RVO2(k+dr1) bar, these coefficients αR1, αR2, and βR(j) are calculated using the gain coefficients ar1, ar2, br1 determined in STEP6 shown in FIG. 10.

The processing of the estimator 16 according to the second embodiment has been described above.

According to the second embodiment, the sliding mode controller 17 of the downstream exhaust system controller 10 calculates the equivalent control input U1eq(k), the reaching control law input U1rch(k), and the adaptive control law input U1adp(k) in each control cycle according to the equations (71)–(73) shown below where "dr" in the equations (22), (24), (25) is replaced with "dr1", as with the first embodiment. The switching function σ1 bar required to calculate the reaching control law input U1rch(k) and the adaptive control law input U1adp(k) is defined according to the equation (23) in the first embodiment. The estimated differential outputs RVO2(k+dr1) bar, RVO2(k+dr1−1) bar used to calculate the equivalent control input U1eq(k) and the switching function σ1 bar are present and preceding values, respectively, of the estimated differential output calculated in each control cycle by the estimator 16 in the second embodiment.

$$U1eq(k) = \frac{-1}{sr1 \cdot br1} \cdot \{[sr1 \cdot (ar1-1) + sr2] \cdot \quad (71)$$
$$\overline{RVO2}(k+dr1) +$$
$$(sr1 \cdot ar2 - sr2) \cdot \overline{RVO2}(k+dr1-1)\}$$

$$U1rch(k) = \frac{-1}{sr1 \cdot br1} \cdot F1 \cdot \overline{\sigma 1}(k+dr1) \quad (72)$$

$$U1adp(k) = \frac{-1}{sr1 \cdot br1} \cdot G1 \cdot \sum_{i=0}^{k+dr1} (\overline{\sigma 1}(i) \cdot \Delta T) \quad (73)$$

The sliding mode controller 17 adds the equivalent control input U1eq(k), the reaching control law input U1rch(k), and the adaptive control law input U1adp(k) which are calculated according to the equations (71)–(73), thereby calculating the target differential output MO2CMD(k) in each control cycle.

The sliding mode controller 17 also calculates the temporary equivalent control input U1eq(k+1), the temporary reaching control law input U1rch(k+1), and the temporary adaptive control law input U1adp(k+1) in one control cycle before each control cycle according to the equations (74)–(76) shown below where "dr" in the equations (52)–(54) is replaced with "dr1", as with the first embodiment. The estimated differential outputs RVO2(k+dr1) bar, RVO2(k+dr1+1) bar used to calculate the equivalent control input U1eq(k+1) and the switching function σ1 bar are a present value of the estimated differential output and a preceding value of the temporary estimated differential output which are calculated in each control cycle by the estimator 16 in the second embodiment.

$$U1eq(k+1) = \frac{-1}{sr1 \cdot br1} \cdot \{[sr1 \cdot (ar1-1) + sr2] \cdot \quad (74)$$
$$\overline{RVO2}(k+dr1+1) +$$
$$(sr1 \cdot ar2 - sr2) \cdot \overline{RVO2}(k+dr1)\}$$

$$U1rch(k+1) = \frac{-1}{sr1 \cdot br1} \cdot F1 \cdot \overline{\sigma 1}(k+dr1+1) \quad (75)$$

$$U1adp(k+1) = \frac{-1}{sr1 \cdot br1} \cdot G1 \cdot \sum_{i=0}^{k+dr1+1} (\overline{\sigma 1}(i) \cdot \Delta T) \quad (76)$$

The sliding mode controller 17 adds the equivalent control input U1eq(k+1), the reaching control law input U1rch(k+1), and the adaptive control law input U1adp(k+1) which are calculated according to the equations (74)–(76), thereby calculating the temporary target differential output MO2CMD(k+1) in one control cycle before each control cycle.

More specifically, the sliding mode controller 17 carries out a process similar to the flowchart shown in FIG. 13 except that "dr" is replaced with "dr1", in STEP8 shown in FIG. 10, for thereby calculating the target differential output MO2CMD(k) and the temporary target differential output MO2CMD(k+1) in each control cycle.

In STEP9 shown in FIG. 10, the sliding mode controller 17 carries out a process similar to the flowchart shown in FIG. 14 except that "dr" is replaced with "dr1", for thereby determining the stability of the adaptive sliding mode control process carried out by the sliding mode controller 10, i.e., the stability of the RSLD controlled state.

Other processes performed by the plant control system according to the second embodiment are identical to those of the plant control system according to the first embodiment, i.e., the processes shown in FIGS. 8 through 19 are carried out by the plant control system according to the second embodiment.

The plant control system according to the second embodiment offers the same advantages as the plant control system according to the first embodiment. In particular, the plant control system according to the second embodiment is effective if the dead time dr1 of the downstream exhaust system controller E1 is relatively long.

A plant control system according to a third embodiment of the present invention will be described below. The plant control system according to the third embodiment has the same system arrangement as the plant control system according to the first embodiment, but differs from the plant control system according to the first embodiment with respect to the processing that is carried out by the estimator 16 of the downstream exhaust system controller 10. Those parts of the plant control system according to the third embodiment which are identical to those of the plant control system according to the first embodiment are denoted by identical reference characters, and those parts and processing of the plant control system according to the third embodiment which are identical to those of the plant control system according to the first embodiment will not be described in detail below.

In the first embodiment described above, the estimator 16 of the downstream exhaust system controller 10 determines the estimated differential output MVO2(k+dr) bar which corresponds to an estimated value for the output RVO2/OUT from the downstream $O_2$ sensor 6 after the total dead time dr, according to the equation (12) using the past values MO2CMD(k−1), . . . , MO2CMD(k−dr2+1) of the target differential output MO2CMD, instead of the future values MVO2(k+dr2−1), . . . , MVO2(k+1) of the differential output MVO2 of the upstream $O_2$ sensor 7 in the equation (11).

In the third embodiment, the estimator 16 uses time-series data of the estimated differential output MVO2 bar of the upstream $O_2$ sensor 7 calculated in each control cycle by the estimator 21 of the upstream exhaust system controller 11 as described above, instead of the future values MVO2(k+dr2−1), . . . , MVO2(k+1) of the differential output MVO2.

Specifically, the estimated differential output MVO2(k+dm) bar calculated according to the equation (36) in each control cycle by the estimator 21 of the upstream exhaust system controller 11 may basically be considered to be MVO2(k+dm)≈MVO2(k+dm) bar because it is an estimated value of the differential output MVO2(k+dm) (which is a future value) of the upstream $O_2$ sensor 7 after the dead time dm from the present control cycle. In the third embodiment, the dead time dr2 of the system for manipulating an input to the downstream exhaust system E1 is equal to the total dead time dm relative to the estimator 21 of the upstream exhaust system controller 11.

Therefore, the future values MVO2(k+dr2−1), MVO2(k+1) of the differential output MVO2 can be replaced with the past values MVO2(k+dm−1) bar, . . . , MVO2(k+1) bar of the estimated differential output MVO2 bar which are calculated by the estimator 21, i.e., the estimated differential output MVO2 bar from one control cycle ago to (dm−1) control cycles ago.

In the second embodiment, the estimator 16 sequentially determines in each control cycle the estimated differential output RVO2(k+dr) bar which is an estimated value of the differential output RVO2(k+dr) of the downstream $O_2$ sensor 6 after the total dead time dr according to the following equation (77):

$$\overline{RVO2}(k+dr) = \alpha r1 \cdot RVO2(k) + \alpha r2 \cdot RVO2(k-1) + \qquad (77)$$

$$\sum_{j=1}^{dr2-1} \beta r(j) \cdot \overline{MVO2}(k+dm-j) +$$

$$\sum_{i=dr2}^{dr} \beta r(i) \cdot MVO2(k+dr2-i)$$

where dr=dr1+dr2, dr2≧2, dr=dm.

Stated otherwise, the equation (77) is similar to the equation (12) used to determine the estimated differential output RVO2(k+dr) in the first embodiment, except that the target differential outputs MO2CMD(k−1), . . . , MO2CMD(k−dr+1) in the equation (12) are replaced with the past values MVO2(k+dm−1), . . . , MVO2(k+1) of the estimated 5560 differential output MVO2 bar.

The coefficients αr1, αr2, and βr(j) (j=1, 2, . . . , dr) in the equation (77) are exactly the same as those in the equation (12), and calculated using the gain coefficients ar1, ar2, br1 determined in STEP6 shown in FIG. 10, as with the first embodiment.

For the same reasons as in the first embodiment, the estimator 16 determines in each control cycle the temporary estimated differential output RVO2(k+dr+1) bar which is a temporary estimated value of the differential output RVO2(k+dr+1) of the downstream $O_2$ sensor 6 after a time (dr+1) which is one control cycle longer than the total dead time dr according to the following equation (78):

$$\overline{RVO2}(k+dr+1) = \alpha r1p \cdot RVO2(k) + \alpha r2p \cdot RVO2(k-1) + \qquad (78)$$

$$\sum_{j=1}^{dr2} \beta rp(j) \cdot \overline{MVO2}(k+1+dm-j) +$$

$$\sum_{i=dr2+1}^{dr+1} \beta rp(i) \cdot MVO2(k+1+dr2-i)$$

The equation (78) is similar to the equation (51) used to determine the temporary estimated differential output RVO2(k+dr+1) in the first embodiment, except that the estimated differential outputs MO2CMD(k), . . . , MO2CMD(k+1−dr2) in the equation (51) are replaced with the data MVO2(k+dm) bar, . . . , MVO2(k+1) bar prior to the present time of the estimated differential output MVO2 bar.

The coefficients αr1p, αr2p, and βrp(j) (j=1, 2, . . . , dr+1) in the equation (78) are exactly the same as those in the equation (51), and calculated using the gain coefficients ar1, ar2, br1 determined in STEP6 shown in FIG. 10, as with the first embodiment.

Other processes performed by the plant control system according to the third embodiment are identical to those of the plant control system according to the first embodiment, i.e., the processes shown in FIGS. 8 through 19 are carried out by the plant control system according to the third embodiment.

The plant control system according to the third embodiment offers the same advantages as the plant control system according to the first embodiment. The accuracy of the estimated differential output RVO2 bar of the downstream $O_2$ sensor 6 can be increased if the estimated differential output MVO2 bar calculated by the estimator 21 of the upstream exhaust system controller 11 using the actual differential output MVO2 bar of the upstream $O_2$ sensor 7 which reflects the actual behavioral state of the upstream exhaust system E2 and the actual differential output kact of the LAF sensor 8 is used to calculate the estimated differential output RVO2 bar.

The plant control system according to the present invention is not limited to the above embodiments, but may be modified as follows:

In the above embodiments, the LAF sensor (widerange air-fuel ratio sensor) 8 is employed as a third exhaust gas sensor. However, the third exhaust gas sensor may comprise an ordinary $O_2$ sensor or any of various other types of sensors insofar as it can detect the air-fuel ratio of an exhaust gas.

In the above embodiments, the $O_2$ sensor 6 is employed as a first exhaust gas sensor. However, the first exhaust gas sensor may comprise any of various other types of sensors insofar as it can detect the concentration of a certain component of an exhaust gas downstream of the exhaust gas purifier to be controlled. For example, if carbon monoxide (CO) in an exhaust gas downstream of the exhaust gas purifier is to be controlled, the first exhaust gas sensor may comprise a CO sensor. If nitrogen oxide (NOx) in an exhaust gas downstream of the exhaust gas purifier is to be controlled, the first exhaust gas sensor may comprise an NOx sensor. If hydrocarbon (HC) in an exhaust gas downstream of the exhaust gas purifier is to be controlled, the first exhaust gas sensor may comprise an HC sensor. If the exhaust gas purifier comprises a three-way catalytic converter, then even when the concentration of any of the above gas components is detected, it may be controlled to maximize the purifying performance of the exhaust gas purifier. If the exhaust gas purifier comprises a catalytic converter for oxidation or reduction, then purifying performance of the exhaust gas purifier can be increased by directly detecting a gas component to be purified.

A second exhaust gas sensor disposed between the first and second catalytic converters of the exhaust gas purifier may not necessarily be the same type as the first exhaust gas sensor as is the case with the above embodiments, but may be of a type different from the first exhaust gas sensor insofar as it can detect the concentration of a certain component which is correlated to the component detected by the first exhaust gas sensor. Thus, the second exhaust gas sensor may be such a sensor that when the output thereof varies, the output of the first exhaust gas sensor varies depending on the output of the second exhaust gas sensor.

In the above embodiments, the sliding mode controller 17 of the downstream exhaust gas controller 10 determines in each control cycle the target differential output MO2CMD (k) in each control cycle and the temporary target differential output MO2CMD(k+1) in one control cycle before according to respective different processes. However, the temporary target differential output MO2CMD((k−1)+1) calculated in one control cycle before may be used as a substitute for the target differential output MO2CMD(k).

Specifically, the temporary target differential output MO2CMD((k−1)+1) calculated in one control cycle before each control cycle as the sum of the results calculated according to the equations (52)–(54) (the first and third embodiments) or the sum of the results calculated according to the equations, (74)–(76) (the second embodiment) is considered to be generally equal to the target differential output MO2CMD(k) calculated in the present control cycle as the sum of the results calculated according to the equations (22), (24), (25) (the first and third embodiments) or the sum of the results calculated according to the equations (71)–(73) (the second embodiment). Therefore, the temporary target differential output MO2CMD((k−1)+1) calculated in one control cycle before may be used as a substitute for the target differential output MO2CMD(k). In this case, the sliding mode controller 17 needs to calculate only the temporary target differential output MO2CMD(k+1) in each control cycle, and the estimator 16 needs to calculate only the temporary estimated differential output RVO2(k+dr+1) bar (the first and third embodiments) or the temporary estimated differential output RVO2(k+dr1+1) bar (the second embodiment). Therefore, the control algorithm can be simplified.

In the above embodiments, the adaptive sliding mode control process is used as the feedback control process carried out by the downstream exhaust system controller 10 and the upstream exhaust system controller 11. However, any of various other feedback processes including a PID control process and an optimum control process may be used.

In the above embodiments, the sliding mode controller 22 of the upstream exhaust system controller 11 determines the equivalent control input U2eq(k) according to the equation (50). However, the sliding mode controller 22 may determine the equivalent control input U2eq(k) according to an equation similar to the equation (50) except that the third and fourth terms (the terms including the target differential output MO2CMD) in the enclosure { } on the right side of the equation (50) are omitted. This is because according to the adaptive sliding mode control process carried out by the sliding mode controller 22, the effect of the above omissions can be absorbed by the adaptive control law input U2adp, and the value of the switching function σ1 bar can be converged sufficiently to "0". With this modification, the estimator 16 and the sliding mode controller 17 of the downstream exhaust system controller 10 can omit the process of calculating the temporary estimated differential output RVO2 bar and the temporary target differential output MO2CMD.

In the above embodiments, the control cycles of the downstream exhaust system controller 10 and the upstream exhaust system controller 11 are of the same period. However, those control cycles may be of different periods. According to such a modification, for making the feedback gain of the downstream exhaust system controller 10 smaller than the feedback gain of the upstream exhaust system controller 11, the control cycles of the downstream exhaust system controller 10 may be longer than the control cycles of the upstream exhaust system controller 11 if the absolute value of the damping parameter Rpole (=sr2/sr1) relative to the switching function σ1 of the controller 10 and the absolute value of the damping parameter Mpole (=sm2/sm1) relative to the switching function σ2 of the controller 11 are identical to each other. More generally, if the control cycles of the downstream exhaust system controller 10 have a period Tr and the control cycles of the upstream exhaust system controller 11 have a period Tm, then Tr≧Tm, and the coefficients sr2, sr1, sm2, sm1 relative to the switching functions σ1, σ2 are set to such values as to satisfy the inequality $|(-sm2/sm1) \cdot m| \leq |-sr2/sr1|$ (m=Tr/Tm).

In the above embodiments, the target value RVO2/TARGET for the output RVO2/OUT of the downstream $O_2$ sensor 6 is a constant value. However, if a catalytic converter is disposed downstream of the exhaust gas purifier 5, then data generated to converge the output of the $O_2$ sensor disposed downstream of the catalytic converter to a predetermined constant value may be used as the target value RVO2/TARGET for the output RVO2/OUT of the downstream $O_2$ sensor 6.

In the above embodiments, the gain coefficients ar1, ar2, br1 which are parameters of the downstream exhaust system model are identified by the identifier 15. However, the gain coefficients a1, a2, b1 may be set to predetermined fixed values or may be established using a map depending on the operating state of the internal combustion engine 1 and the deteriorated state of the second catalytic converter 4. This also holds true for the upstream exhaust system model.

In the above embodiments, the estimator 16 and the sliding mode controller 17 of the downstream exhaust system controller 10 employ the common downstream exhaust system model. However, the estimator 16 and the sliding mode controller 17 may employ respective models. This also holds true for the upstream exhaust system controller 11.

In the above embodiments, the downstream exhaust system model is expressed by a discrete-time system. However, the downstream exhaust system model may be expressed by a continuous-time model, and processing algorithms of the estimator 16 and the sliding mode controller 17 of the downstream exhaust system controller 10 may be constructed on the basis of the continuous-time model. This also holds true for the upstream exhaust system controller 11.

In the above embodiments, the downstream exhaust system model is constructed using the differential output RVO2 of the downstream $O_2$ sensor 6 and the differential output MVO2 of the upstream $O_2$ sensor 7. However, the downstream exhaust system model may be constructed using the output RVO2/OUT of the downstream $O_2$ sensor 6 and the output MVO2/OUT of the upstream $O_2$ sensor 7. This also holds true for the upstream exhaust system model.

In the above embodiments, the plant control system where the entire exhaust system E serves as the plant has been described by way of example. However, the plant control system according to the present invention is not limited to the above embodiments.

A plant control system according to still another embodiment of the present invention will be described below with reference to FIG. 20.

Figure 20:
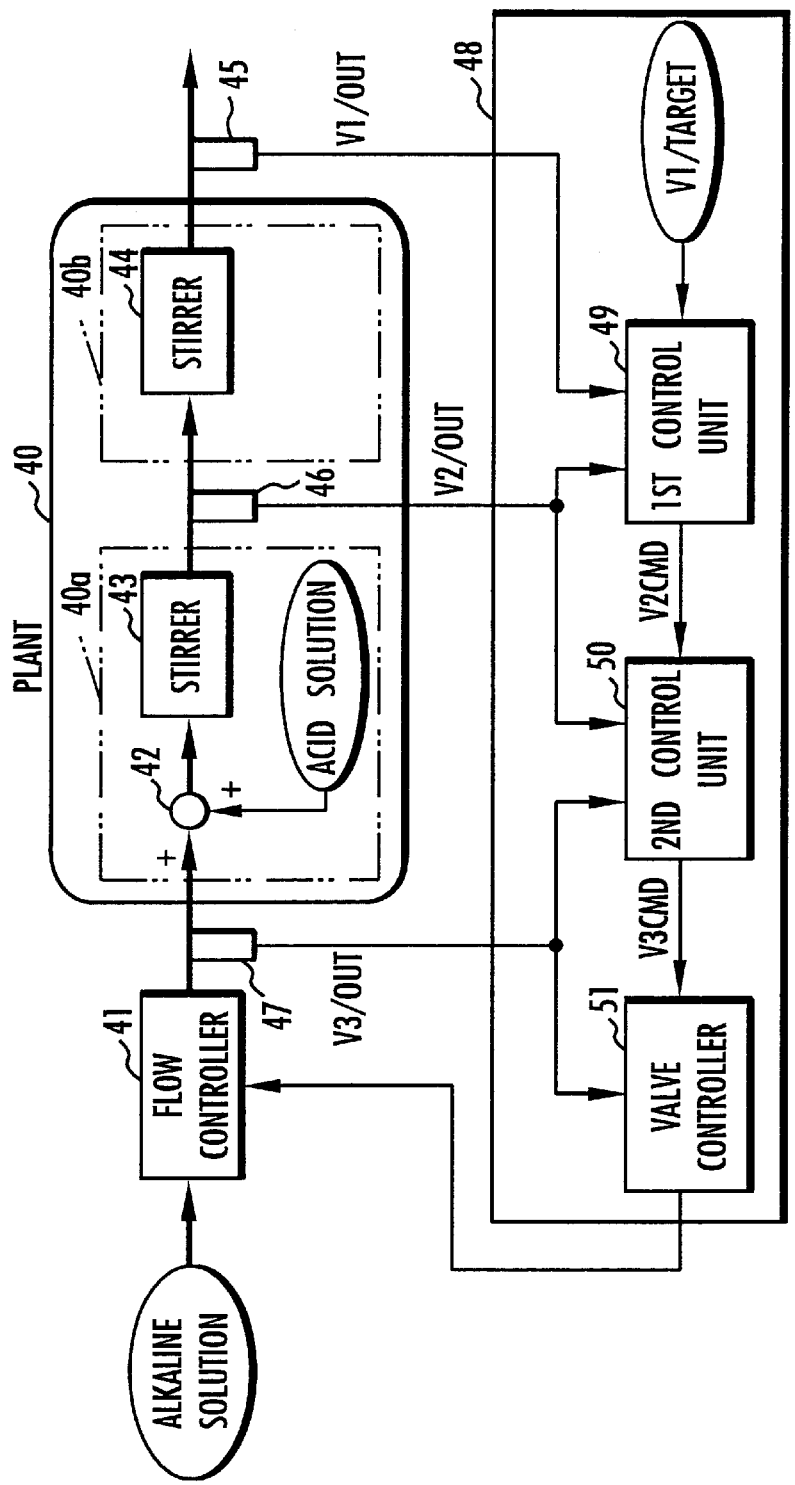
FIG. 20 is a block diagram of a plant control system according to another embodiment of the present invention.

As shown in FIG. 20, a plant 40 is supplied with an alkaline solution at a flow rate which can be regulated by a flow rate control valve (actuator) 41. The plant 40 mixes the supplied alkaline solution with an acid solution at a mixing unit 42, and stirs them into a mixed solution with stirrers 43, 44.

The plant control system according to the embodiment shown in FIG. 20 serves to control the flow rate of the alkaline solution supplied to the plant 40 for adjusting the pH of the mixed solution (the mixture of the alkaline solution and the acid solution) discharged from the plant 40 to a desired pH, i.e., a pH corresponding to a neutral value.

As indicated by the imaginary lines in FIG. 20, the plant 40 is divided into a first partial plant 40a including the upstream stirrer 43 and the mixing unit 42, and a second partial plant 40b including the downstream stirrer 44. The plant 40 is made up of these first and second partial plates 40a, 40b.

The plant control system has a pH sensor 45 (first detecting means) disposed at the outlet of the plant 40 for detecting the pH of the mixed solution (produced by the plant 40 as a whole) discharged from the plant 40, a pH sensor 46 (second detecting means) disposed between the first partial plant 40a and the second partial plant 40b for detecting the pH of the mixed solution supplied from the first partial plant 40a to the second partial plant 40b, a pH sensor 47 (third detecting means) disposed at the inlet of the plant 40 for detecting a flow rate of the alkaline solution supplied to the first partial plant 40a, i.e., the alkaline solution supplied to the plant 40, and a control unit 48 for performing a processing operation (described later on) based on respective outputs V1/OUT, V2/OUT, V3/OUT of the pH sensors 45, 46 and the flow rate sensor 47.

The control unit 48 comprises a microcomputer or the like. The control unit 48 comprises a first controller 49 (first control processing means) for sequentially generating a target value V2CMD for the output V2/OUT of the pH sensor 44, i.e., a target value for the pH of the mixed solution supplied from the first partial plant 40a to the second partial plant 40b, for converging the output V1/OUT of the pH sensor 43, i.e., the detected value of the pH of the mixed solution generated by the second partial plant 40b, to a predetermined target value V1/TARGET, a second controller 50 (second control processing means) for sequentially generating a target value V3CMD for the output V3/OUT of the flow rate sensor 47, i.e., a target flow rate for the alkaline solution to be supplied to the first partial plant 40b, for converging the output V2/OUT of the pH sensor 44 to the target value V2CMD, and a valve controller 51 (actuator control means) for controlling the operation of the flow rate control valve 41 for converging the output V3/OUT of the flow rate sensor 47 to the target value V3CMD.

The first controller 49 corresponds to the downstream exhaust system controller 10 in the plant control system according to the first embodiment described above, and has an identifier, an estimator, a sliding mode controller, etc. (not shown), as with the downstream exhaust system controller 10.

The outputs V1/OUT, V2/OUT of the pH sensors 45, 46 correspond respectively to the output RVO2/OUT of the downstream $O_2$ sensor 6 and the output MVO2/OUT of the upstream $O_2$ sensor 7 in the first embodiment, and the second partial plant 40b corresponds to the downstream exhaust system E1 in the first embodiment. Processing algorithms of the identifier, the estimator, and the sliding mode controller of the first controller 49 are constructed in the same manner as with the downstream exhaust system controller 10.

The target value V2CMD generated by the first controller 49 corresponds the target value MVO2/TARGET (=MO2CMD+MVO2/BASE) for the output MVO2/OUT of the upstream $O_2$ sensor 7. However, the first controller 49 may generate the difference between the target value V2CMD and a predetermined reference value (corresponding to the reference value MVO2/BASE in the first embodiment), instead of the target value V2CMD. The total dead time dr in the first embodiment corresponds to the total dead time which is the sum of the dead time (corresponding to the dead time dr1) of the second partial plant 40b, and the dead time (corresponding to the dead time dr2) of a system which comprises the second controller 50, the valve controller 51, the flow rate control valve 41, and the first partial plant 40a.

The second controller 50 corresponds to the upstream exhaust system controller 11 in the first embodiment, and has an identifier, an estimator, a sliding mode controller, etc. (not shown), as with the upstream exhaust system controller 11.

The output V2/OUT of the pH sensor 46 and the output V3/OUT of the flow rate sensor 47 correspond respectively to the output MVO2/OUT of the upstream $O_2$ sensor 7 and the output KACT of the LAF sensor 8, and the first partial plant 40a corresponds to the upstream exhaust system E2 in the first embodiment. Processing algorithms of the identifier, the estimator, and the sliding mode controller of the second controller 50 are constructed in the same manner as with the upstream exhaust system controller 11.

The target value V3CMD generated by the second controller 50 corresponds to the target air-fuel ratio KCMD in the first embodiment. The total dead time dm in the first embodiment corresponds to the total dead time which is the sum of the dead time (corresponding to the dead time dm1) of the first partial plant 40a, and the dead time (corresponding to the dead time dm2) of a system which comprises the valve controller 51 and the flow rate control valve 41.

As with the general feedback controller 28 in the first embodiment, the valve controller 51 has a PID controller or an adaptive controller which generates a command value for the opening of the flow rate control valve 41 for converging the output V3/OUT (the detected flow rate) of the flow rate sensor 47 to the target value V3CMD, and manipulates the opening of the flow rate control valve 41 according to the generated command value.

In the plant control system shown in FIG. 20, the process of controlling the second partial plant 40b and the process of controlling the first partial plant 40a are performed respectively by the first controller 49 and the second controller 50. Therefore, even if the overall dead time of the plant 40 is long, the pH of the mixed solution finally generated by the plant 40 can be controlled accurately and stably at a desired pH.

The plant control system shown in FIG. 20 has been described as being associated with the plant control system according to the first embodiment. However, the plant control system shown in FIG. 20 may be constructed as being associated with the plant control systems according to the second and third embodiments.

The plant control system shown in FIG. 20 may be modified in the manner described above with respect to the plant control systems according to the first, second, and third embodiments.

Although certain preferred embodiments of the present invention have been shown and described in detail, it should be understood that various changes and modifications may be made therein without departing from the scope of the appended claims.

What is claimed is:

1. A plant control system for controlling a plant for generating an output from an input successively through a first partial plant and a second partial plant, comprising:

an actuator for generating an input to said plant;

first detecting means for detecting an output from said plant;

second detecting means for detecting an output from said first partial plant, which is generated by said first partial plant depending on the input to said plant;

third detecting means for detecting the input to said plant;

first control processing means for sequentially generating data representing a target value for an output of said second detecting means which is required to converge an output of said first detecting means to a predetermined target value, according to a feedback control process;

second control processing means for sequentially generating data representing a target input to said plant which is required to converge the output of said second detecting means to the target value for the output of said second detecting means which is represented by the data generated by said first control processing means, according to a feedback control process;

actuator control means for manipulating an output of said actuator into the target input to said plant which is represented by the data generated by said second control processing means;

first estimating means for sequentially generating data representing an estimated value for the output of said first detecting means after a dead time of said second partial plant, using the outputs of said first and second detecting means; and second estimating means for sequentially generating data representing an estimated value for the output of said second detecting means after a total dead time which is the sum of a dead time of said first partial plant and a dead time of a system which comprises said actuator control means and said actuator, using the outputs of said second and third detecting means;

said first control processing means comprising means for generating data representing the target value for the output of said second detecting means, using the data generated by said first estimating means, and said second control processing means comprising means for generating data representing the target input to said plant, using the data generated by said second estimating means.

2. A plant control system according to claim 1, wherein said plant comprises an exhaust system ranging from a position upstream of an exhaust gas purifier comprising a first catalytic converter and a second catalytic converter which are disposed successively downstream in an exhaust passage of an internal combustion engine, to a position downstream of the exhaust gas purifier, said exhaust system including said exhaust gas purifier, said first partial plant comprising a system ranging from the position upstream of the exhaust gas purifier to a position between said first and second catalytic converters, said second partial plant comprising a system ranging from the position between said first and second catalytic converters to the position downstream of the exhaust gas purifier, and wherein said input to the plant as detected by said third detecting means comprises an air-fuel ratio of an air-fuel mixture combusted in the internal combustion engine as said actuator for generating the exhaust gas which enters said exhaust gas purifier, said output from the plant as detected by said first detecting means comprises the concentration of a component of the exhaust gas having passed through said exhaust gas purifier, and the output of said first partial plant as detected by said second detecting means comprises the concentration of a component of the exhaust gas introduced through said first catalytic converter into said second catalytic converter.

3. A plant control system according to claim 1 or 2, wherein said first control processing means comprises means for generating the data representing the target value for the output of said second detecting means in order to converge the estimated value for the output of said first detecting means after the dead time of said second partial plant, as represented by the data generated by said first estimating means, to the target value for the output of said first detecting means, and said second control processing means comprises means for generating the data representing the target input to said plant in order to converge the estimated value for the output of said second detecting means after the total dead time, as represented by the data generated by said second estimating means, to the target value for the output of said second detecting means.

4. A plant control system according to claim 1 or 2, wherein said first estimating means comprises means for generating the data representing the estimated value for the output of said first detecting means according to an algorithm constructed based on a model of said second partial plant which expresses a behavior of said second partial plant as a system for generating data representing the output of said first detecting means from data representing the output of said second detecting means with a dead time and a response delay.

5. A plant control system according to claim 4, wherein said model of the second partial plant comprises a model which expresses the behavior of said second partial plant using the difference between the output of said second detecting means and a predetermined reference value therefor as the data representing the output of said second detecting means, and the difference between the output of said first detecting means and a predetermined reference value therefor as the data representing the output of said first detecting means.

6. A plant control system according to claim 4, further comprising identifying means for sequentially identifying parameters to be established of said model of the second partial plant, using the outputs of said first and second detecting means.

7. A plant control system according to claim 1 or 2, wherein said second estimating means comprises means for generating the data representing the estimated value for the output of said second detecting means according to an algorithm constructed based on a model of said first partial plant which expresses a behavior of said first partial plant as a system for generating data representing the output of said second detecting means from data representing the output of said third detecting means with a dead time and a response delay.

8. A plant control system according to claim 7, wherein said second estimating means comprises means for generating the data representing the estimated value for the output of said second detecting means, using outputs prior to the present of said second and third detecting means and the target input to said plant as represented by the data generated by said second control processing means, on the assumption that an actual output of said third detecting means after the dead time of a system which comprises said actuator control means and said actuator is equal to the target input to said plant as represented by the data generated by said second control processing means.

9. A plant control system according to claim 7, wherein said model of the first partial plant comprises a model which expresses the behavior of said first partial plant using the difference between the output of said third detecting means and a predetermined reference value therefor as the data representing the output of said third detecting means, and the difference between the output of said second detecting means and a predetermined reference value therefor as the data representing the output of said second detecting means.

10. A plant control system according to claim 7, further comprising identifying means for sequentially identifying parameters to be established of said model of the first partial plant, using the outputs of said second and third detecting means.

11. A plant control system according to claim 1 or 2, wherein said feedback control process carried out by said first control processing means comprises a response-indicating-type control process.

12. A plant control system according to claim 11, wherein said response-indicating-type control process comprises a sliding mode control process.

13. A plant control system according to claim 12, wherein said sliding mode control process comprises an adaptive sliding mode control process.

14. A plant control system according to claim 1 or 2, wherein said feedback control process carried out by said second control processing means comprises a response-indicating-type control process.

15. A plant control system according to claim 14, wherein said response-indicating-type control process comprises a sliding mode control process.

16. A plant control system according to claim 15, wherein said sliding mode control process comprises an adaptive sliding mode control process.

17. A plant control system according to claim 12, further comprising means for determining the stability of a process for converging the output of said first detecting means to said predetermined target value according to the sliding mode control process, said second control processing means comprising means for generating the data representing the target input to said plant with the target value for the output of said second detecting means being a predetermined value, if said process for converging the output of said first detecting means to said predetermined target value is judged as being unstable.

18. A plant control system according to claim 2, wherein said first detecting means comprises an exhaust gas sensor for generating an output depending on the concentration of a component of the exhaust gas having passed through said second catalytic converter when the exhaust gas sensor is activated, and said second control processing means comprises means for determining whether said first detecting means is activated or not, and means for generating the data representing the target input to said plant with the target value for the output of said second detecting means being a predetermined value, if said first detecting means is judged as being inactivated.

19. A plant control system according to claim 1 or 2, wherein said feedback control process carried out by said first control processing means has a feedback gain smaller than the feedback gain of said feedback control process carried out by said second control processing means.

20. A plant control system according to claim 19, wherein at least one of said feedback control processes carried out by said first and second control processing means comprises a response-indicating-type control process.

21. A plant control system for controlling a plant for generating an output from an input successively through a first partial plant and a second partial plant, comprising:
an actuator for generating an input to said plant;
first detecting means for detecting an output from said plant;
second detecting means for detecting an output from said first partial plant, which is generated by said first partial plant depending on the input to said plant;
third detecting means for detecting the input to said plant;
first control processing means for sequentially generating data representing a target value for an output of said second detecting means which is required to converge an output of said first detecting means to a predetermined target value, according to a feedback control process;
second control processing means for sequentially generating data representing a target input to said plant which is required to converge the output of said second detecting means to the target value for the output of said second detecting means which is represented by the data generated by said first control processing means, according to a feedback control process;
actuator control means for manipulating an output of said actuator into the target input to said plant which is represented by the data generated by said second control processing means;
first estimating means for sequentially generating data representing an estimated value for the output of said first detecting means after a first total dead time which is the sum of the dead time of said second partial plant and the dead time of a system comprising said second control processing means, said actuator control means, said actuator, and said first partial plant, using the outputs of said first and second detecting means; and
second estimating means for sequentially generating data representing an estimated value for the output of said second detecting means after a second total dead time which is the sum of the dead time of said first partial plant and the dead time of a system comprising said actuator control means and said actuator, using the outputs of said second and third detecting means;

said first control processing means comprising means for generating data representing the target value for the output of said second detecting means, using the data generated by said first estimating means, and said second control processing means comprising means for generating data representing the target input to said plant, using the data generated by said second estimating means.

22. A plant control system according to claim 21, wherein said plant comprises an exhaust system ranging from a position upstream of an exhaust gas purifier comprising a first catalytic converter and a second catalytic converter which are disposed successively downstream in an exhaust passage of an internal combustion engine, to a position downstream of the exhaust gas purifier, said exhaust system including said exhaust gas purifier, said first partial plant comprising a system ranging from the position upstream of the exhaust gas purifier to a position between said first and second catalytic converters, said second partial plant comprising a system ranging from the position between said first and second catalytic converters to the position downstream of the exhaust gas purifier, and wherein said input to the plant as detected by said third detecting means comprises an air-fuel ratio of an air-fuel mixture combusted in the internal combustion engine as said actuator for generating the exhaust gas which enters said exhaust gas purifier, said output from the plant as detected by said first detecting means comprises the concentration of a component of the exhaust gas having passed through said exhaust gas purifier, and the output of said first partial plant as detected by said second detecting means comprises the concentration of a component of the exhaust gas introduced through said first catalytic converter into said second catalytic converter.

23. A plant control system according to claim 21 or 22, wherein said first control processing means comprises means for generating the data representing the target value for the output of said second detecting means in order to converge the estimated value for the output of said first detecting means after the first total dead time, as represented by the data generated by said first estimating means, to the target value for the output of said first detecting means, and said second control processing means comprises means for generating the data representing the target input to said plant in order to converge the estimated value for the output of said second detecting means after the second total dead time, as represented by the data generated by said second estimating means, to the target value for the output of said second detecting means.

24. A plant control system according to claim 21 or 22, wherein said first estimating means comprises means for generating the data representing the estimated value for the output of said first detecting means according to an algorithm constructed based on a model of said second partial plant which expresses a behavior of said second partial plant as a system for generating data representing the output of said first detecting means from data representing the output of said second detecting means with a dead time and a response delay.

25. A plant control system according to claim 24, wherein said first estimating means comprises means for generating the data representing the estimated value for the output of said first detecting means, using outputs prior to the present of said second and third detecting means and the target value for the output of said second detecting means as represented by the data generated by said first control processing means, on the assumption that an actual output of said second detecting means after the dead time of a system which comprises said second control processing means, said actuator control means, and said actuator, and said first partial plant is equal to the target value for the output of said second detecting means as represented by the data generated by said first control processing means.

26. A plant control system according to claim 24, wherein said first estimating means comprises means for generating the data representing the estimated value for the output of said first detecting means, using outputs prior to the present of said second and third detecting means and the estimated value for the output of said second detecting means as represented by the data generated by said second estimating means, on the assumption that an actual output of said second detecting means after said second total dead time is equal to the estimated value for the output of said second detecting means as represented by the data generated by said second estimating means.

27. A plant control system according to claim 24, wherein said model of the second partial plant comprises a model which expresses the behavior of said second partial plant using the difference between the output of said second detecting means and a predetermined reference value therefor as the data representing the output of said second detecting means, and the difference between the output of said first detecting means and a predetermined reference value therefor as the data representing the output of said first detecting means.

28. A plant control system according to claim 24, further comprising identifying means for sequentially identifying parameters to be established of said model of the second partial plant, using the outputs of said first and second detecting means.

29. A plant control system according to claim 21 or 22, wherein said second estimating means comprises means for generating the data representing the estimated value for the output of said second detecting means according to an algorithm constructed based on a model of said first partial plant which expresses a behavior of said first partial plant as a system for generating data representing the output of said second detecting means from data representing the output of said third detecting means with a dead time and a response delay.

30. A plant control system according to claim 29, wherein said second estimating means comprises means for generating the data representing the estimated value for the output of said second detecting means, using outputs prior to the present of said second and third detecting means and the target input to said plant as represented by the data generated by said second control processing means, on the assumption that an actual output of said third detecting means after the dead time of a system which comprises said actuator control means and said actuator is equal to the target input to said plant as represented by the data generated by said second control processing means.

31. A plant control system according to claim 29, wherein said model of the first partial plant comprises a model which expresses the behavior of said first partial plant using the difference between the output of said third detecting means and a predetermined reference value therefor as the data representing the output of said third detecting means, and the difference between the output of said second detecting means and a predetermined reference value therefor as the data representing the output of said second detecting means.

32. A plant control system according to claim 29, further comprising identifying means for sequentially identifying parameters to be established of said model of the first partial plant, using the outputs of said second and third detecting means.

33. A plant control system according to claim 21 or 22, wherein said feedback control process carried out by said first control processing means comprises a response-indicating-type control process.

34. A plant control system according to claim 33, where in sa id response-indicating-type control process comprises a sliding mode control process.

35. A plant control system according to claim 34, wherein said sliding mode control process comprises an adaptive sliding mode control process.

36. A plant control system according to claim 21 or 22, wherein said feedback control process carried out by said second control processing means comprises a response-indicating-type control process.

37. A plant control system according to claim 36, wherein said response-indicating-type control process comprises a sliding mode control process.

38. A plant control system according to claim 37, wherein said sliding mode control process comprises an adaptive sliding mode control process.

39. A plant control system according to claim 34, further comprising means for determining the stability of a process for converging the output of said first detecting means to said predetermined target value according to the sliding mode control process, said second control processing means comprising means for generating the data representing the target input to said plant with the target value for the output of said second detecting means being a predetermined value, if said process for converging the output of said first detecting means to said predetermined target value is judged as being unstable.

40. A plant control system according to claim 22, wherein said first detecting means comprises an exhaust gas sensor for generating an output depending on the concentration of a component of the exhaust gas having passed through said second catalytic converter when the exhaust gas sensor is activated, and said second control processing means comprises means for determining whether said first detecting means is activated or not, and means for generating the data representing the target input to said plant with the target value for the output of said second detecting means being a predetermined value, if said first detecting means is judged as being inactivated.

41. A plant control system according to claim 21 or 22, wherein said feedback control process carried out by said first control processing means has a feedback gain smaller than the feedback gain of said feedback control process carried out by said second control processing means.

42. A plant control system according to claim 41, wherein at least one of said feedback control processes carried out by said first and second control processing means comprises a response-indicating-type control process.

* * * * *